(12) United States Patent
Kusase et al.

(10) Patent No.: US 7,723,889 B2
(45) Date of Patent: May 25, 2010

(54) RELUCTANCE ELECTRIC MACHINE WITH SALIENT-POLE MOVABLE PIECE

(75) Inventors: Shin Kusase, Oobu (JP); Yuya Mizuma, Gamagoori (JP)

(73) Assignee: Denso Corporation, Kariya (JP)

( * ) Notice: Subject to any disclaimer, the term of this patent is extended or adjusted under 35 U.S.C. 154(b) by 320 days.

(21) Appl. No.: 12/000,437

(22) Filed: Dec. 12, 2007

(65) Prior Publication Data
US 2008/0143114 A1 Jun. 19, 2008

(30) Foreign Application Priority Data
Dec. 13, 2006 (JP) ............................. 2006-335604

(51) Int. Cl.
*H02K 17/00* (2006.01)
(52) U.S. Cl. ...................... 310/166; 310/168
(58) Field of Classification Search ................. 310/166, 310/168, 171
See application file for complete search history.

(56) References Cited

U.S. PATENT DOCUMENTS

| 5,111,096 | A | * | 5/1992 | Horst ........................ 310/168 |
| 6,114,789 | A | * | 9/2000 | Pengov et al. .............. 310/166 |
| 6,787,958 | B1 | * | 9/2004 | Walter ....................... 310/168 |
| 6,870,295 | B2 | * | 3/2005 | Lim et al. ................. 310/216.001 |
| 2004/0070301 | A1 | * | 4/2004 | Mecrow ..................... 310/168 |

FOREIGN PATENT DOCUMENTS

| JP | A-2002-136073 | 5/2002 |
| JP | A-2002-165427 | 6/2002 |
| JP | A-2006-246571 | 9/2006 |

OTHER PUBLICATIONS

J. Oyama, "Fundamental Characteristics of a Novel Segment Type Switched Reluctance Motor with Segment Core Embedded in Aluminum Rotor Block," pp. 43-48 (with abstract).

* cited by examiner

*Primary Examiner*—Nguyen N Hanh
(74) *Attorney, Agent, or Firm*—Oliff & Berridge, PLC

(57) ABSTRACT

In a reluctance rotary electric machine, a movable part is arranged opposing part of an alignment of a plurality of stator poles to be movable in a predetermined direction. In the movable part, at least one pair of salient poles is configured to magnetically couple to the excited at least one first pair of the plurality of poles so as to form a first magnetic flux in loop thereamong. A segment magnetic-path portion is arranged to be magnetically separated from the at least one pair of salient poles. The segment magnetic-path portion works to magnetically couple therethrough between the at least one second pair of the plurality of stator poles so as to form a second magnetic flux in loop thereamong. The first magnetic flux and second magnetic flux create a reluctance force to move the movable part in the predetermined direction.

11 Claims, 47 Drawing Sheets

75T8.85A

MAX TORQUE
66deg:13.1N·m

AVERAGE TORQUE
56-86deg:4.9N·m

MECHANICAL PHASE ANGLE (deg)

RELUCTANCE ELECTRIC MACHINE WITH SALIENT-POLE MOVABLE PIECE

CROSS REFERENCE TO RELATED APPLICATIONS

This application is based on Japanese Patent Application 2006-335604 filed on Dec. 13, 2006. This application claims the benefit of priority from the Japanese Patent Application, so that the descriptions of which are all incorporated herein by reference.

FIELD OF THE INVENTION

The present invention relates to reluctance electric machines each with a salient-pole movable piece rotor, more particularly, to reluctance rotary electric machines each with a salient-pole rotor.

BACKGROUND OF THE INVENTION

Various types of reluctance rotary electric machines have been known. For example, a synchronous reluctance motor is configured to rotate its rotor in relation to its stator opposite thereto based on a rotating magnetic field produced by field windings mounted on the stator. A switched reluctance motor is configured to sequentially excite poles (stator poles) of its stator in a given direction of its rotor to thereby rotate the rotor. Such a synchronous reluctance motor has been widely well known, and such a switched reluctance motor is for example disclosed in Japanese Patent Application Publication No. 2002-136073.

The rotor of such a reluctance rotary electric machine is designed as a salient-pole soft magnetic rotor. Specifically, the rotor with a substantially cylindrical shape is provided with a plurality of pairs of salient poles circumferentially arranged in a circumferential direction of the rotor such that the salient poles of each pair have a circumferential pitch corresponding to an electric angle of $\pi$ radians. The salient poles of each pair are magnetically short-circuited inside the rotor.

The salient poles of the salient-pole rotor can be configured such that an outer periphery of the rotor is formed with a plurality of pairs of salients each extending radially outward; these salients of each pair have a circumferential pitch of an electric angle of $\pi$ radians. The salient poles of the salient-pole rotor can also be configured such that a plurality of flux barriers (slits) are arranged to be circumferentially spaced apart from each other. The latter of the salient pole structure is disclosed in Japanese Patent Application Publication No. 2002-165427.

Japanese Patent Application Publication No. 2006-246571 discloses a reluctance motor having a substantially annular cylindrical rotor. The rotor is formed at its outer periphery with a plurality of magnetic segments whose number is different from the number of stator poles arranged opposing the rotor in a rotational direction thereof. The reluctance motor with the magnetic segments is configured such that the stator poles sequentially pull the magnetic segments in the rotational direction to thereby create a reluctance torque.

Such various types of reluctance motors are however integrated with magnets, and therefore, the magnitude of the reluctance torque created by each of the reluctance rotary electric machines is lower than that of an Interior Permanent Magnet Synchronous Motor (IPMSM) whose rotor is integrated with a plurality of permanent magnets. This results that, in order to obtain a desired torque, a reluctance motor is greater in size than an IPMSM, causing an obstacle in vehicle installability and manufacturing cost.

SUMMARY OF THE INVENTION

In view of the foregoing circumstances, an object of at least one aspect of the present invention is to provide reluctance rotary electric machines, which are capable of increasing their torques as compared with conventional reluctance rotary electric machines.

According to one aspect of the present invention, there is provided a reluctance electric machine. The reluctance electric machine includes a stator core having a plurality of stator poles aligned in a predetermined direction with pitches therebetween, and a plurality of multiphase windings installed in the stator core and configured to sequentially excite at least one first pair of the plurality of stator poles when energized. At least one second pair of the plurality of stator poles remains between the excited at least one first pair of the plurality of stator poles. The reluctance electric machine includes a movable part arranged opposing part of an alignment of the plurality of stator poles to be movable in the predetermined direction. The movable part includes at least one pair of salient poles configured to magnetically couple to the excited at least one first pair of the plurality of poles so as to form a first magnetic flux in loop thereamong. The movable part includes a segment magnetic-path portion arranged to be magnetically separated from the at least one pair of salient poles. The segment magnetic-path portion works to magnetically couple therethrough between the at least one second pair of the plurality of stator poles so as to form a second magnetic flux in loop thereamong. The first magnetic flux and second magnetic flux create a reluctance force to move the movable part in the predetermined direction.

In a preferred embodiment of this one aspect, the stator core has an annular peripheral surface, and the plurality of stator poles constitute part of the annular peripheral surface. The movable part is a rotor rotatable in relation to the stator core about an axis, the rotor having an annular peripheral surface. The rotor is arranged such that the annular peripheral surface thereof is opposite to that of the stator core with an air gap. The at least one paired salient poles are separated from each other with an electric angle of $\pi$ radians, and the at least one first paired stator poles are separated from each other with an electric angle of $\pi$ radians.

In a preferred embodiment of this aspect, the segment magnetic-path portion has a substantially arc-shaped surface constituting part of the annular peripheral surface of the rotor, the arc-shaped surface of the segment magnetic-path portion has a center axis passing through the axis of rotation of the rotor, and the segment magnetic-path portion is arranged such that the center axis thereof is separated, by an electric angle of $\pi/2$ radians, from an extending direction of each of the at least one paired salient poles to the stator core. The extending direction thereof passes through the axis of rotation of the rotor.

In a preferred embodiment of this aspect, the rotor further comprises a magnetic separator arranged between the at least one pair of salient poles and the segment magnetic-path portion and magnetically separating them from each other.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings. In the embodiment, the present invention is, for example, applied to a two-pole reluctance rotary electric machine EM having one pair of salient poles 31 illustrated in FIGS. 1 and 2. The present invention can be applied to reluctance rotary electric machines having a plurality of pairs of salient poles.

Figure 1:
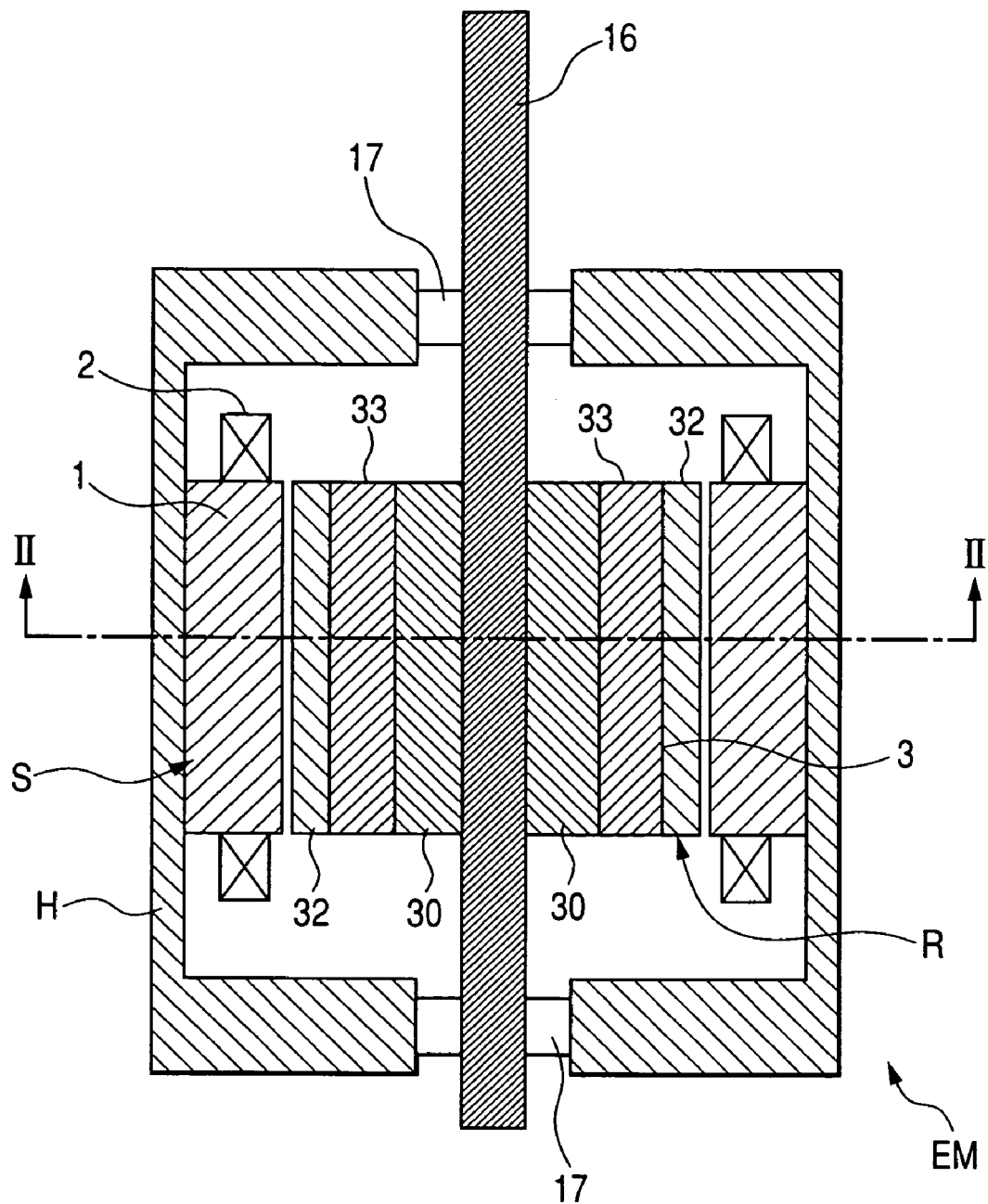
FIG. 1 is an axial cross section schematically illustrating an example of the structure of a reluctance rotary electric machine according to an embodiment of the present invention.
Figure 2:
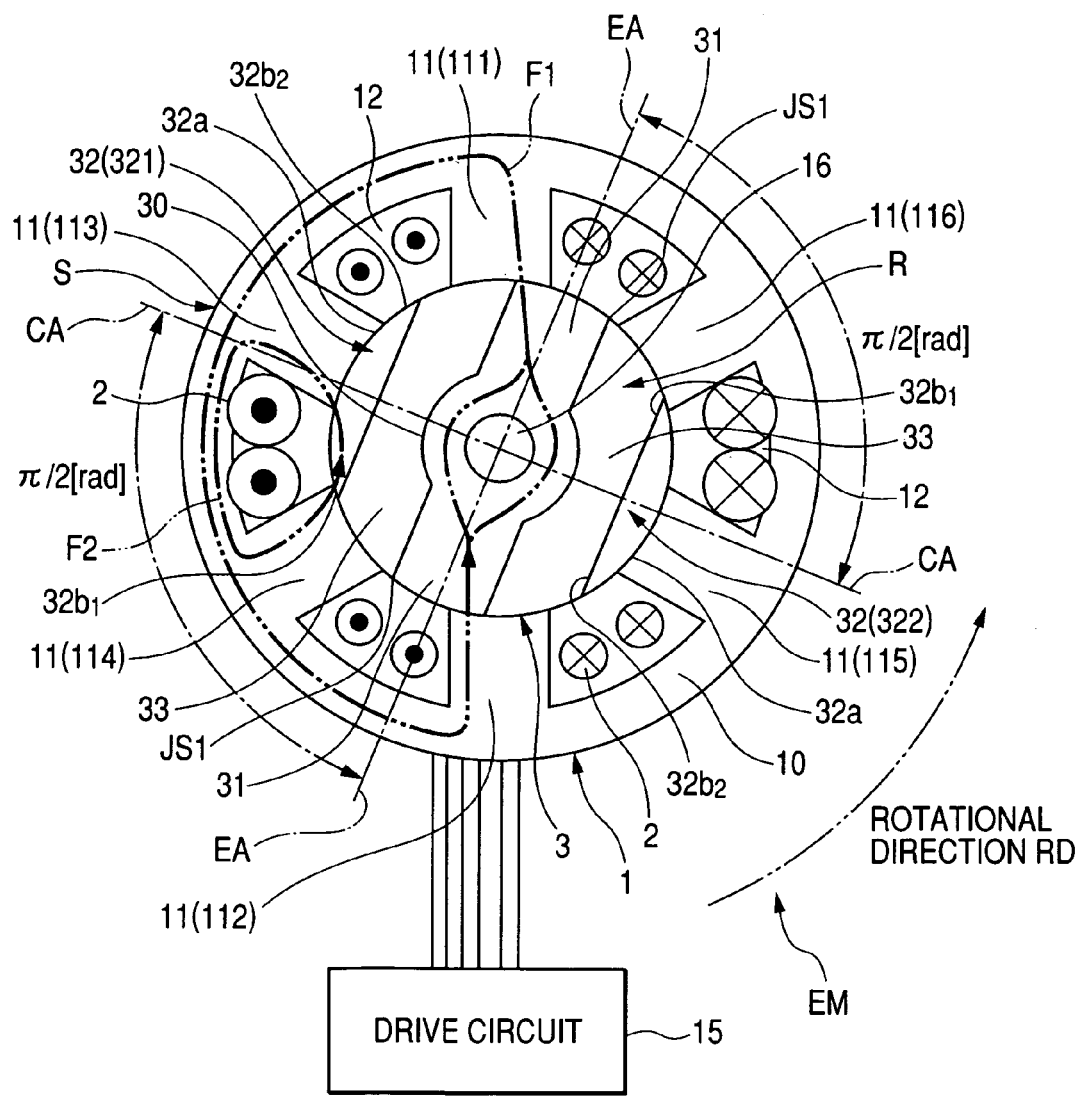
FIG. 2 is an enlarged lateral cross sectional view taken on line II-II in FIG. 1 and wherein cross hatching is omitted for clarity.

Referring to FIGS. 1 and 2, the reluctance rotary electric machine EM is provided with a pair of a stator S and a rotor R and a housing H in which the stator S is installed.

The stator S consists of a substantially annular cylindrical soft magnetic stator core 1. The stator core 1 is composed of a substantially annular cylindrical yoke 10 and a number of, such as six, stator poles 11 projecting inwardly from the inner periphery of the yoke 10 and circumferentially arranged at, for example, regular pitches corresponding to an electric angle of $\pi/3$ radians; this arrangement provides a plurality of slots 12 each formed between a corresponding one pair of adjacent stator poles 11.

The stator S also consists of a plurality of stator windings 2 each concentratedly or distributedly wound in corresponding at least one of the slots 12. To each of the stator windings 2, a drive current is configured to be supplied. For example, in FIG. 2, each of three-phase stator windings 2 is distributedly wound in a corresponding pair of opposing slots 12 of the stator core 1. One ends of the three-phase stator windings are connected to each other in, for example, star configuration to constitute an individual neutral point, thus constituting a stator coil.

Each of the three-phase stator windings 2 is connected to a drive circuit 15 for driving the reluctance rotary electric machine EM. The drive circuit 15 works to supply a drive current to the stator windings 2 to energize them so as to allow the energized stator windings 2 to create a rotating magnetic field around a center axis of the stator core 1 (rotor R).

For example, the drive circuit 15 works to sequentially switch the drive current from one of the three-phase windings 2 to another one thereof so as to form the rotating magnetic field. For another example, the drive circuit 15 works to supply multiphase, such as three-phase, currents as the drive current to the stator windings 2 so as to form a continuously rotating magnetic field.

The rotor R consists of a substantially annular cylindrical soft magnetic rotor core 3 rotatably disposed inside the stator core 1 with a narrow electromagnetic gap therebetween, and a rotor shaft 16 fixed to the inner periphery of the rotor core 3 and rotatably supported by the housing H with a pair of bearings 17.

As illustrated in FIG. 2, the rotor core 3 is composed of a substantially annular cylindrical shaft support 30 with an inner periphery in which the shaft 16 is fixedly supported. The rotor core 3 is also composed of a pair of soft magnetic salient poles 31, a pair of segment magnetic-path portions 32 (321, 322), and a pair of magnetic separators 33.

The paired salient poles 31 extend continuously from respective portions of the outer periphery of the shaft support 30 to form, at their extending ends, respective segments of the outer periphery of the rotor core 3 while they are separated from each other with an electric angle of $\pi$ radians. Specifically, the shaft support 30 serves as a magnetic short-circuiting portion between the paired salient poles 31.

Each of the paired segment magnetic-path portions 32 has a pillar structure whose longitudinal direction is parallel to the axial direction of the rotor core 3. Each of the paired segment magnetic-path portions 32 has the same longitudinal length as an axial length of the shaft support 30.

Each of the paired segment magnetic-path portions 32 has a substantially arc-shape in its lateral cross section. Specifically, each of the paired segment magnetic-path portions 32 has a substantially arc-shaped outer surface 32a constituting a segment of the outer periphery of the rotor core 3, and a plane inner surface continuing from the arc-shaped outer surface 32a.

In the cross section illustrated in FIG. 2, the arc-shaped outer surface 32a of each of the paired segment magnetic-path portions 32 has a center axis CA passing through the axial direction of the rotor core 3, and extends circumferentially toward both sides of the center axis CA.

Specifically, in the cross section illustrated in FIG. 2, each of the paired segment magnetic-path portions 32 is arranged such that the center axis CA thereof is separated, by an electric angle of $\pi/2$ radians, from the extending direction-EA of each of the salient poles 31 passing through the axial direction of the rotor core 1.

For example, in the embodiment, each of the paired salient poles 31 and each of the paired segment magnetic-path portions 32 consists of a plurality of soft magnetic steel sheets laminated in their thickness directions. Each of the paired salient poles 31 and each of the paired segment magnetic-path portions 32 can be made of a soft magnetic solid material using a mild steel as a raw material.

The paired magnetic separators 33 are each made of a nonmagnetic material and/or a permanent magnet. As the nonmagnetic material, a nonmagnetic conductor, such as a nonmagnetic metal, and a nonmagnetic insulator, such as a resin material can be used.

For example, in the embodiment, each of the paired magnetic separators 33 is made of die-cast aluminum.

Each of the paired magnetic separators 33 is so configured and arranged as to:

magnetically separate a corresponding one of the paired salient poles 31 and a corresponding one of the paired magnetic separators 33 at a practically adequate level; and allow the whole shape of the combination of each of the paired salient poles 31, each of the paired segment magnetic-path portions 32, and each of the paired magnetic separators 33 to provide, in the cross section illustrated in FIG. 2, a substantially circular shape.

In other words, each of the paired salient poles 31, each of the paired segment magnetic-path portions 32, and each of the paired magnetic separators 33 are integrally combined with each other.

In order to increase the mechanical combination between each of the paired salient poles 31, to one of the joint surfaces JS1 between each of the paired salient poles 31 and a corresponding one of the paired magnetic separators 33, an engagement member can be formed so as to be engageable to the other of the joint surfaces JS1 therebetween. Similarly, to one of the joint surfaces JS2 between each of the paired segment magnetic-path portions 32 and a corresponding one of the paired magnetic separators 33, an engagement member can be formed so as to be engageable to the other of the joint surfaces JS2 therebetween.

For example, to one of the joint surfaces JS1 between each of the paired salient poles 31 and a corresponding one of the paired magnetic separators 33, at least one convex portion (concave portion) can be formed so as to be engageable to a corresponding at least one concave portion (convex portion) formed in the other of the joint surfaces JS1 therebetween.

Next, the structure of each of the paired segment magnetic-path portions 32 will be described in detail hereinafter.

First, the structure of each of the stator poles 11 will be described hereinafter ahead of the description of the structure of each of the paired segment magnetic-path portions 32.

When the rotor R is located at a rotational position illustrated in FIG. 2, six stator poles 11 include two stator poles (111 and 112) that come closest to the paired salient poles 31 of the rotor R separated from each other with the electric angle of $\pi$ radians. Two stator poles 111 and 112 that come closest to the paired salient poles 31 of the rotor R in the six stator poles 11 will be referred to as "salient-pole torque stator poles" hereinafter. The remaining stator poles 113 to 116 in the six stator poles 11 will be referred to as "segment-path torque stator poles" hereinafter.

Specifically, when the rotor R is located at the rotational position illustrated in FIG. 2, two segment-path torque stator poles (113 and 114) adjacent to each other are located at the left side of each of the salient-pole torque stator poles 111 and 112 in FIG. 2.

Similarly, when the rotor R is located at the rotational position illustrated in FIG. 2, two segment-path torque stator poles (115 and 116) adjacent to each other are located at the right side of each of the salient-pole torque stator poles 111 and 112 in FIG. 2.

The paired segment magnetic-path portions 32 are arranged to be separated from each other with an electric angle of $\pi$ radians. The arc-shaped outer surface 32a of each of the paired segment magnetic-path portions 32 extends circumferentially toward both sides of the center axis CA so as to allow at least one pair of adjacent segment-path torque stator poles to be magnetically coupled to each other.

For example, in the embodiment, each of the paired segment magnetic-path portions 32 has a substantially arc-shape in its lateral cross section. Each of the paired segment magnetic-path portions 32 can have another shape in its lateral cross section; the arc-shaped outer surface 32a of another shape has an enough circumferential length allowing a least one pair of adjacent segment-path torque stator poles to be magnetically coupled to each other.

Specifically, it is assumed that the length of the circumferential inner periphery of each of the stator poles 11 is referred to as "Dp", and the pitch between adjacent stator poles 11 is referred to as "P". In addition, it is assumed that the length Ds of the arc-shaped outer surface 32a of each of the paired segment magnetic-path portions 32 is represented by the following equation:

$$P \leq Ds \leq P \times (M-2) + P - Dp = P \times (M-1) - Dp$$

where M represents the number of stator poles 11 to be arranged between the electric angle of $\pi$ radians. Specifically, in the embodiment, the M is 3.

Thus, in the embodiment, the length Ds of the arc-shaped outer surface 32a of each of the paired segment magnetic-path portions 32 is determined to be not more than "2P−Ds". Preferably, the length Ds of the arc-shaped outer surface 32a of each of the paired segment magnetic-path portions 32 is determined to be equal to or longer than the pitch P and to be not more than "P×(M−1)−Dp−α"; this α represents a predetermined circumferential length, and is preferably determined to be not more than the half of the "P−Dp". More preferably, the predetermined circumferential length α is determined to be within a range from 5 to 25 percent of the "P−Dp".

Operations of the reluctance rotary electric machine EM will be described hereinafter.

It is assumed that the rotational direction of the rotor R is represented by a double-dashed arrow RD.

When the rotor R is located at a rotational position illustrated in FIG. 2, each of the paired salient poles 31 thereof comes close to a corresponding one of the stator poles 11, such as a corresponding one of the salient-pole torque stator poles 111 and 112.

In this rotational location of the rotor R illustrated in FIG. 2, the drive circuit 15 works to supply a drive current to at least one of the three-phase stator windings 2; this drive current flowing through at least one of the three-phase stator windings 2 is required to excite the salient-pole torque stator poles 111 and 112.

This energization of at least one of the three-phase stator windings 2 required to excite the salient-pole torque stator poles 111 and 112 creates first magnetic fluxes F1 passing through the stator pole 112, one of the salient poles 31, the shaft support 30, the other of the salient poles 31, and the yoke 10 in a closed loop (closed magnetic path).

A magnetic resistance between each of the paired salient poles 31 of the rotor R and a corresponding one of the salient-pole torque stator poles 111 and 112 becomes minimum when each of the paired salient poles 31 of the rotor R faces a corresponding one of the salient-pole torque stator poles 111 and 112.

For this reason, the first magnetic fluxes F1 create a magnetic attractive force ff1 between each of the paired salient poles 31 of the rotor R and a corresponding one of the salient-pole torque stator poles 111 and 112 required to minimum the magnetic resistance therebetween. Specifically, the created magnetic attractive force ff1 causes a torque (salient-pole torque) to rotate the rotor R in the rotational direction; this results that the paired salient poles 31 of the rotor R face the corresponding salient-pole torque stator poles 111 and 112, respectively.

In the rotational location of the rotor R illustrated in FIG. 2, for example, one end 32b1 of the outer surface 32a of one segment magnetic-path portion 321 comes closest to the segment-path torque stator pole 114 in the rotational direction. This results that the segment magnetic-path portion 321 allows the adjacent segment-path torque stator poles 113 and 114 to be magnetically coupled to each other.

The magnetic coupling between the adjacent segment-path torque stator poles 113 and 114 allows a current component of the drive current flowing through at least one of the three-phase stator windings 2 to create second magnetic fluxes F2. Specifically, as illustrated in FIG. 2, the second magnetic fluxes F2 pass through the stator pole 114, the segment magnetic-path portion 321, the stator pole 113, and the yoke 10 in a closed loop (closed magnetic path).

A magnetic resistance between the segment magnetic-path portion 321 of the rotor R and the stator pole 113 becomes minimum when the segment magnetic-path portion 321 of the rotor R faces the stator pole 113.

For this reason, the second magnetic fluxes F2 create a magnetic attractive force ff2 between the segment magnetic-path portion 321 of the rotor R and the stator pole 113 required to minimum the magnetic resistance therebetween. Specifically, the created magnetic attractive force ff2 causes a torque (first segment-path torque) to rotate the rotor R in the rotational direction; this results that the segment magnetic-path portion 321 of the rotor R faces the stator pole 113.

As in the case of the one segment magnetic-path portion 321, third magnetic fluxes (not shown) are created to pass through the stator pole 116, the segment magnetic-path portion 322, the stator pole 115, and the yoke 10 in a closed loop (closed magnetic path). The third magnetic fluxes create a magnetic attractive force between the segment magnetic-path portion 322 of the rotor R and the stator pole 116 required to minimum the magnetic resistance therebetween. The created magnetic attractive force creates a second segment-path torque to rotate the rotor R in the rotational direction RD; this results that the segment magnetic-path portion 322 of the rotor R faces the stator pole 116.

Specifically, the resultant torque of a set of the salient-pole torque, the first segment-path torque, and the second segment-path torque is applied to the rotor R so as to rotate it in the rotational direction RD.

Thus, as compared with conventional reluctance motors in which a salient-pole torque is merely created and applied to a rotor thereof, it is possible for the reluctance rotary electric machine EM to increase the total torque to be applied to the rotor R to rotate it.

Note that, in the rotational location of the rotor R illustrated in FIG. 2, the other end 32b2 of the outer surface 32a of the segment magnetic-path portion 321 is close to the stator pole 111. For this reason, a fourth flux is created to pass through the stator pole 113, the segment magnetic-path portion 321, the stator pole 111, and the yoke 10 in a closed loop (closed magnetic path). The fourth flux creates a magnetic attractive force ff2b between the segment magnetic-path portion 321 of the rotor R and the stator pole 111 required to minimum the magnetic resistance therebetween in a backward direction opposite to the rotational direction.

Thus, in the embodiment, for example, the drive circuit 15 works to individually supply the drive current to each of the three-phase stator windings 2 such that the number of the second magnetic fluxes F2 is greater than that of the fourth magnetic fluxes. In other words, the drive circuit 15 works to individually supply the drive current to each of the three-phase stator windings 2 such that the magnetic attractive force ff2 created by the second magnetic fluxes F2 is greater than the magnetic attractive force ff2b created by the fourth magnetic fluxes.

More specifically, the magnetic attractive force ff2 between the segment magnetic-path portion 321 and the rotationally forward side stator pole 114 is proportional to the number of the magnetic fluxes F2. The number of the magnetic fluxes F2 can be expressed as a function of both a magnetomotive force and the magnetic resistance between the segment magnetic-path portion 321 and the stator pole 114; this magnetomotive force is created by the current component of the drive current. The current component of the drive current contributes to the creation of the second magnetic fluxes F2.

Thus, in order to make the number of the second magnetic fluxes F2 exceed that of the fourth magnetic fluxes, it is possible to adjust the magnitude of the current component of the drive current required to create the second magnetic fluxes F2 to be lower than that of the current component of the drive current required to create the fourth magnetic fluxes.

In addition, note that such a magnetic resistance between a stator pole and a segment magnetic-path portion is inversely proportional to the length of a circumferential gap (interval) between the stator pole and one end of the segment magnetic-path portion oppose thereto.

For this reason, when the one end 32b1 of the segment magnetic-path portion 321 for example comes close to the forward side stator pole 114 in the rotational direction, the drive circuit 15 is preferably configured to increase the current component of the drive current required to create the second magnetic fluxes F2.

In contrast, when the other end 32b2 of the segment magnetic-path portion 321 is close to the stator pole 111 in a direction opposite to the rotational direction, the drive circuit 15 is preferably configured to reduce the current component of the drive current required to create the fourth magnetic fluxes.

As described above, the length Ds of the arc-shaped outer surface 32a of each of the paired segment magnetic-path portions 32 (321 and 322) is determined to be longer than the pitch P and to be not more than "P×(M−1)−Dp−α". The reason is as follows.

For example, in the rotational location of the rotor R illustrated in FIG. 2, the magnetic attractive force ff2 is created when a circumferential gap between the one end 32b1 of the segment magnetic-path portion 321 and the segment-path torque stator pole 114 becomes substantially zero.

Assuming that the length Ds of the arc-shaped outer surface 32a of the segment magnetic-path portion 321 is set to the "P×(M−1)−Dp", because M is equal to 3, the length Ds of the arc-shaped outer surface 32a of the segment magnetic-path portion 321 is expressed by "2P−Dp". As illustrated in FIG. 2, the "2P−Dp" represents the circumferential interval between the adjacent stator poles 114 and 111.

Thus, in this assumption, when the circumferential gap between the one end 32b1 of the segment magnetic-path portion 321 and the stator pole 114 becomes substantially zero, a circumferential gap between the other end 32b2 of the segment magnetic-path portion 321 and the stator pole 111 would become substantially zero. This would result that the magnetic resistance between the segment magnetic-path portion 321 and the stator pole 114 and that between the segment magnetic-path portion 321 and the stator pole 111 are substantially equal to each other.

Accordingly, even if the length Ds of the arc-shaped outer surface 32a of the segment magnetic-path portion 321 is determined to be the "P×(M−1)−Dp−α", when the circumferential gap between the one end 32b1 of the segment magnetic-path portion 321 and the stator pole 114 becomes substantially zero, the gap a can be secured between the other end 32b2 of the segment magnetic-path portion 321 and the stator pole 111. This allows the magnetic resistance between the segment magnetic-path portion 321 and the stator pole 111 to become greater than that between the segment magnetic-path portion 321 and the stator pole 114. This can make the magnetomotive force between the segment magnetic-path portion 321 and the stator pole 114 exceed that between the segment magnetic-path portion 321 and the stator pole 111.

As described above, the resultant torque of a set of the salient-pole torque, the first segment-path torque, and the second segment-path torque is applied to the rotor R so as to rotate it in the rotational direction.

When the rotor R is rotated so that the segment magnetic portions 321 and 322 face the stator poles 112 and 111, respectively, the drive circuit 15 works to switch the supply of the drive current from a previous pattern required to excite the stator poles 112 and 111 to the next pattern required to excite the next stator poles 115 and 113 in the rotational direction.

Thus, the drive current in the next pattern allows the next stator poles 115 and 113 in the rotational direction to be excited as the salient-pole torque stator poles so that the rotor R is attracted toward the salient-pole torque stator poles 115 and 113.

At that time, the stator poles 112 and 111 serve as the segment-path torque stator poles. Specifically, when the rotor R is located so that the one end 32b1 of the segment magnetic-path portion 321 comes closest to the stator pole 112, a magnetic attractive force ff2 is created between the segment magnetic-path portion 321 of the rotor R and the stator pole 112 required to minimum the magnetic resistance therebetween.

Accordingly, the switching of the supply of the drive current is repeated so that the rotor R is continuously rotated by the resultant torque created by the switched drive current and the stator S set forth above.

For example, as described above, the drive circuit 15 can work to sequentially switch the drive current from one of the three-phase stator windings 2 to another one thereof so as to form the rotating magnetic field in a same manner as conventional switched reluctance motors. For another example, the drive circuit 15 can work to supply multiphase, such as three-phase, currents as the drive current to the three-phase stator windings 2 so as to form a continuously rotating magnetic field in a same manner as conventional synchronous reluctance motors.

Next, the result of simulations for evaluating torque characteristics of each of a plurality of reluctance motor samples SA1 to SA42 prepared based on the structure of the reluctance rotary electric machine EM while part of which is changed and/or the pattern (current drive patterns) of how to supply the drive current is changed will be described hereinafter.

The simulations based on the plurality of reluctance motor samples SA1 to SA42 based on the reluctance rotary electric motor EM were carried out under the following conditions:

The reluctance motor samples SA1 to SA42 are categorized into the first and second groups.

Some of the motor samples SA1 to SA42 contained in the first group are each comprised of teeth 51 installed in the inner peripheral portions of the slots 12, respectively. Each of the teeth 51 is contacted to the inner peripheries of the corresponding paired stator poles 11 arranged at both sides thereof so as to circumferentially extend the inner periphery of each of the stator poles 11.

The remaining of the motor samples SA1 to SA42 contained in the second group is composed of no teeth.

Note that, the torque characteristics curves of the respective motor samples SA1 to SA42 described hereinafter were obtained by measuring a torque caused by the rotor R of each of the samples SA1 to SA42 at respective rotational angular positions (mechanical phase angles) thereof while a constant drive current is supplied from a battery to flow through each of the three-phase stator windings 2 constituting the stator coil in a corresponding one of the current-drive patterns. Adjustment of the number of turns of each of the three-phase stator windings 2 and of the winding diameter for each of the current-drive patterns allows individual electric resistances of the stator coils in the respective current-drive patterns from the battery to be matched with one another.

In each of the graphs of FIGS. 3B to 38B, the dashed line represents a first torque curve caused by the salient-pole torque stator poles and the salient poles 31 of a corresponding one of the samples SA1 to SA36.

Moreover, the double-dashed line represents a second torque curve caused by the segment-path torque stator poles and the segment magnetic path portions 32 of each of the samples SA1 to SA36.

Furthermore, the solid line represents a resultant torque curve obtained by combining the first torque curve with the second torque curve of each of the samples SA1 to SA42.

Except for the presence or absence of the teeth 51, the samples SA1 to SA42 have the same shaped stator core 1. Among the samples SA1 to SA42, how a wire is wound in at least one slot 12 of the stator core 1 to form each of the three-phase stator windings 2, the current-drive pattern, and the structure of the rotor R are changed. Specifically, the motor samples SA1 to SA42 have the same outside shape.

In some of the samples SA1 to SA42, each of the three-phase stator windings 2 is concentratedly wound around a corresponding one of the stator poles 11 in a corresponding pair of slots 12 both sides thereof. This winding will be referred to as "concentrated winding".

In the remaining of the samples SA1 to SA42, each of the three-phase stator windings 2 consists of a series-connected pair of winding portions each distributedly wound in corresponding paired slots 12 separated from each other with an electric angle of π radians. This winding will be referred to as "distributed winding".

The current drive patterns include one-phase energizing pattern, first and second two-phase energizing patterns, and a three-phase energizing pattern.

Figure 45:
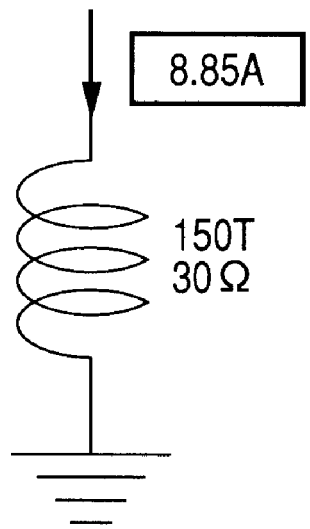
FIG. 45 is a view schematically illustrating a one-phase energizing pattern according to the embodiment.
Figure 46:
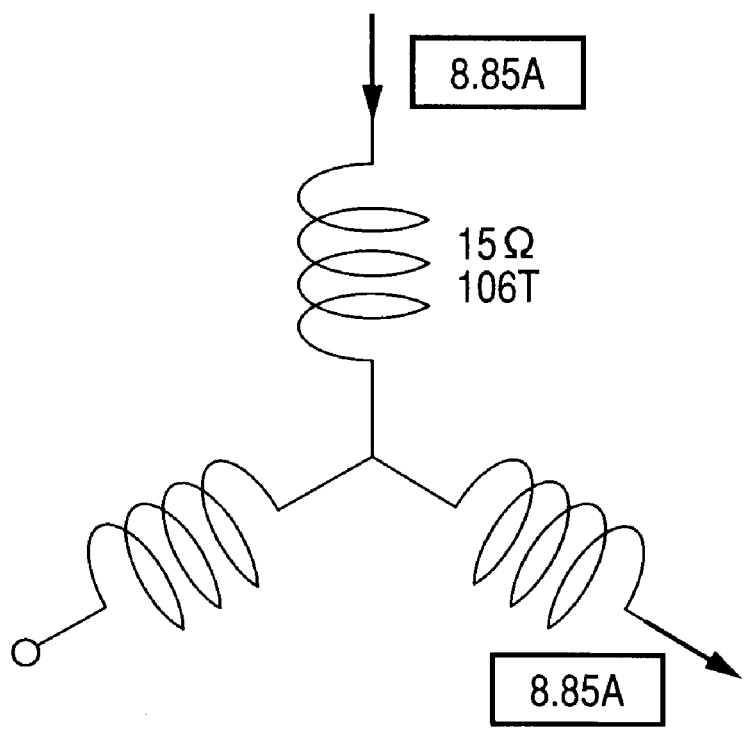
FIG. 46 is a view schematically illustrating a first two-phase energizing pattern according to the embodiment.
Figure 47:
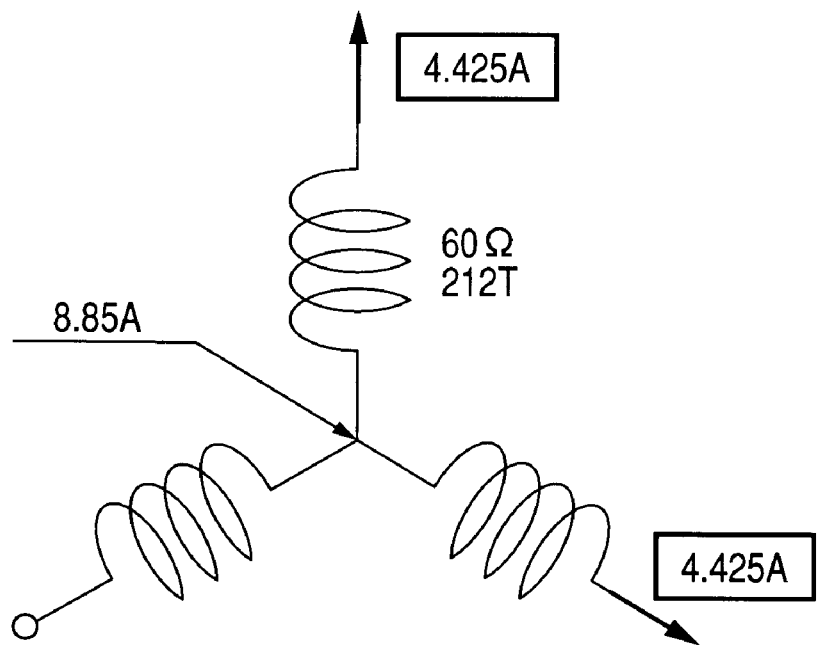
FIG. 47 is a view schematically illustrating a second two-phase energizing pattern according to the embodiment.
Figure 48:
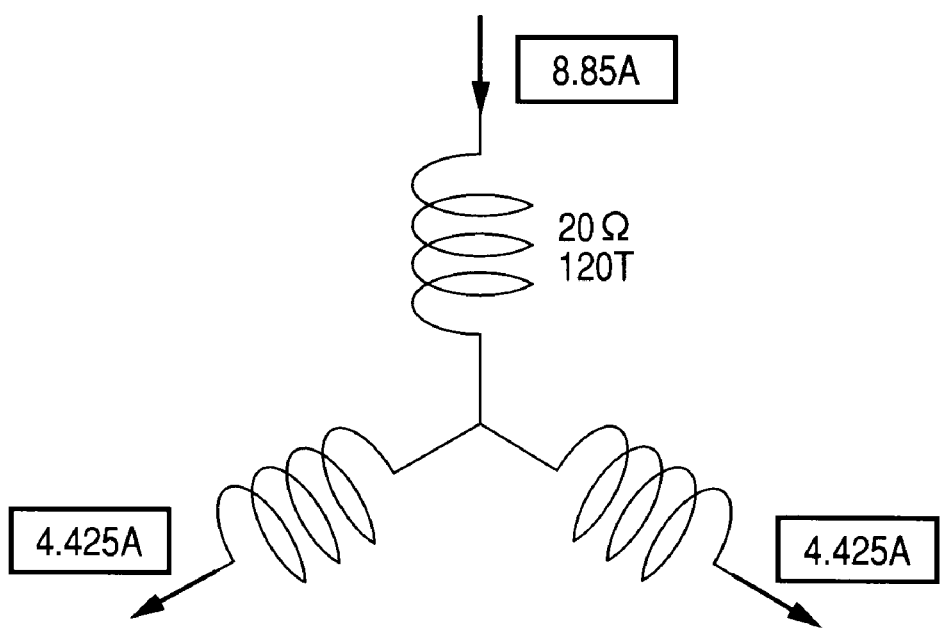
FIG. 48 is a view schematically illustrating a three-phase energizing pattern according to the embodiment.

FIG. 45 schematically illustrates the one-phase energizing pattern, FIG. 46 schematically illustrates the first two-phase energizing pattern, FIG. 47 schematically illustrates the second two-phase energizing pattern, and FIG. 48 schematically illustrates the three-phase energizing pattern.

As illustrated in FIG. 45, in the one-phase energizing pattern, the drive circuit 15 works to supply the drive current of, for example, 8.85 amperes to only one-phase winding with a resistance of 30 Ω and the number of turns of 150.

As illustrated in FIG. 46, in the first two-phase energizing pattern, the drive circuit 15 works to cause the drive current of, for example, 8.85 amperes to flow through one-phase winding of three-phase stator windings in star configuration, and thereafter, through another one-phase winding thereof in series via the neutral point. Each of the three-phase windings has a resistance of 15 Ω and the number of turns of 150.

As illustrated in FIG. 47, in the second two-phase energizing pattern, the drive circuit 15 works to supply the drive current of, for example, 8.85 amperes to the neutral point of three-phase windings in star configuration. The drive current of 8.85 amperes is divided into a first current component of 4.425 amperes and a second current component of 4.425 amperes; these first and second current components are supplied in parallel to one-phase winding and another one-phase winding of the three-phase stator windings. Each of the three-phase windings has a resistance of 60 Ω and the number of turns of 212.

As illustrated in FIG. 48, in the three-phase energizing pattern, the drive circuit 15 works to supply the drive current of, for example, 8.85 amperes to one-phase winding of three-phase windings in star configuration. The drive current of 8.85 amperes flows through the one-phase winding, and thereafter, is divided into a first current component of 4.425 amperes and a second current component of 4.425 amperes at the neutral point; these first and second current components are supplied in parallel to the remaining two-phase windings, respectively. Each of the three-phase windings has a resistance of 20 Ω and the number of turns of 120.

In each of the torque characteristic curves illustrated in FIGS. 3B to 38B, a mechanical phase angle of the rotor R at which the resultant torque becomes maximum can be used for switching the drive current from one of the three-phase stator windings 2 to another one thereof.

Specifically, every time the rotor R is rotated by the mechanical phase angle of, for example, approximately 60 degrees, the drive circuit 15 can work to sequentially switch the drive current from one of the three-phase stator windings 2 to another one thereof in a same manner as conventional switched reluctance motors. In addition, every time the rotor R is rotated by the mechanical phase angle of, for example, approximately 60 degrees, the drive circuit 15 can work to supply continuous multiphase, such as three-phase, currents as the drive current to the three-phase stator windings 2 in a same manner as conventional synchronous reluctance motors.

In the embodiment, because the number of the stator poles 11 is 6 (six poles), it is preferable to switch the drive current from one of the three-phase stator windings 2 to another one thereof every time the rotor R is rotated by the mechanical phase angle of 60 degrees, but the present invention is not limited to the switching. Specifically, it is possible to switch the drive current from one of the three-phase stator windings 2 to another one thereof every time the rotor R is rotated by the mechanical phase angle of θ degrees except for 60 degrees.

In each of the torque characteristic curves illustrated in FIGS. 3B to 44B, when the rotor R is located such that each of the salient poles 31 faces a corresponding one of the stator poles 11, the rotational position of the rotor R is defined as a reference rotational position with the phase angle of 0 degrees. Thus, when the rotor R is rotated from the reference rotational position in one turn so that the circumferential center of the outer periphery of each of the salient poles 31 is directed toward the circumferential center between adjacent stator poles 11, the rotor R is rotated from the reference rotational position by a mechanical phase angle of 90 degrees.

Each of the motor samples SA1 to SA42 has, for example, 160 millimeters in the outer diameter of the stator core 1, 90 millimeters in the inner diameter of the stator core 1, 89.4 millimeters in the outer diameter of the rotor R, and 100 millimeters of an effective length.

The graphs illustrated in FIGS. 3B to 20B for the respective samples SA1 to SA18 were obtained in the three-phase energizing pattern. Specifically, the drive circuit 15 works to supply the drive current of, for example, 8.85 amperes to one-phase winding 2a1 of three-phase windings 2 in star configuration. The drive current of 8.85 amperes flows through the one-phase winding 2a1, and thereafter, is divided into the first current component of 4.425 amperes and the second current component of 4.425 amperes at the neutral point; these first and second current components are supplied in parallel to the remaining two-phase windings 2a2 and 2a3, respectively.

The samples SA1 to SA9 are each comprised of teeth 51 installed in the inner peripheral portions of the slots 12, respectively.

Sample SA1

Figure 3A:
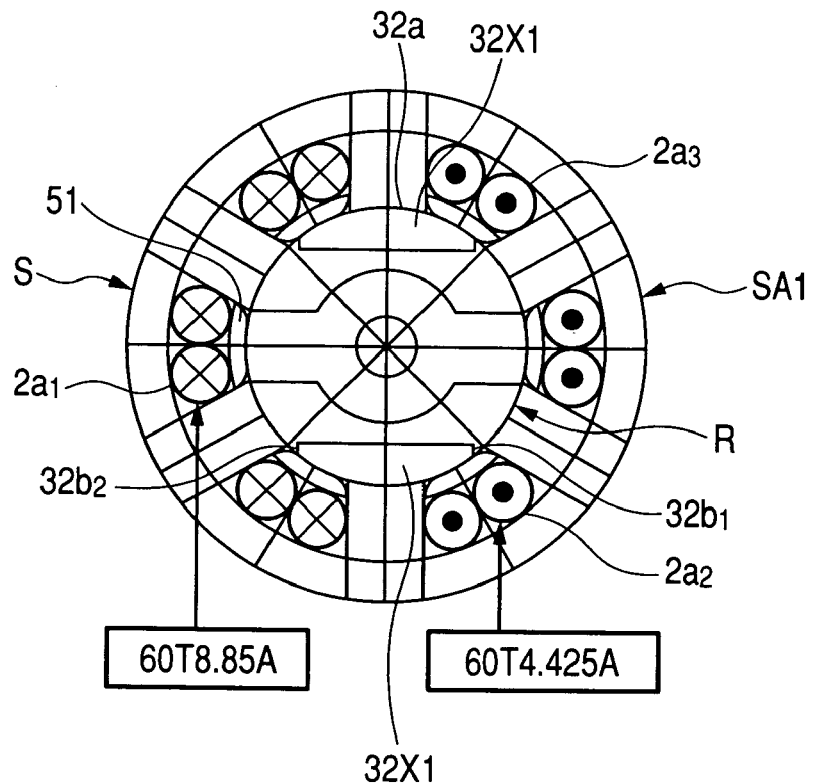
FIG. 3A is an enlarged lateral cross sectional view of a motor sample SA1 corresponding to FIG. 2 and wherein cross hatching is omitted for clarity according to the embodiment.
Figure 3B:
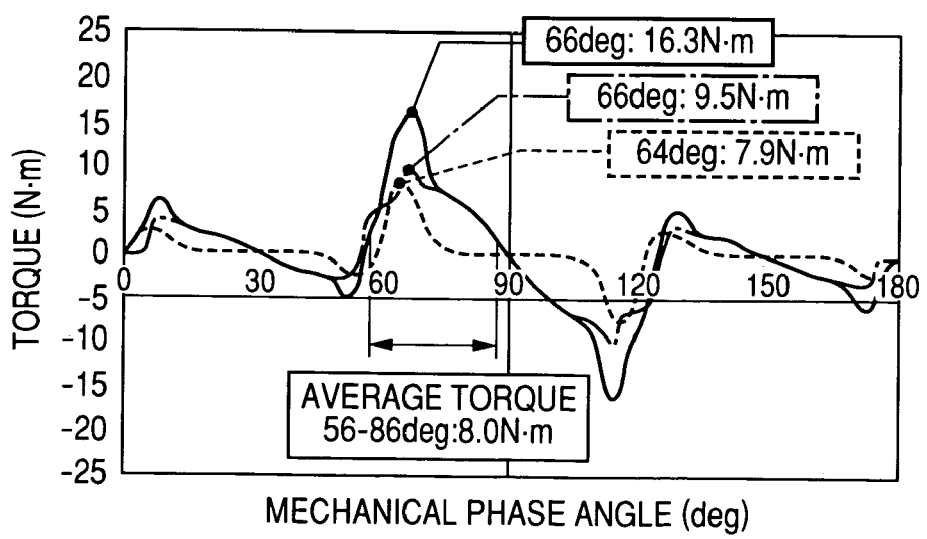
FIG. 3B is a graph schematically illustrating a torque characteristic curve obtained by a simulation based on the motor sample SA1.

FIG. 3A schematically illustrates the motor sample SA1, and FIG. 3B schematically illustrates the torque characteristic curve obtained by the simulation based on the motor sample SA1.

Each of paired segment magnetic-path portions 32X1 of the motor sample SA1 has a substantially arc-shape in its lateral cross section. Specifically, each of the paired segment magnetic-path portions 32X1 has:

a substantially arc-shaped outer surface 32a constituting a segment of the outer periphery of the rotor core 3;

a plane inner surface opposing the outer surface 32a; and opposing end surfaces one of which connects between one end 32b1 of the arc-shaped outer surface 32a and one end of the plane inner surface opposite thereto and the other of which connects between the other end 32b2 of the arc-shaped outer surface 32a and the other end of the plane inner surface opposite thereto, this opposing end surfaces are orthogonal to the plane inner surface.

In FIG. 3A, the length Ds of the arc-shaped outer surface 32a of each of the paired segment magnetic-path portions 32X1 is determined by subtracting the predetermined circumferential length a from the sum of the pitch P and the circumferential length of one slot 12; this circumferential length of one slot 12 is represented by "P–Dp" so that the length Ds is determined by "2P–Dp–α".

The length Ds of the arc-shaped outer surface 32a of each of the paired segment magnetic-path portions 32X1 of the motor sample SA1 corresponds to an arc ratio of 75 degrees.

Sample SA2

Figure 4A:
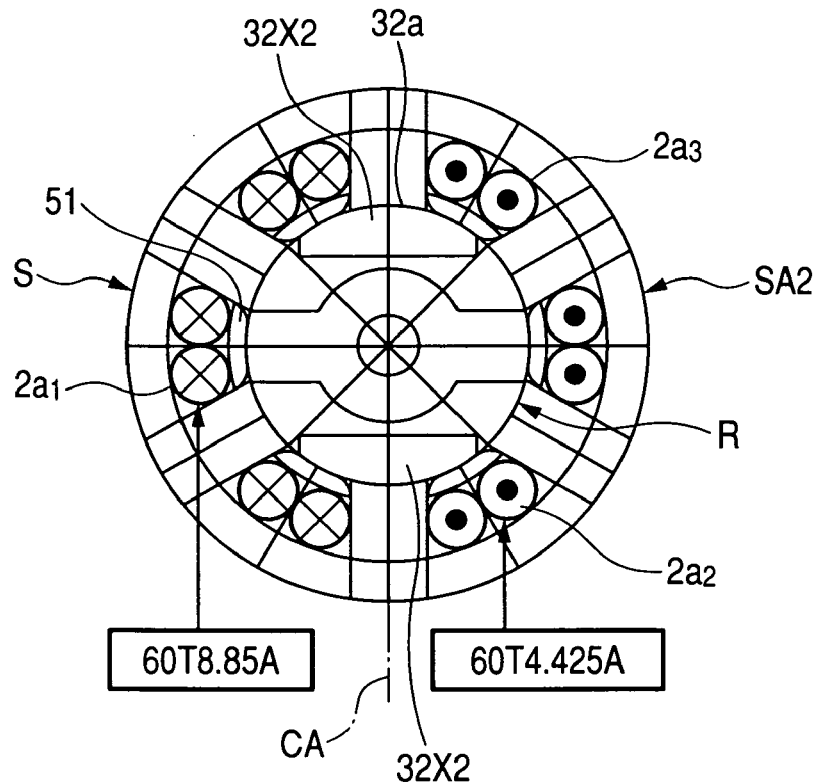
FIG. 4A is an enlarged lateral cross sectional view of a motor sample SA2 corresponding to FIG. 2 and wherein cross hatching is omitted for clarity according to the embodiment.
Figure 4B:
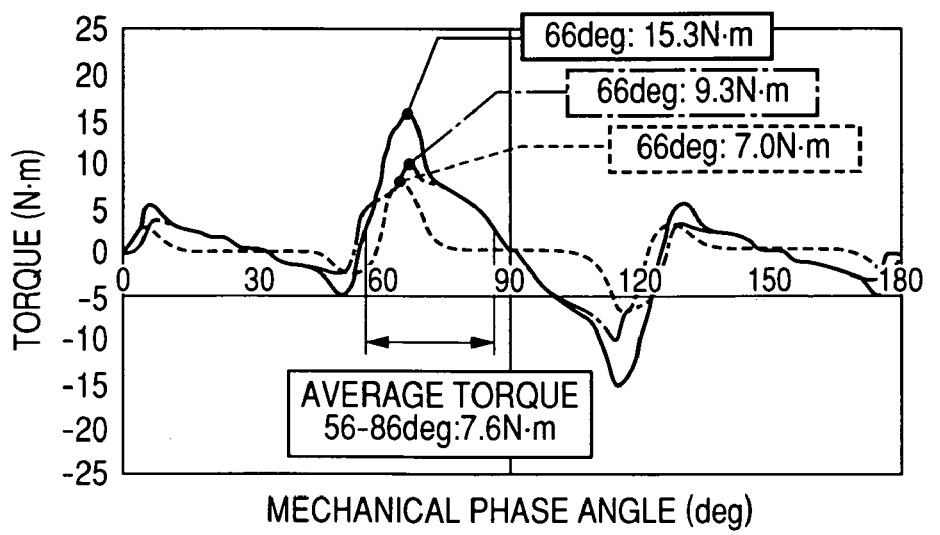
FIG. 4B is a graph schematically illustrating a torque characteristic curve obtained by a simulation based on the motor sample SA2.

FIG. 4A schematically illustrates the motor sample SA2, and FIG. 4B schematically illustrates the torque characteristic curve obtained by the simulation based on the motor sample SA2.

Each of paired segment magnetic-path portions 32X2 of the motor sample SA2 has a width in the center axis CA; this width being 20 percent higher than the width of a corresponding one of the paired segment magnetic-path portions 32.

Sample SA3

Figure 5A:
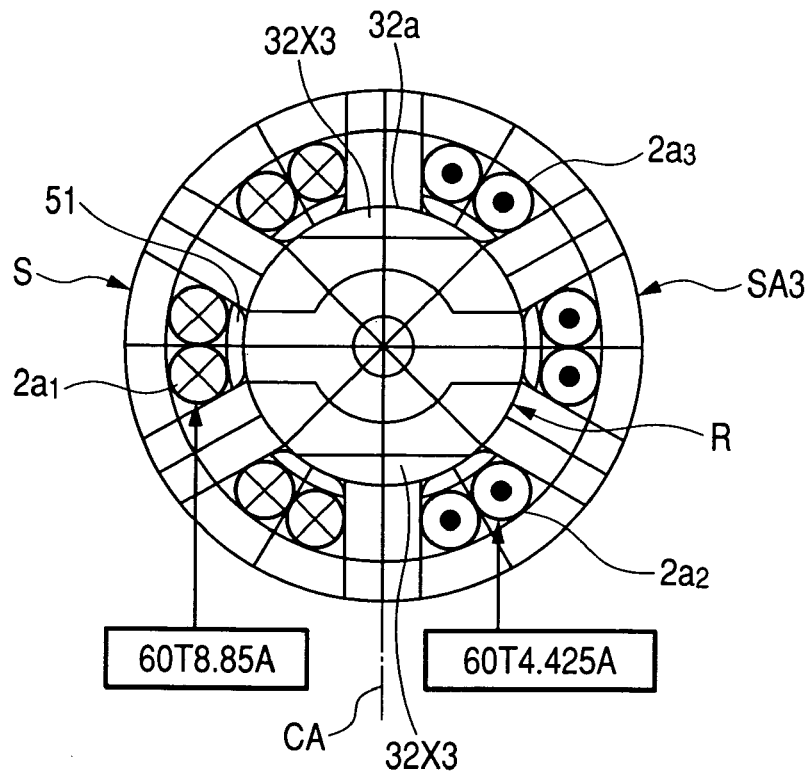
FIG. 5A is an enlarged lateral cross sectional view of a motor sample SA3 corresponding to FIG. 2 and wherein cross hatching is omitted for clarity according to the embodiment.
Figure 5B:
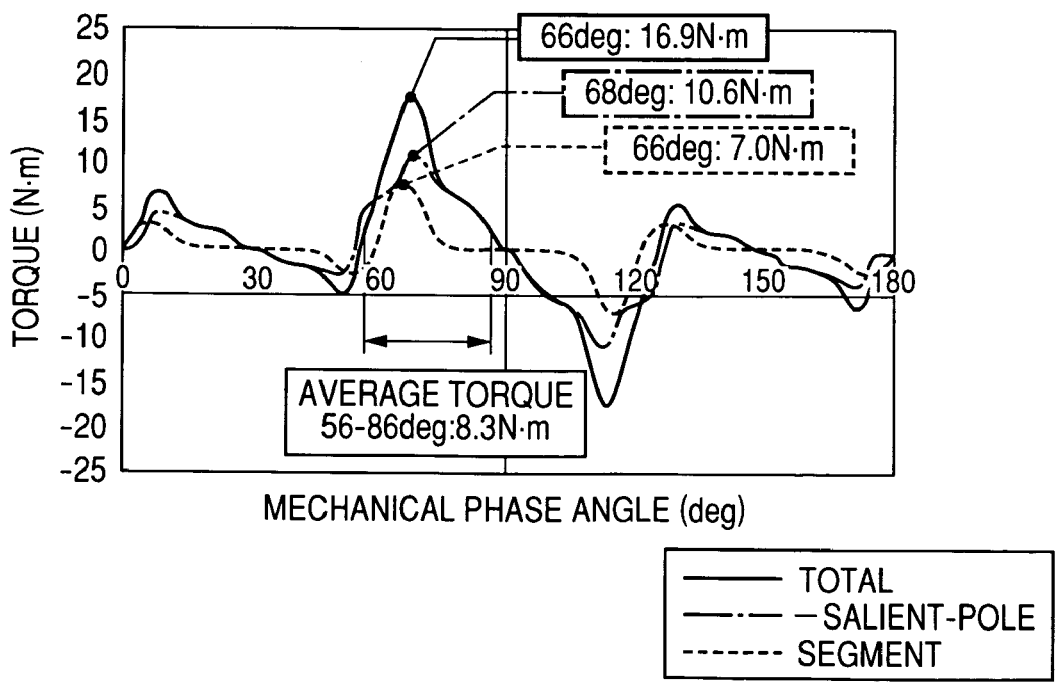
FIG. 5B is a graph schematically illustrating a torque characteristic curve obtained by a simulation based on the motor sample SA3.

FIG. 5A schematically illustrates the motor sample SA3, and FIG. 5B schematically illustrates the torque characteristic curve obtained by the simulation based on the motor sample SA3.

Each of paired segment magnetic-path portions 32X3 of the motor sample SA3 has a width in the center axis CA; this width being 20 percent lower than the width of a corresponding one of the paired segment magnetic-path portions 32.

Sample SA4

Figure 6A:
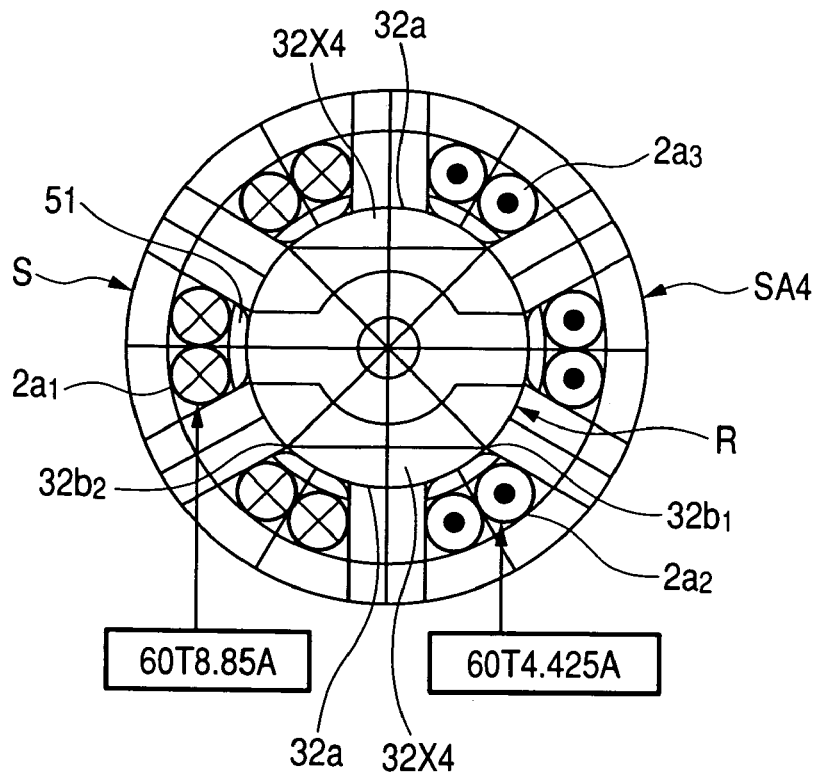
FIG. 6A is an enlarged lateral cross sectional view of a motor sample SA4 corresponding to FIG. 2 and wherein cross hatching is omitted for clarity according to the embodiment.
Figure 6B:
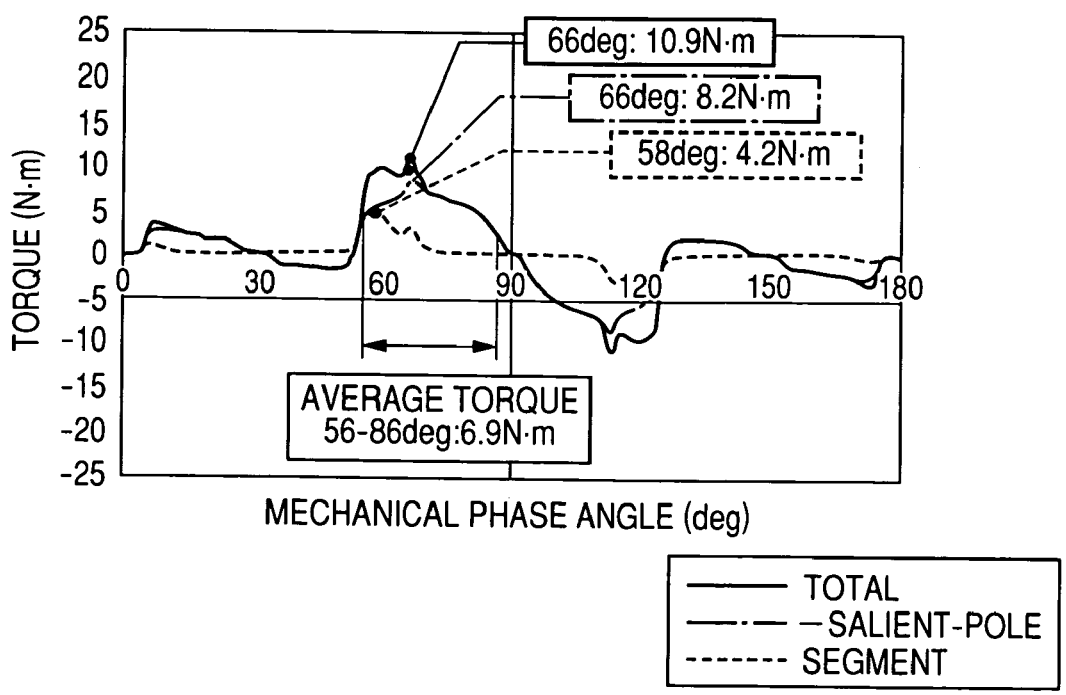
FIG. 6B is a graph schematically illustrating a torque characteristic curve obtained by a simulation based on the motor sample SA4.

FIG. 6A schematically illustrates the motor sample SA4, and FIG. 6B schematically illustrates the torque characteristic curve obtained by the simulation based on the motor sample SA4.

Each of paired segment magnetic-path portions 32X4 of the motor sample SA4 has the length Ds of the arc-shaped outer surface 32a thereof; this length Ds is longer than that of a corresponding one of the paired segment magnetic-path portions 32 (see FIG. 2). The length Ds is determined by the sum of the pitch P and the circumferential length of one slot 12; this circumferential length of one slot 12 is represented by "P−Dp" so that the length Ds is determined by "2P−Dp". The length Ds of the arc-shaped outer surface 32a of each of the paired segment magnetic-path portions 32X4 of the motor sample SA4 corresponds to an arc ratio of 90 degrees.

Sample SA5

Figure 7A:
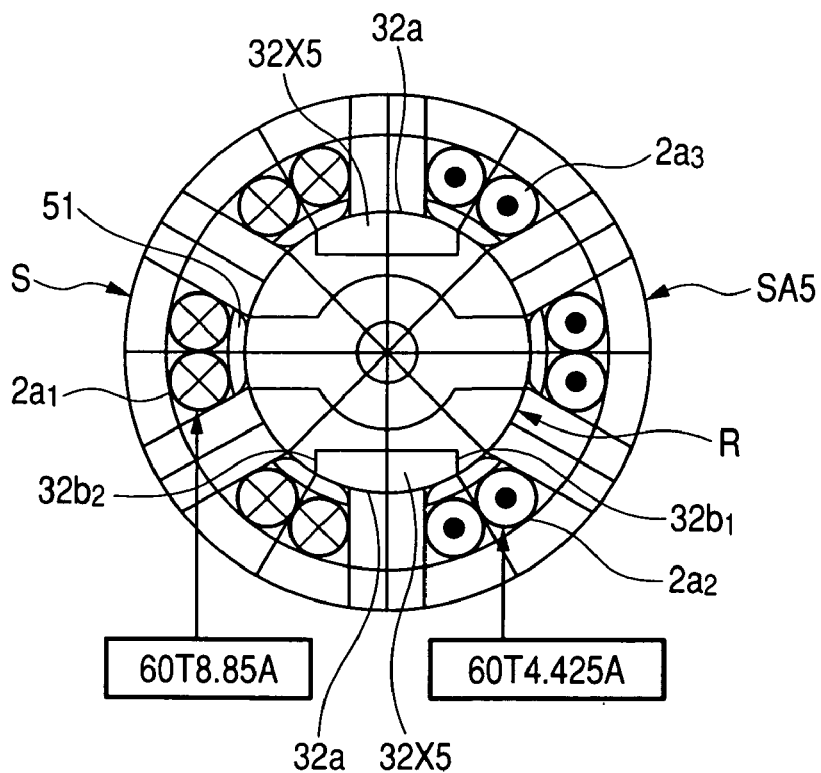
FIG. 7A is an enlarged lateral cross sectional view of a motor sample SA5 corresponding to FIG. 2 and wherein cross hatching is omitted for clarity according to the embodiment.
Figure 7B:
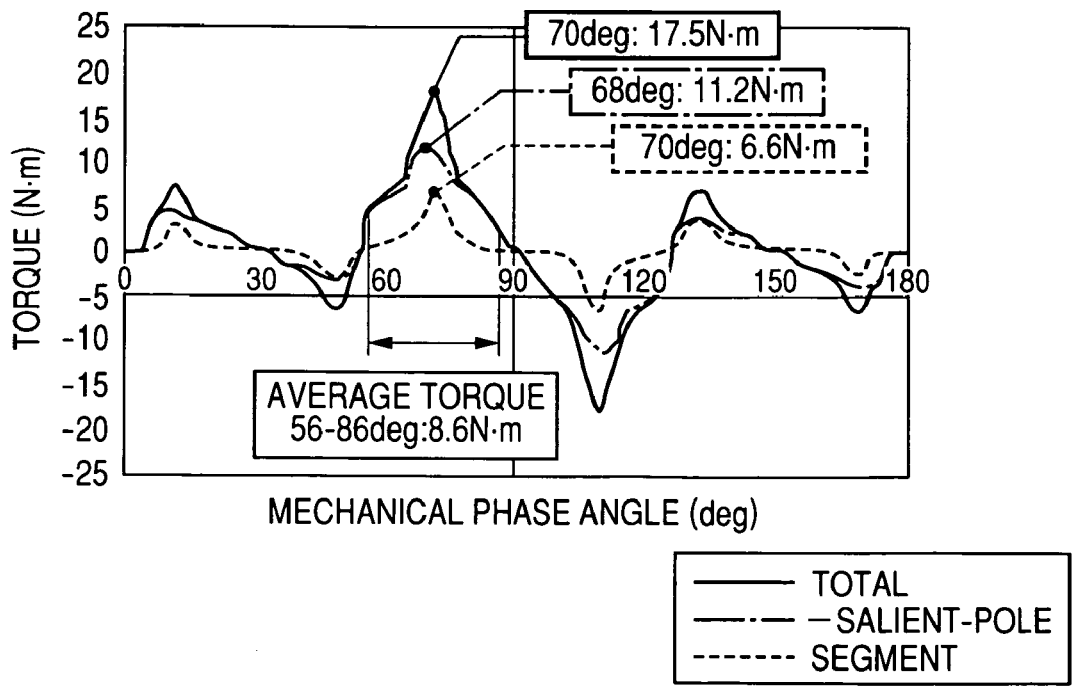
FIG. 7B is a graph schematically illustrating a torque characteristic curve obtained by a simulation based on the motor sample SA5.

FIG. 7A schematically illustrates the motor sample SA5, and FIG. 7B schematically illustrates the torque characteristic curve obtained by the simulation based on the motor sample SA5.

Each of paired segment magnetic-path portions 32X5 of the motor sample SA5 has the length Ds of the arc-shaped outer surface 32a thereof; this length Ds is determined to be shorter than that of the arc-shaped outer surface 32a of a corresponding one of the segment magnetic-path portions 32 (see FIG. 2); this length Ds is determined by "P". The length Ds of the arc-shaped outer surface 32a of each of the paired segment magnetic-path portions 32X5 of the motor sample SA5 corresponds to an arc ratio of 60 degrees.

Sample SA6

Figure 8A:
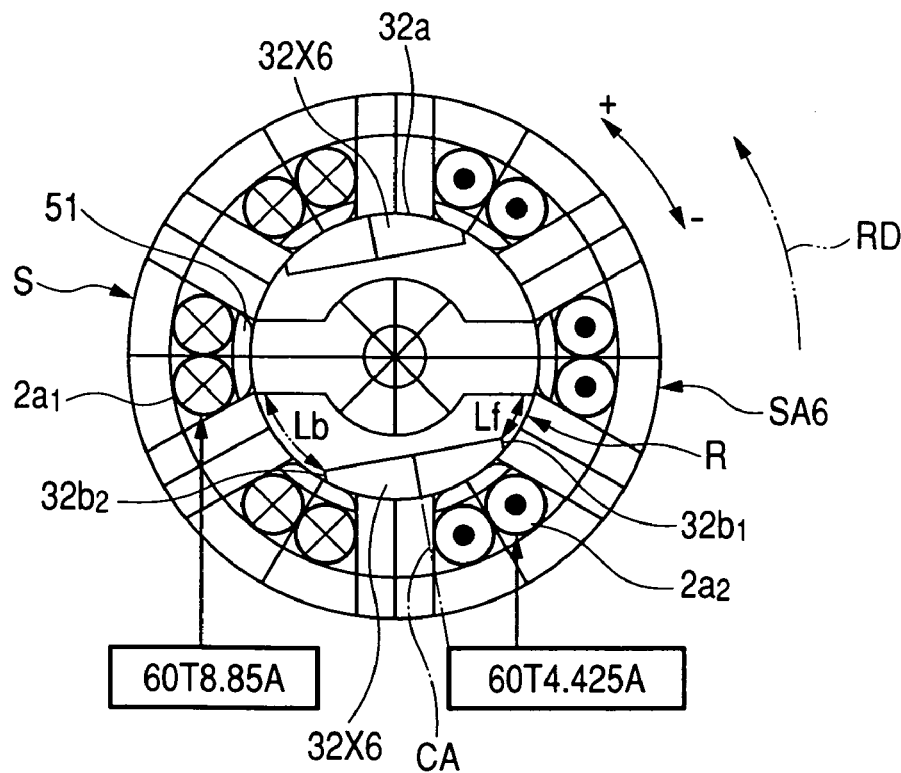
FIG. 8A is an enlarged lateral cross sectional view of a motor sample SA6 corresponding to FIG. 2 and wherein cross hatching is omitted for clarity according to the embodiment.
Figure 8B:
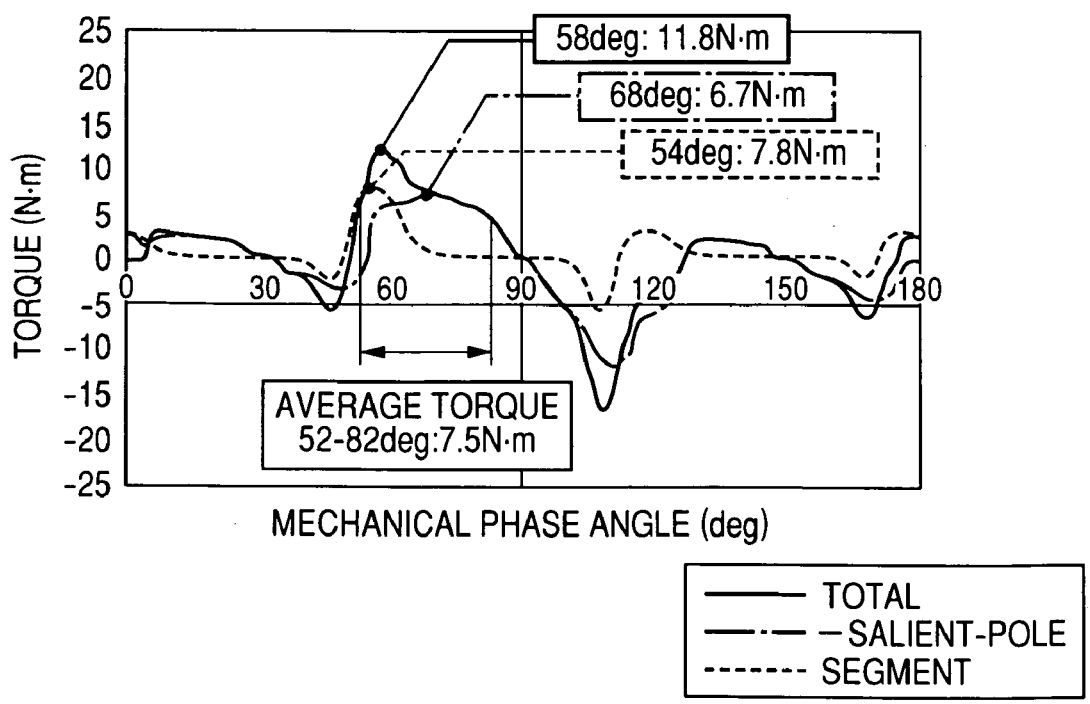
FIG. 8B is a graph schematically illustrating a torque characteristic curve obtained by a simulation based on the motor sample SA6.

FIG. 8A schematically illustrates the motor sample SA6, and FIG. 8B schematically illustrates the torque characteristic curve obtained by the simulation based on the motor sample SA6.

Each of paired segment magnetic-path portions 32X6 of the motor sample SA6 has the same structure as a corresponding one of the paired segment magnetic-path portions 32X1 illustrated in FIG. 3A.

In the motor sample SA6, both of paired segment magnetic-path portions 32X6 are arranged such that:

the center axis CA is inclined with respect to a direction orthogonal to the extending direction EA in the rotational direction RD of the rotor R by 10 degrees; and a circumferential distance Lf between the forward end of each of the paired segment magnetic-path portions 32X6 in the rotational direction RD and one of the salient poles 31 opposite thereto is equal to or lower than a circumferential distance Lb between the other end of each of the paired segment magnetic-path portions 32X6 and the other of the salient poles 31 opposite thereto.

Sample SA7

Figure 9A:
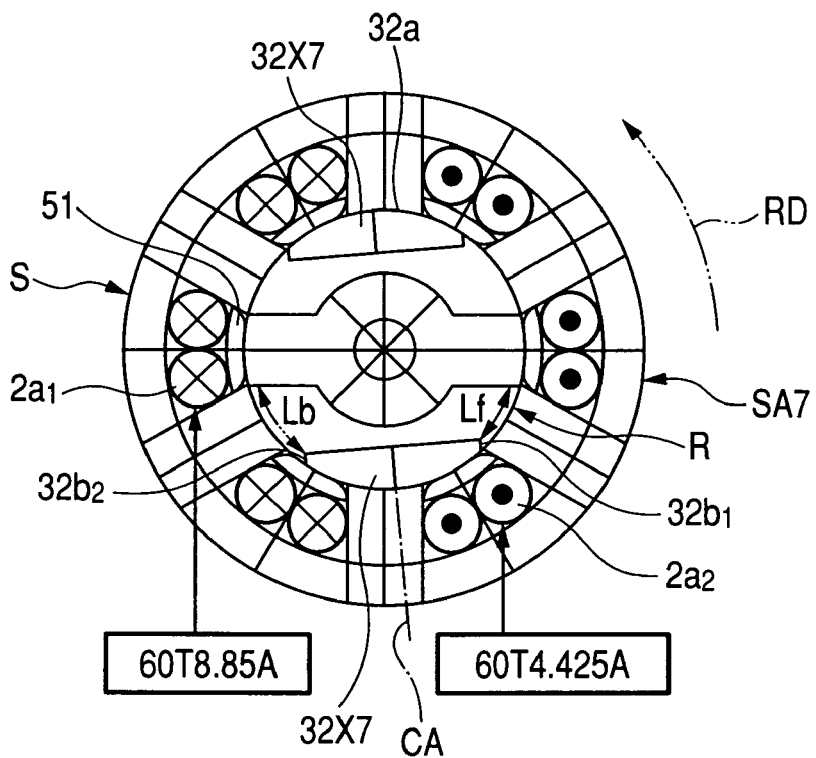
FIG. 9A is an enlarged lateral cross sectional view of a motor sample SA7 corresponding to FIG. 2 and wherein cross hatching is omitted for clarity according to the embodiment.
Figure 9B:
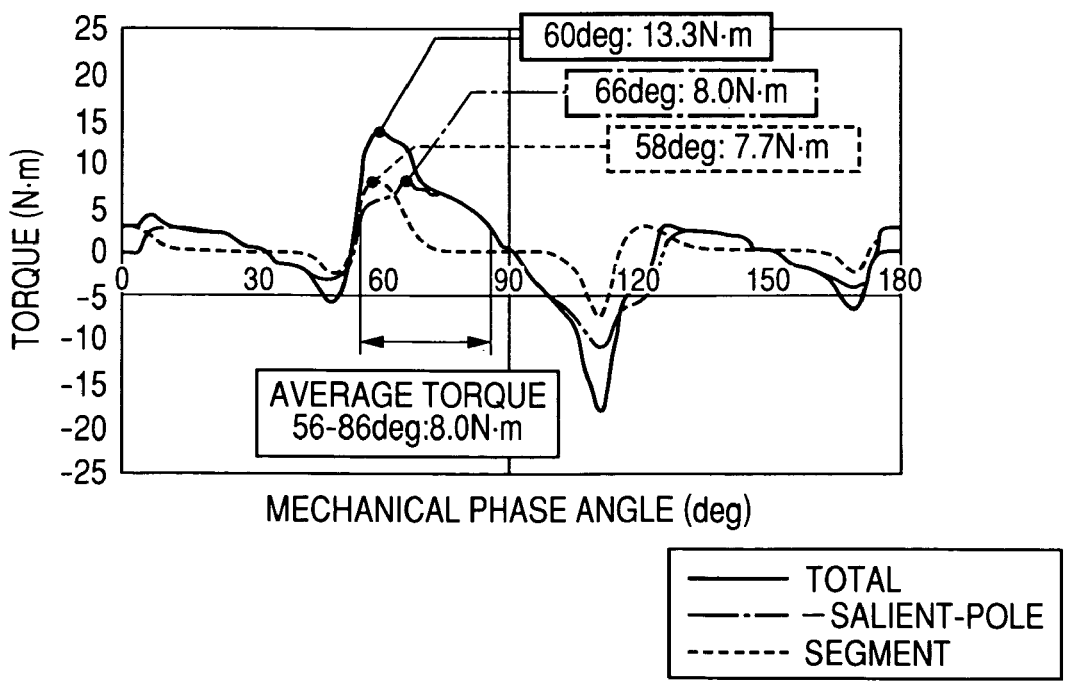
FIG. 9B is a graph schematically illustrating a torque characteristic curve obtained by a simulation based on the motor sample SA7.

FIG. 9A schematically illustrates the motor sample SA7, and FIG. 9B schematically illustrates the torque characteristic curve obtained by the simulation based on the motor sample SA7.

Each of paired segment magnetic-path portions 32X7 of the motor sample SA7 has the same structure as a corresponding one of the paired segment magnetic-path portions 32X1 illustrated in FIG. 3A.

In the motor sample SA7, both of paired segment magnetic-path portions 32X7 are arranged such that:

the center axis CA is inclined with respect to a direction orthogonal to the extending direction EA in the rotational direction RD of the rotor R by 5 degrees; and the circumferential distance Lf is equal to or lower than the circumferential distance Lb.

Sample SA8

Figure 10A:
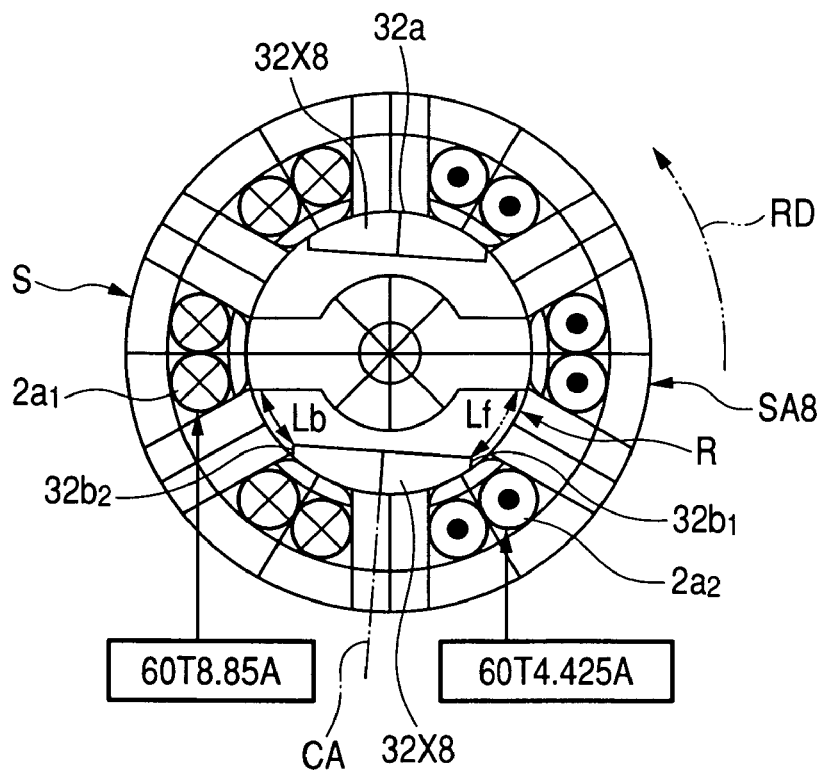
FIG. 10A is an enlarged lateral cross sectional view of a motor sample SA8 corresponding to FIG. 2 and wherein cross hatching is omitted for clarity according to the embodiment.
Figure 10B:
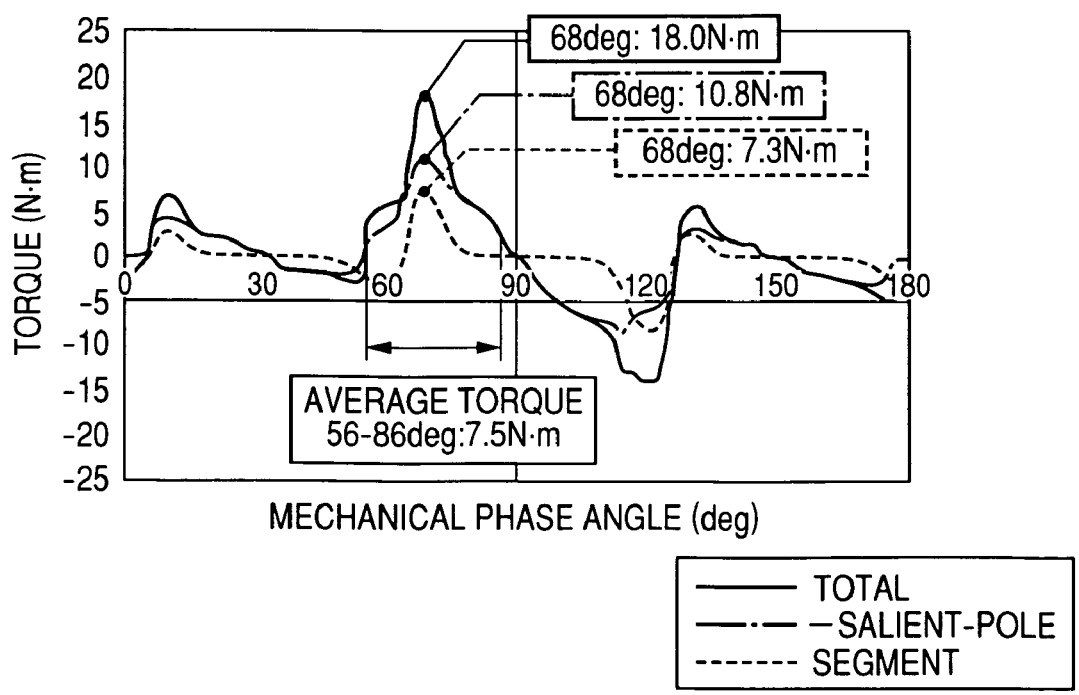
FIG. 10B is a graph schematically illustrating a torque characteristic curve obtained by a simulation based on the motor sample SA8.

FIG. 10A schematically illustrates the motor sample SA8, and FIG. 10B schematically illustrates the torque characteristic curve obtained by the simulation based on the motor sample SA8.

Each of paired segment magnetic-path portions 32X8 of the motor sample SA8 has the same structure as a corresponding one of the paired segment magnetic-path portions 32X1 illustrated in FIG. 3A.

In the motor sample SA8, both of paired segment magnetic-path portions 32X8 are arranged such that:

the center axis CA is inclined with respect to a direction orthogonal to the extending direction EA in a direction opposite to the rotational direction RD of the rotor R by 5 degrees; and the circumferential distance Lf is equal to or greater than the circumferential distance Lb.

Sample SA9

Figure 11A:
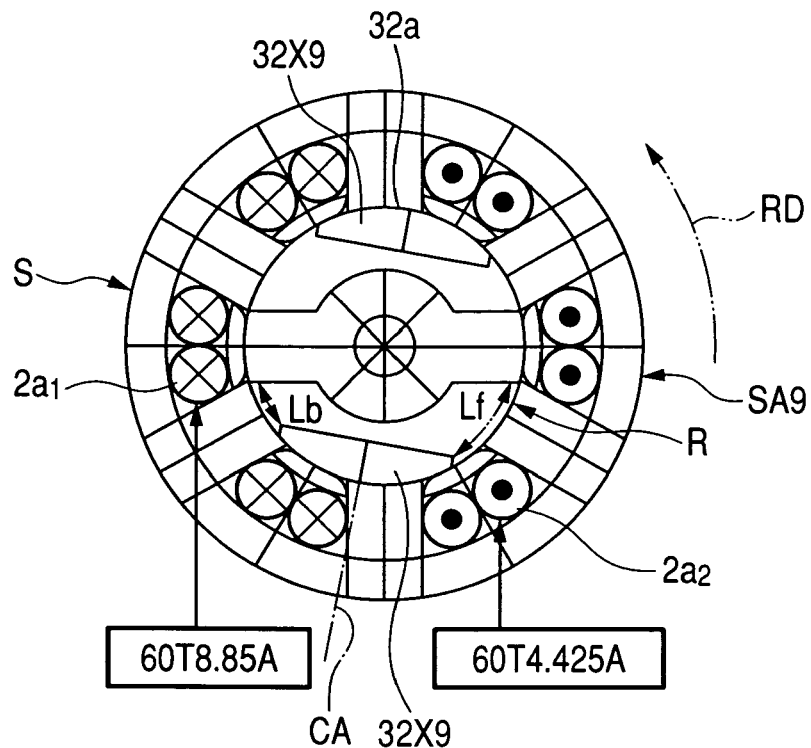
FIG. 11A is an enlarged lateral cross sectional view of a motor sample SA9 corresponding to FIG. 2 and wherein cross hatching is omitted for clarity according to the embodiment.
Figure 11B:
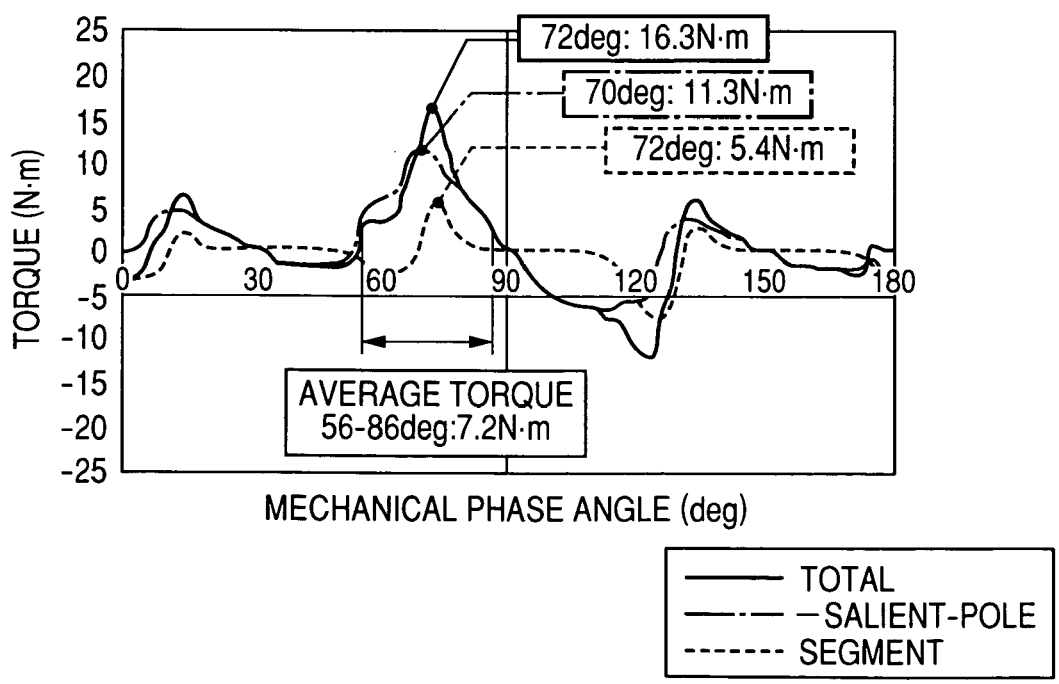
FIG. 11B is a graph schematically illustrating a torque characteristic curve obtained by a simulation based on the motor sample SA9.

FIG. 11A schematically illustrates the motor sample SA9, and FIG. 11B schematically illustrates the torque characteristic curve obtained by the simulation based on the motor sample SA9.

Each of paired segment magnetic-path portions 32X9 of the motor sample SA9 has the same structure as a corresponding one of the paired segment magnetic-path portions 32X1 illustrated in FIG. 3A.

In the motor sample SA9, both of paired segment magnetic-path portions 32X9 are arranged such that:

the center axis CA is inclined with respect to a direction orthogonal to the extending direction EA in a direction opposite to the rotational direction RD of the rotor R by 10 degrees; and the circumferential distance Lf is equal to or greater than the circumferential distance Lb.

The samples SA10 to SA18 are each comprised of no teeth.

Sample SA10

Figure 12A:
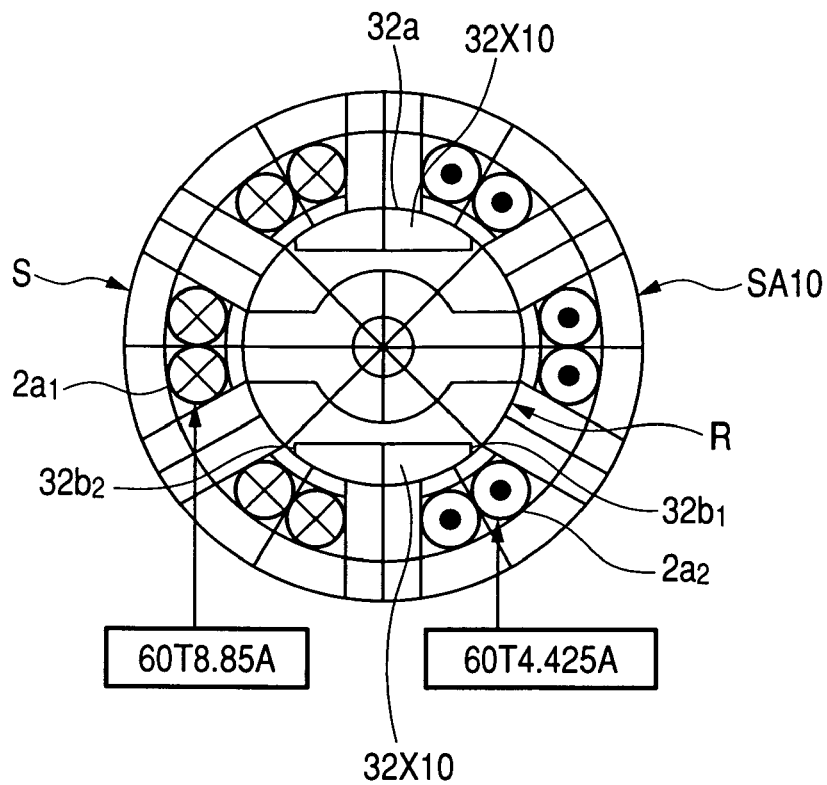
FIG. 12A is an enlarged lateral cross sectional view of a motor sample SA10 corresponding to FIG. 2 and wherein cross hatching is omitted for clarity according to the embodiment.
Figure 12B:
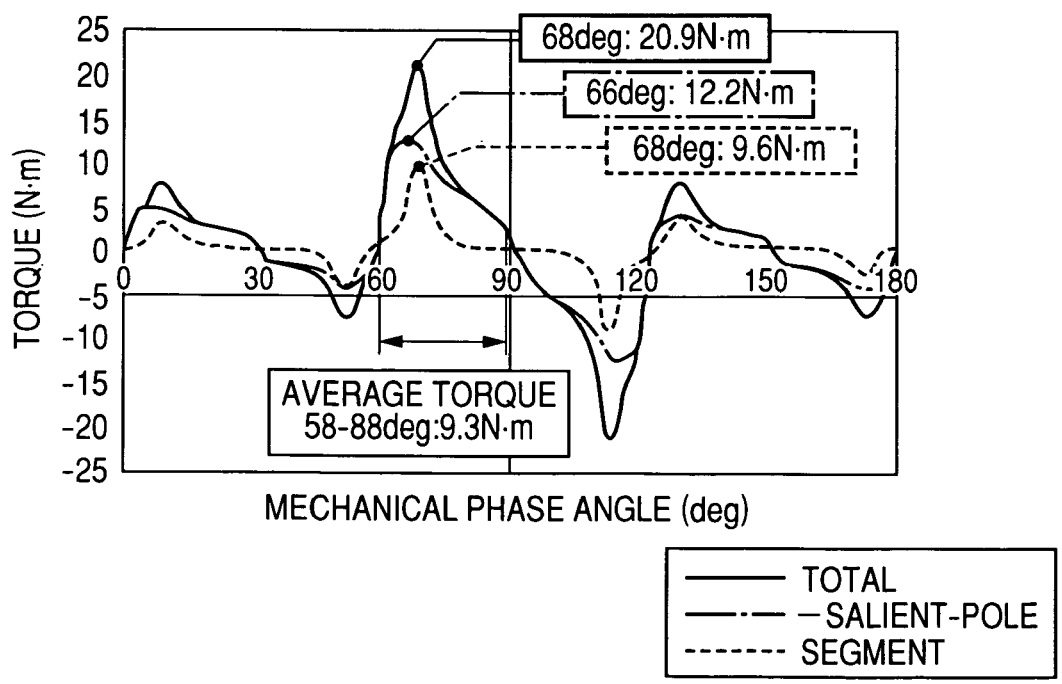
FIG. 12B is a graph schematically illustrating a torque characteristic curve obtained by a simulation based on the motor sample SA10.

FIG. 12A schematically illustrates the motor sample SA10, and FIG. 12B schematically illustrates the torque characteristic curve obtained by the simulation based on the motor sample SA10.

Each of paired segment magnetic-path portions 32X10 of the motor sample SA10 has the same shape as a corresponding one of the paired segment magnetic-path portions 32X1.

Like each of the paired segment magnetic-path portions 32X1, the length Ds of the arc-shaped outer surface 32a of each of the paired segment magnetic-path portions 32X10 of the motor sample SA10 is determined by "2P−Dp−α"; this length Ds corresponds to an arc ratio of 75 degrees.

Sample SA11

Figure 13A:
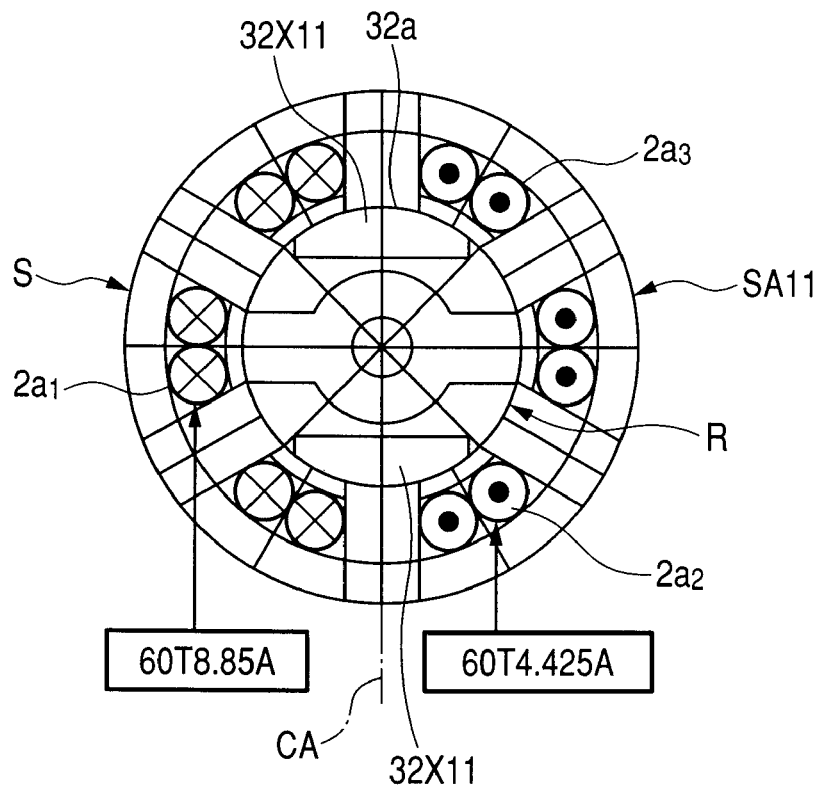
FIG. 13A is an enlarged lateral cross sectional view of a motor sample SA11 corresponding to FIG. 2 and wherein cross hatching is omitted for clarity according to the embodiment.
Figure 13B:
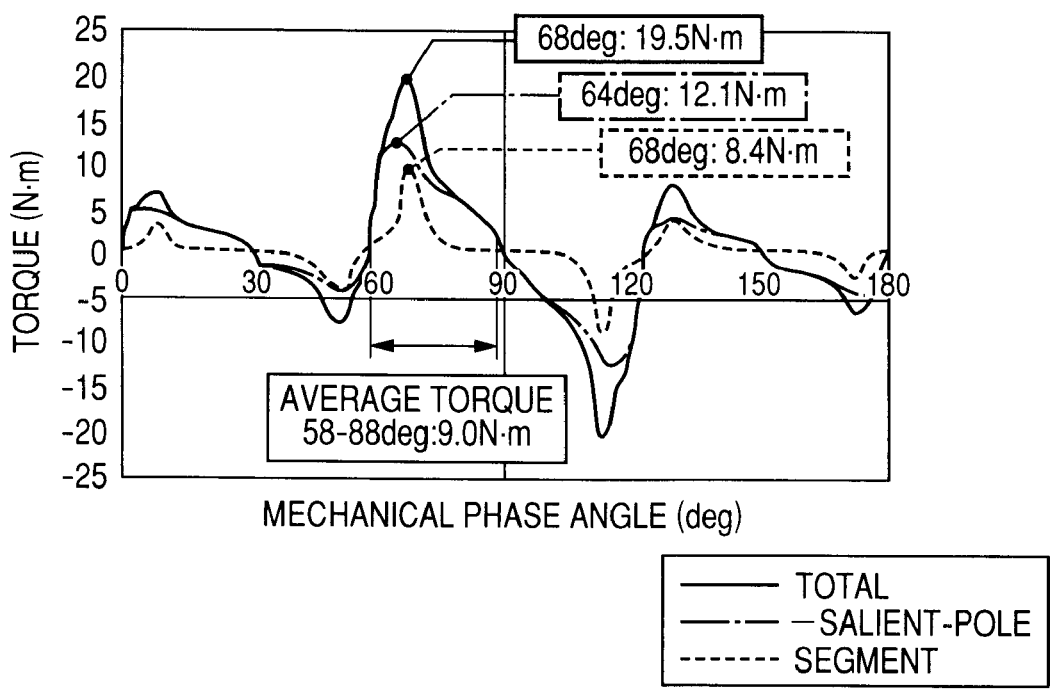
FIG. 13B is a graph schematically illustrating a torque characteristic curve obtained by a simulation based on the motor sample SA11.

FIG. 13A schematically illustrates the motor sample SA11, and FIG. 13B schematically illustrates the torque characteristic curve obtained by the simulation based on the motor sample SA11.

Each of paired segment magnetic-path portions 32X11 of the motor sample SA11 has a width in the center axis CA; this width being 20 percent higher than the width of a corresponding one of the paired segment magnetic-path portions 32.

Sample SA12

Figure 14A:
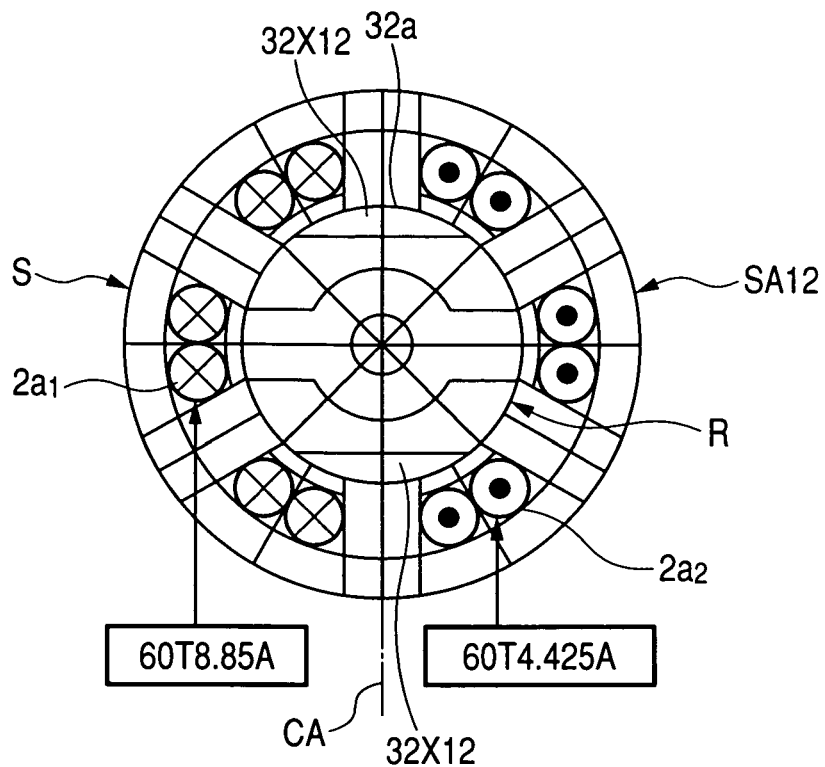
FIG. 14A is an enlarged lateral cross sectional view of a motor sample SA12 corresponding to FIG. 2 and wherein cross hatching is omitted for clarity according to the embodiment.
Figure 14B:
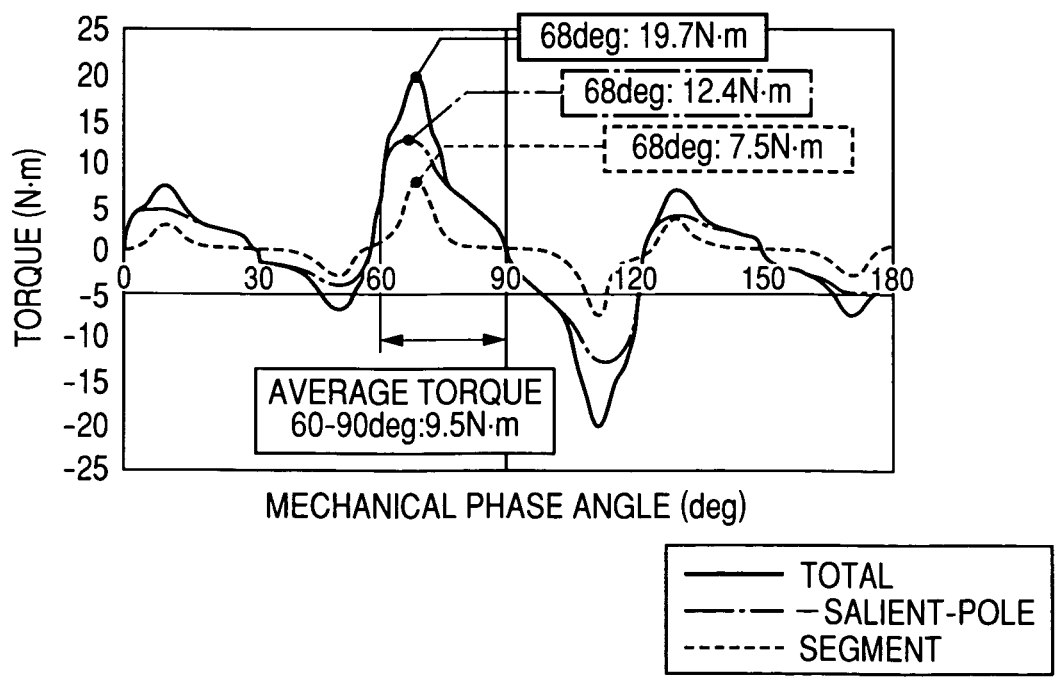
FIG. 14B is a graph schematically illustrating a torque characteristic curve obtained by a simulation based on the motor sample SA12.

FIG. 14A schematically illustrates the motor sample SA12, and FIG. 14B schematically illustrates the torque characteristic curve obtained by the simulation based on the motor sample SA12.

Each of paired segment magnetic-path portions 32X12 of the motor sample SA12 has a width in the center axis CA; this width being 20 percent lower than the width of a corresponding one of the paired segment magnetic-path portions 32.

Sample SA13

Figure 15A:
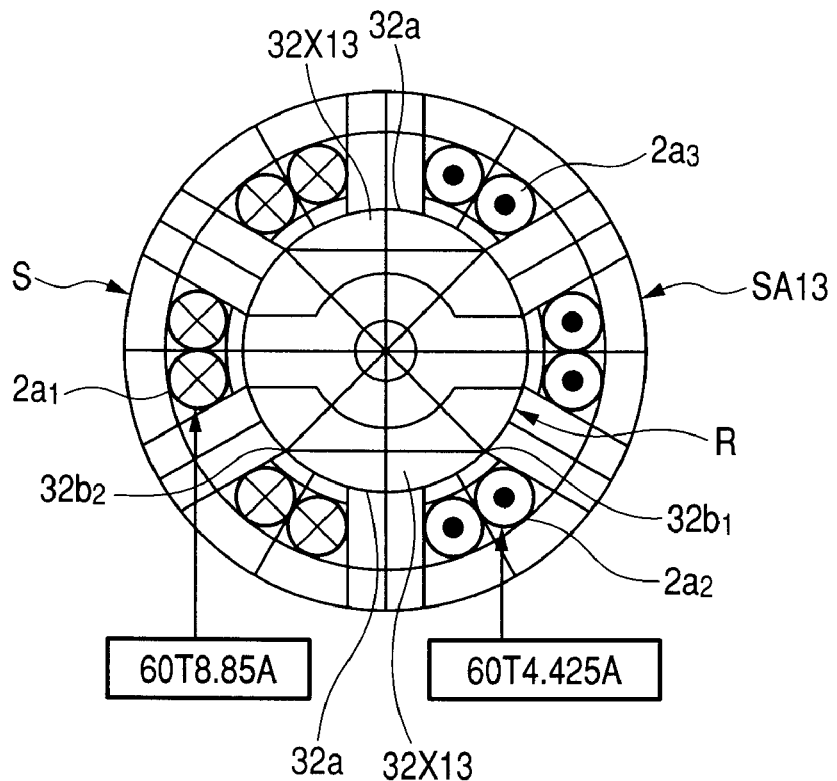
FIG. 15A is an enlarged lateral cross sectional view of a motor sample SA13 corresponding to FIG. 2 and wherein cross hatching is omitted for clarity according to the embodiment.
Figure 15B:
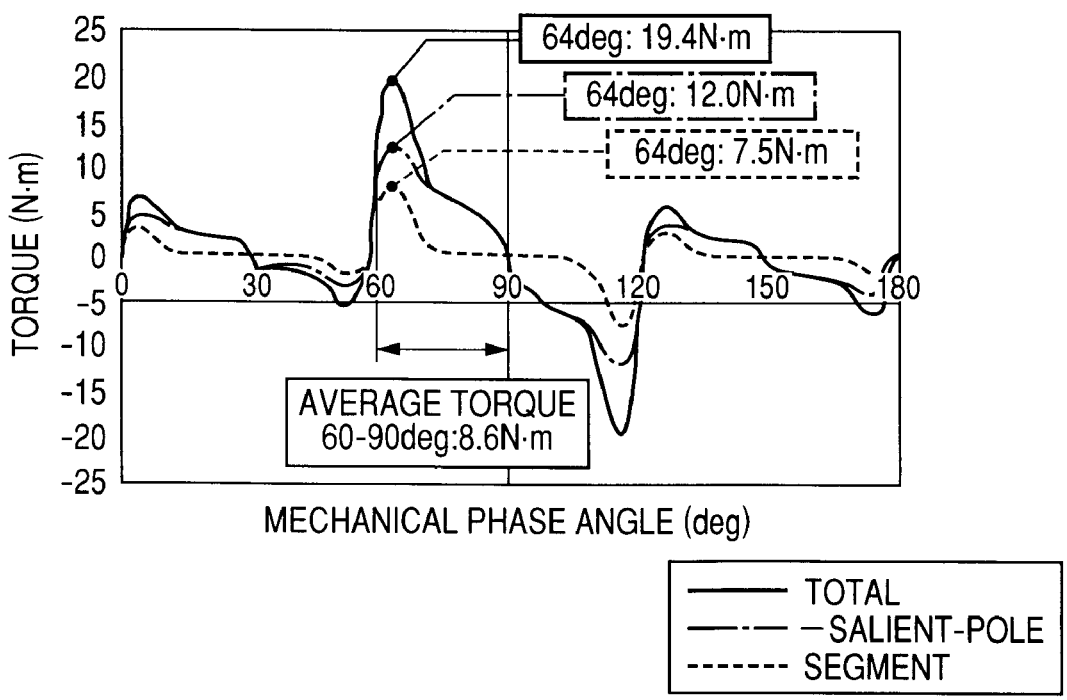
FIG. 15B is a graph schematically illustrating a torque characteristic curve obtained by a simulation based on the motor sample SA13.

FIG. 15A schematically illustrates the motor sample SA13, and FIG. 15B schematically illustrates the torque characteristic curve obtained by the simulation based on the motor sample SA13.

Each of paired segment magnetic-path portions 32X13 of the motor sample SA13 has the length Ds of the arc-shaped outer surface 32a thereof; this length Ds is longer than that of a corresponding one of the paired segment magnetic-path portions 32 (see FIG. 2). The length Ds is determined by the sum of the pitch P and the circumferential length of one slot 12; this circumferential length of one slot 12 is represented by "P–Dp" so that the length Ds is determined by "2P–Dp". The length Ds of the arc-shaped outer surface 32a of each of the paired segment magnetic-path portions 32X13 of the motor sample SA13 corresponds to an arc ratio of 90 degrees.

Sample SA14

Figure 16A:
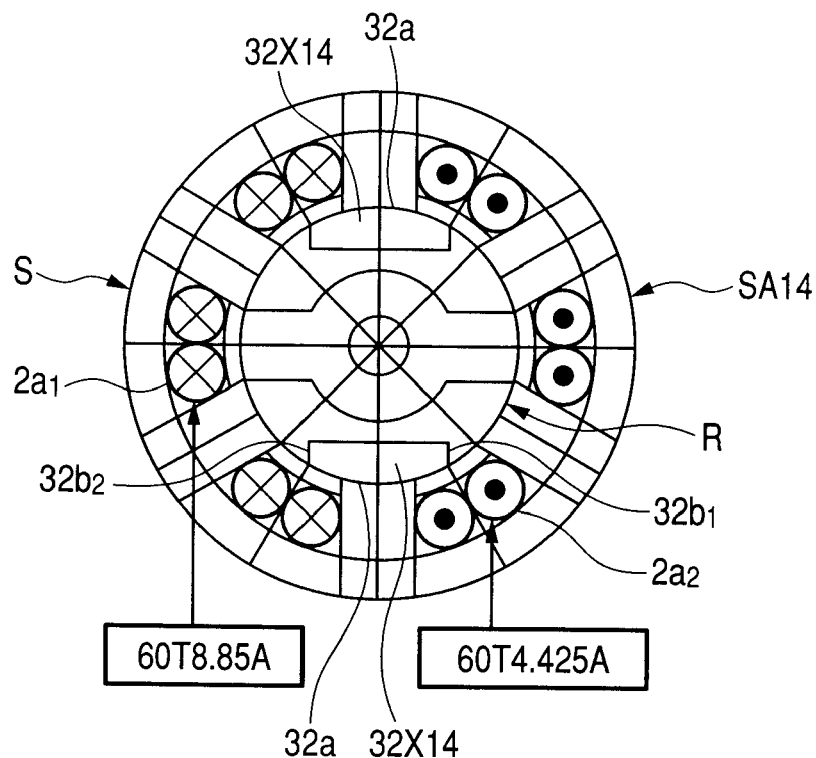
FIG. 16A is an enlarged lateral cross sectional view of a motor sample SA14 corresponding to FIG. 2 and wherein cross hatching is omitted for clarity according to the embodiment.
Figure 16B:
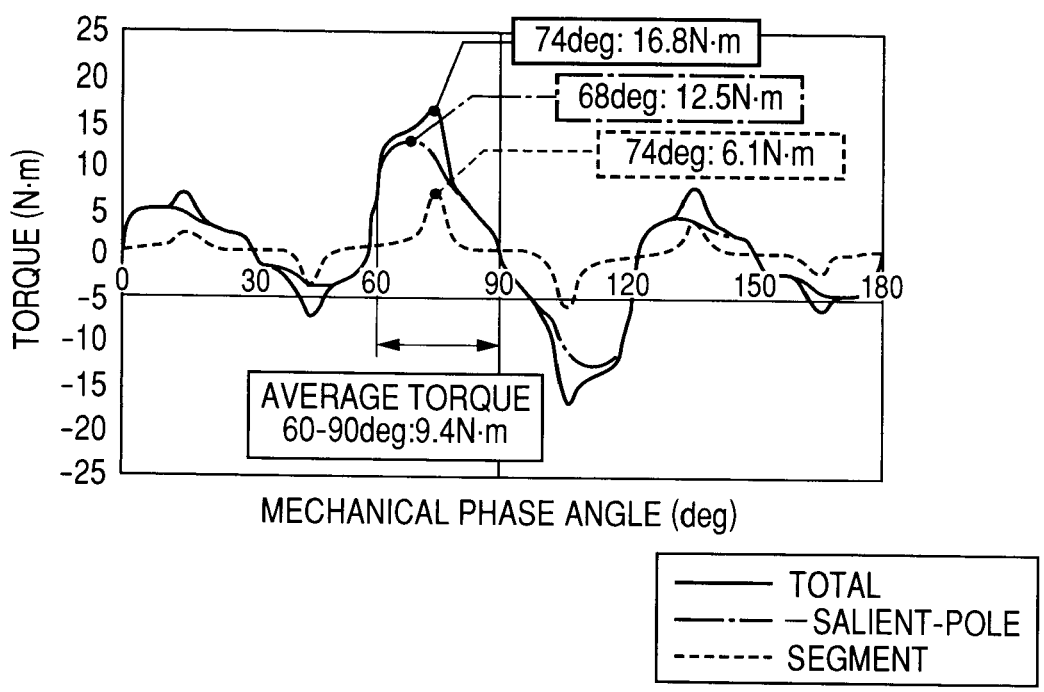
FIG. 16B is a graph schematically illustrating a torque characteristic curve obtained by a simulation based on the motor sample SA14.

FIG. 16A schematically illustrates the motor sample SA14, and FIG. 16B schematically illustrates the torque characteristic curve obtained by the simulation based on the motor sample SA14.

Each of paired segment magnetic-path portions 32X14 of the motor sample SA14 has the length Ds of the arc-shaped outer surface 32a thereof; this length Ds is determined to be shorter than that of the arc-shaped outer surface 32a of a corresponding one of the segment magnetic-path portions 32 (see FIG. 2); this length Ds is determined by "P". The length Ds of the arc-shaped outer surface 32a of each of the paired segment magnetic-path portions 32X14 of the motor sample SA14 corresponds to an arc ratio of 60 degrees.

Sample SA15

Figure 17A:
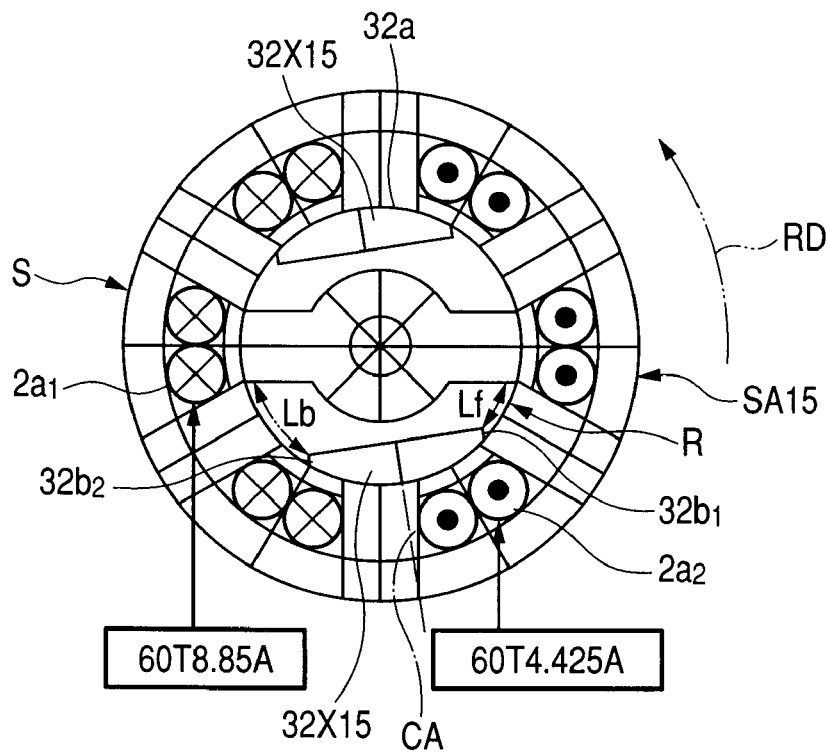
FIG. 17A is an enlarged lateral cross sectional view of a motor sample SA15 corresponding to FIG. 2 and wherein cross hatching is omitted for clarity according to the embodiment.
Figure 17B:
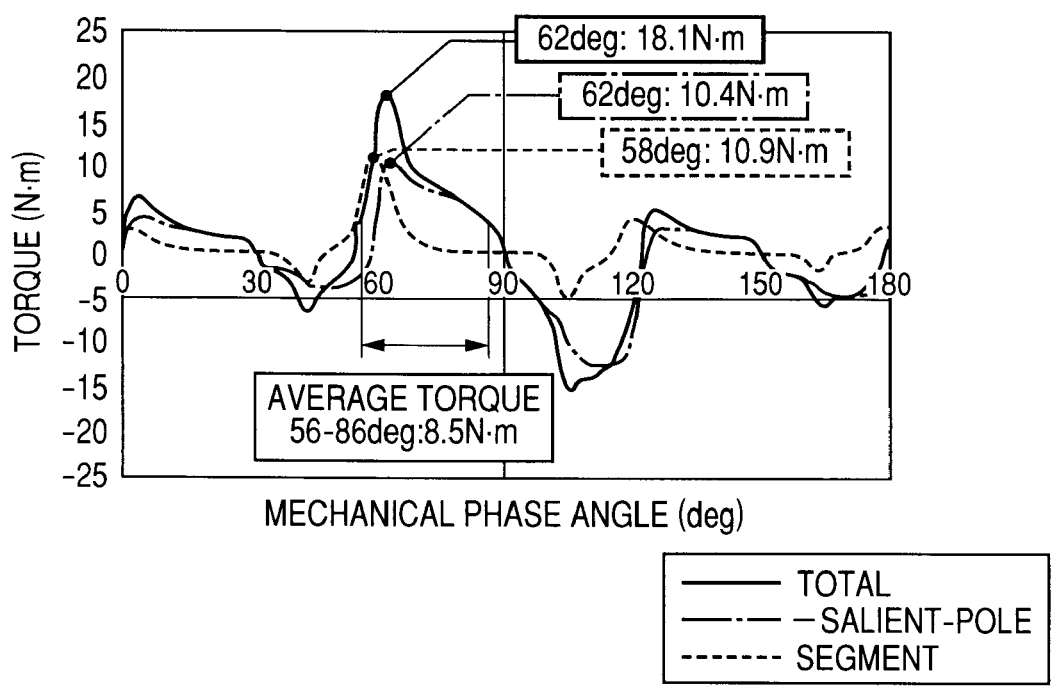
FIG. 17B is a graph schematically illustrating a torque characteristic curve obtained by a simulation based on the motor sample SA15.

FIG. 17A schematically illustrates the motor sample SA15, and FIG. 17B schematically illustrates the torque characteristic curve obtained by the simulation based on the motor sample SA15.

Each of paired segment magnetic-path portions 32X15 of the motor sample SA15 has the same structure as a corresponding one of the paired segment magnetic-path portions 32X1 illustrated in FIG. 3A.

In the motor sample SA15, both of paired segment magnetic-path portions 32X15 are arranged such that:

the center axis CA is inclined with respect to a direction orthogonal to the extending direction EA in the rotational direction RD of the rotor R by 10 degrees; and the circumferential distance Lf is equal to or lower than the circumferential distance Lb.

Sample SA16

Figure 18A:
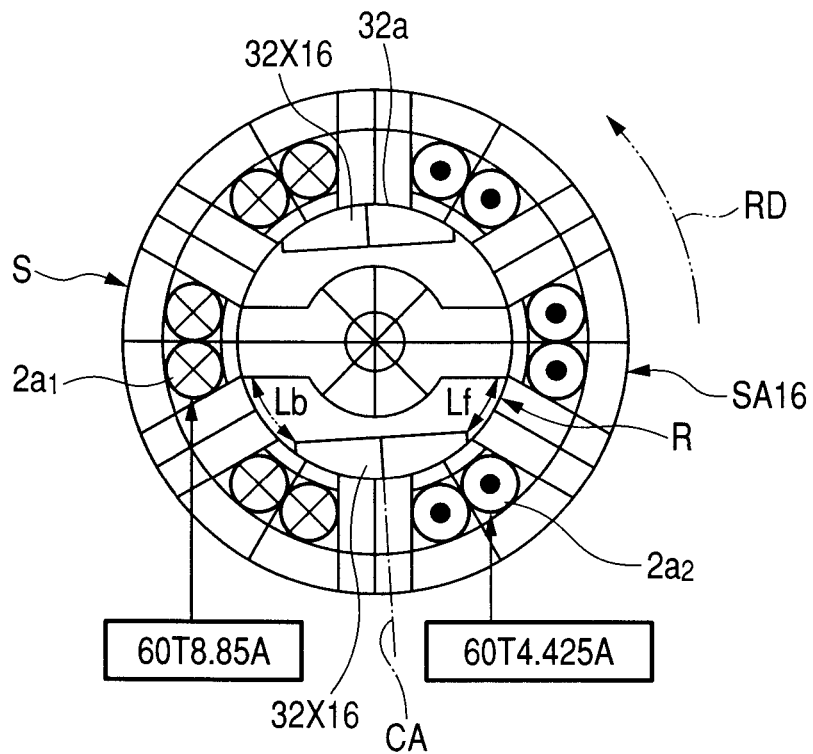
FIG. 18A is an enlarged lateral cross sectional view of a motor sample SA16 corresponding to FIG. 2 and wherein cross hatching is omitted for clarity according to the embodiment.
Figure 18B:
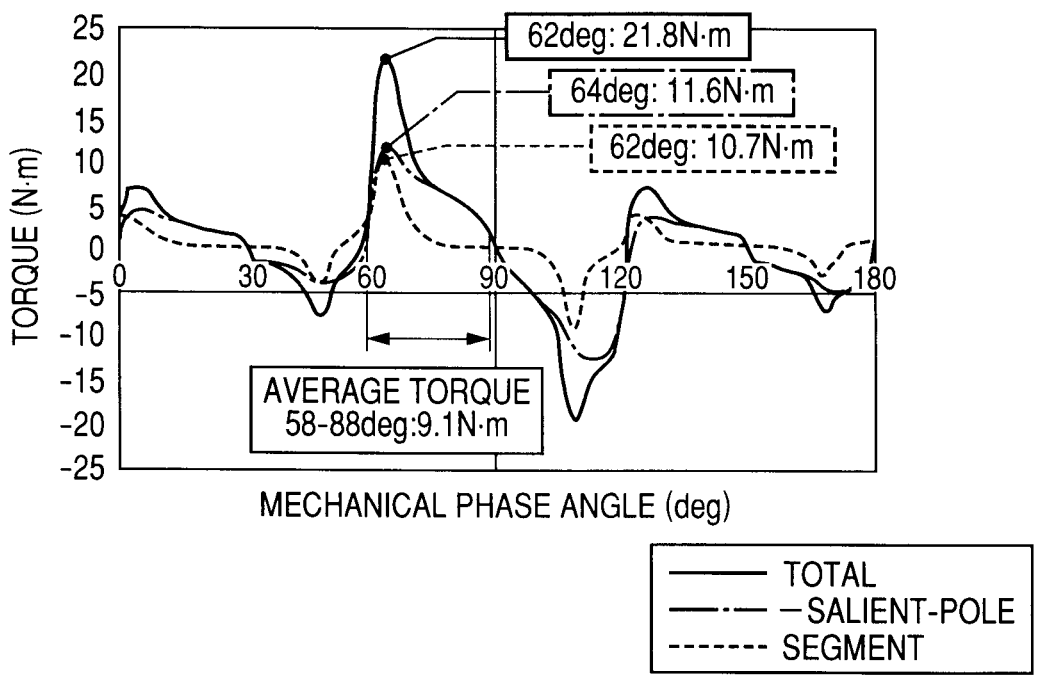
FIG. 18B is a graph schematically illustrating a torque characteristic curve obtained by a simulation based on the motor sample SA16.

FIG. 18A schematically illustrates the motor sample SA16, and FIG. 18B schematically illustrates the torque characteristic curve obtained by the simulation based on the motor sample SA16.

Each of paired segment magnetic-path portions 32X16 of the motor sample SA16 has the same structure as a corresponding one of the paired segment magnetic-path portions 32X1 illustrated in FIG. 3A.

In the motor sample SA16, both of paired segment magnetic-path portions 32X16 are arranged such that:

the center axis CA is inclined with respect to a direction orthogonal to the extending direction EA in the rotational direction RD of the rotor R by 5 degrees; and the circumferential distance Lf is equal to or lower than the circumferential distance Lb.

Sample SA17

Figure 19A:
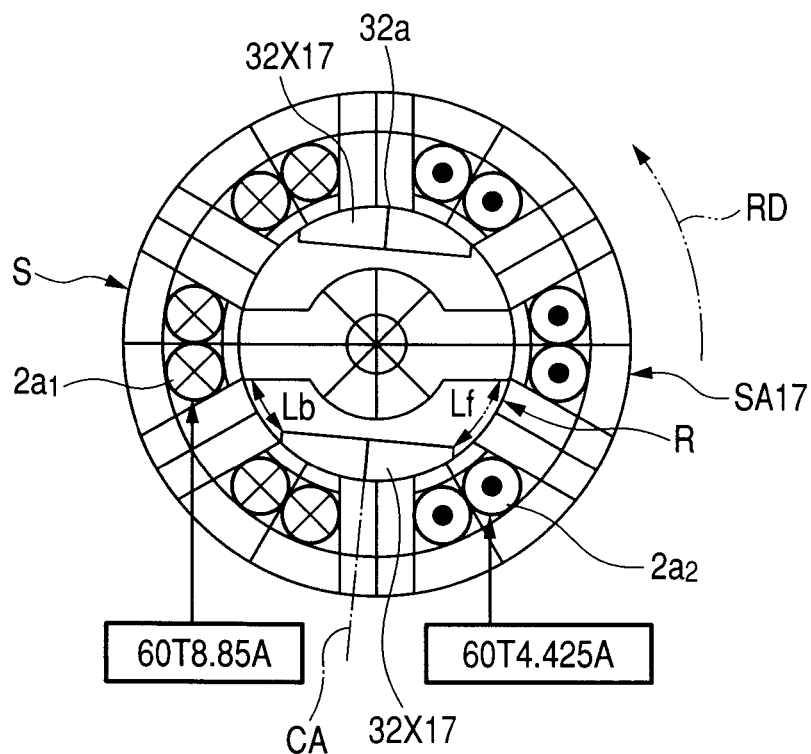
FIG. 19A is an enlarged lateral cross sectional view of a motor sample SA17 corresponding to FIG. 2 and wherein cross hatching is omitted for clarity according to the embodiment.
Figure 19B:
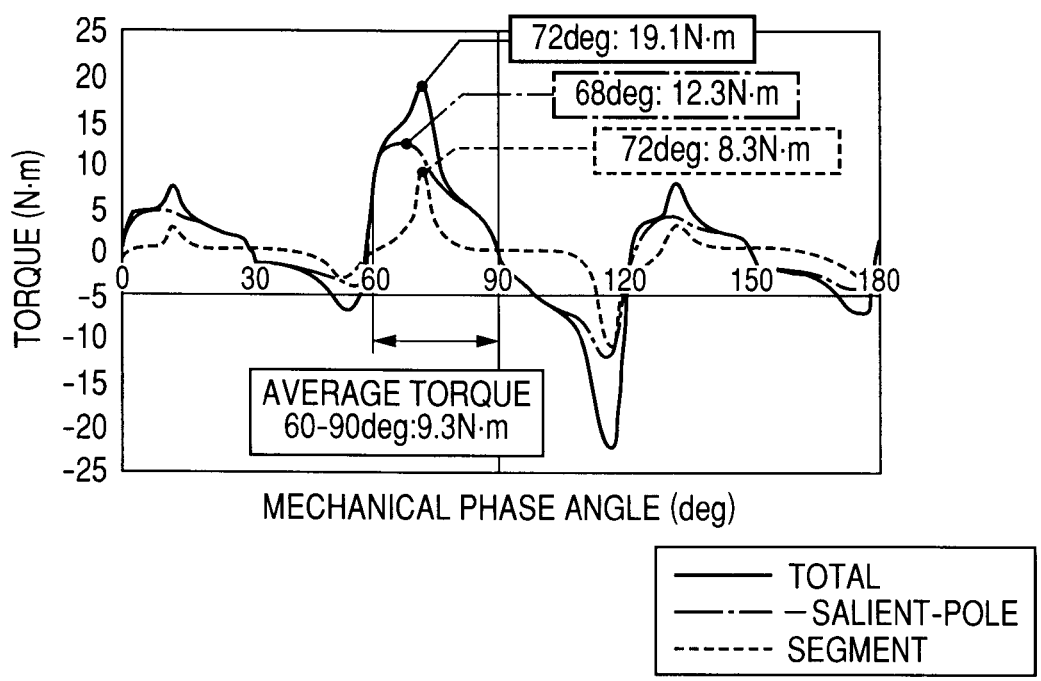
FIG. 19B is a graph schematically illustrating a torque characteristic curve obtained by a simulation based on the motor sample SA17.

FIG. 19A schematically illustrates the motor sample SA17, and FIG. 19B schematically illustrates the torque characteristic curve obtained by the simulation based on the motor sample SA17.

Each of paired segment magnetic-path portions 32X17 of the motor sample SA17 has the same structure as a corresponding one of the paired segment magnetic-path portions 32X1 illustrated in FIG. 3A.

In the motor sample SA17, both of paired segment magnetic-path portions 32X17 are arranged such that:

the center axis CA is inclined with respect to a direction orthogonal to the extending direction EA in a direction opposite to the rotational direction RD of the rotor R by 5 degrees; and the circumferential distance Lf is equal to or longer than the circumferential distance Lb.

Sample SA18

Figure 20A:
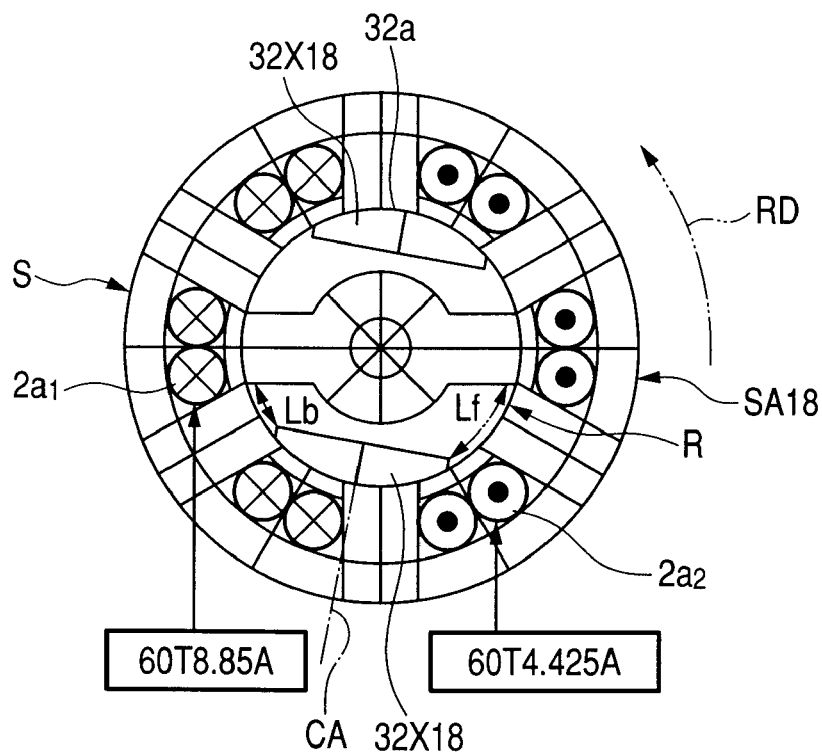
FIG. 20A is an enlarged lateral cross sectional view of a motor sample SA18 corresponding to FIG. 2 and wherein cross hatching is omitted for clarity according to the embodiment.
Figure 20B:
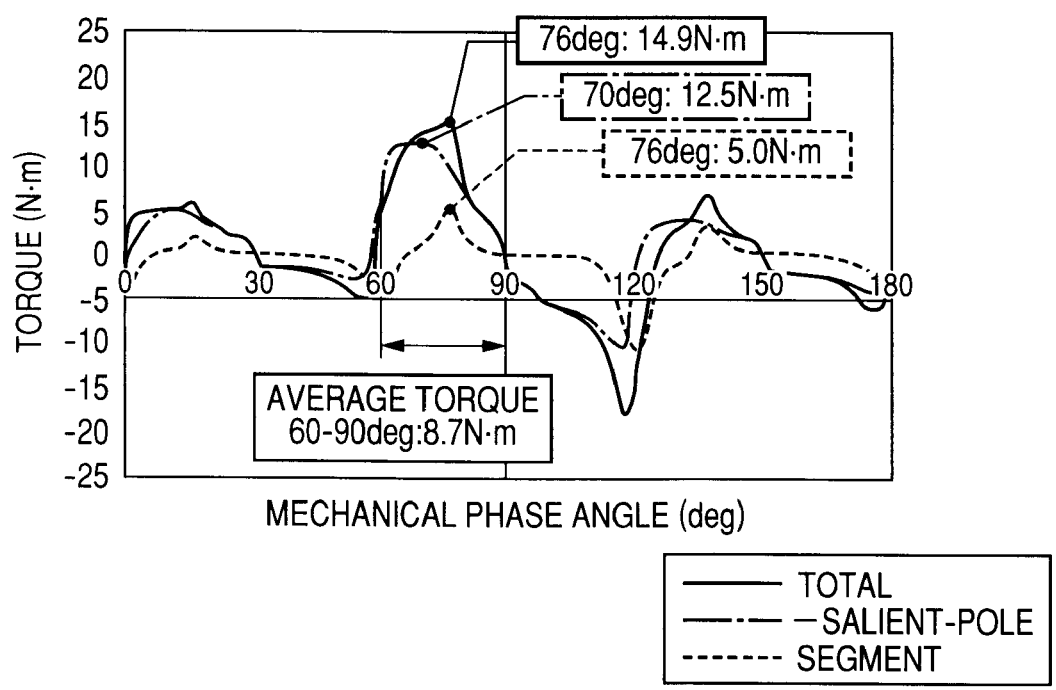
FIG. 20B is a graph schematically illustrating a torque characteristic curve obtained by a simulation based on the motor sample SA18.

FIG. 20A schematically illustrates the motor sample SA18, and FIG. 20B schematically illustrates the torque characteristic curve obtained by the simulation based on the motor sample SA18.

Each of paired segment magnetic-path portions 32X18 of the motor sample SA18 has the same structure as a corresponding one of the paired segment magnetic-path portions 32X1 illustrated in FIG. 3A.

In the motor sample SA18, both of paired segment magnetic-path portions 32X18 are arranged such that:

the center axis CA is inclined with respect to a direction orthogonal to the extending direction EA in a direction opposite to the rotational direction RD of the rotor R by 10 degrees; and the circumferential distance Lf is equal to or longer than the circumferential distance Lb.

The graphs illustrated in FIGS. 21B to 38B for the respective samples SA19 to SA36 were obtained in the first two-phase energizing pattern. Specifically, the drive circuit 15 works to cause the drive current of, for example, 8.85 amperes to flow through one-phase winding 2a1 of three-phase stator windings 2 in star configuration, and thereafter, through another one-phase winding 2a2 thereof in series via the neutral point.

The samples SA19 to SA27 are each comprised of teeth 51 installed in the inner peripheral portions of the slots 12, respectively.

Sample SA19

Figure 21A:
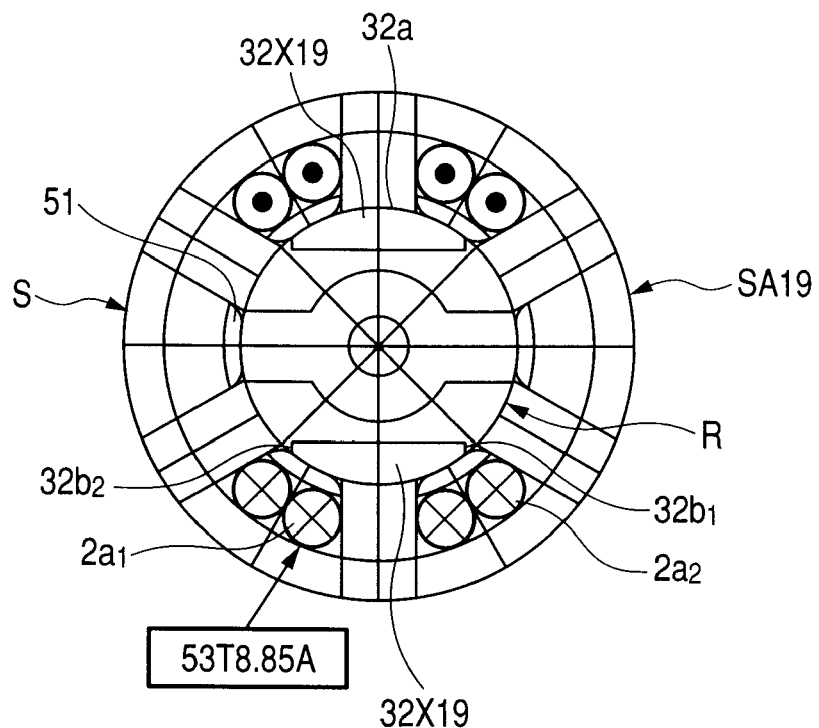
FIG. 21A is an enlarged lateral cross sectional view of a motor sample SA19 corresponding to FIG. 2 and wherein cross hatching is omitted for clarity according to the embodiment.
Figure 21B:
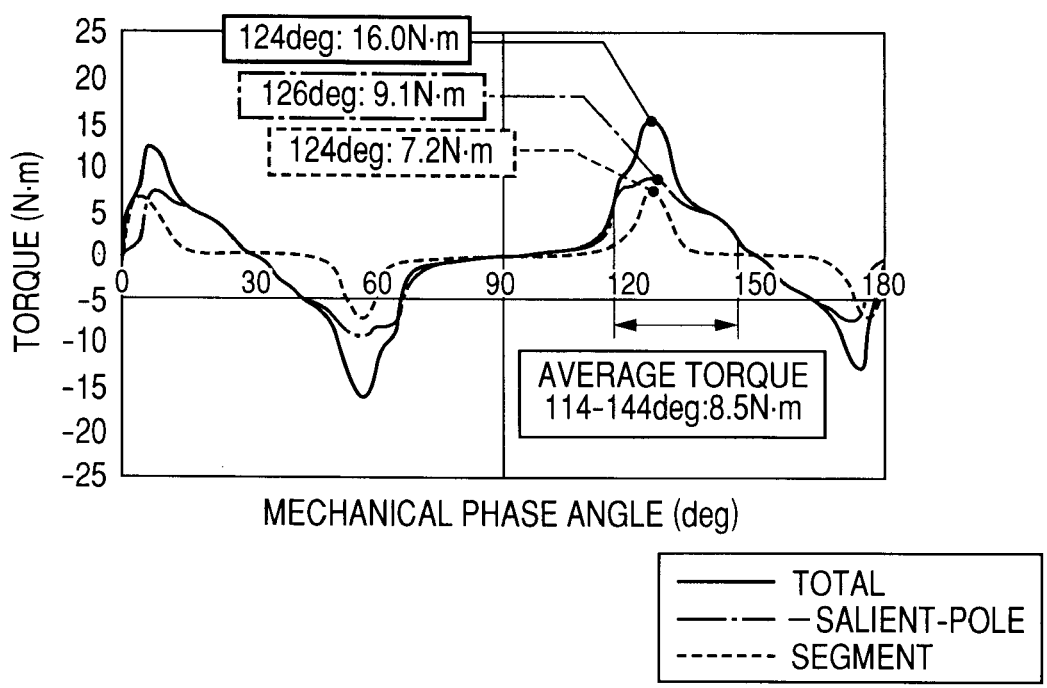
FIG. 21B is a graph schematically illustrating a torque characteristic curve obtained by a simulation based on the motor sample SA19.

FIG. 21A schematically illustrates the motor sample SA19, and FIG. 21B schematically illustrates the torque characteristic curve obtained by the simulation based on the motor sample SA19.

Each of paired segment magnetic-path portions 32X10 of the motor sample SA10 has the same shape as a corresponding one of the paired segment magnetic-path portions 32X1.

Like each of the paired segment magnetic-path portions 32X1, the length Ds of the arc-shaped outer surface 32a of each of the paired segment magnetic-path portions 32X10 of the motor sample SA10 is determined by "2P–Dp–$\alpha$"; this length Ds corresponds to an arc ratio of 75 degrees.

Sample SA20

Figure 22A:
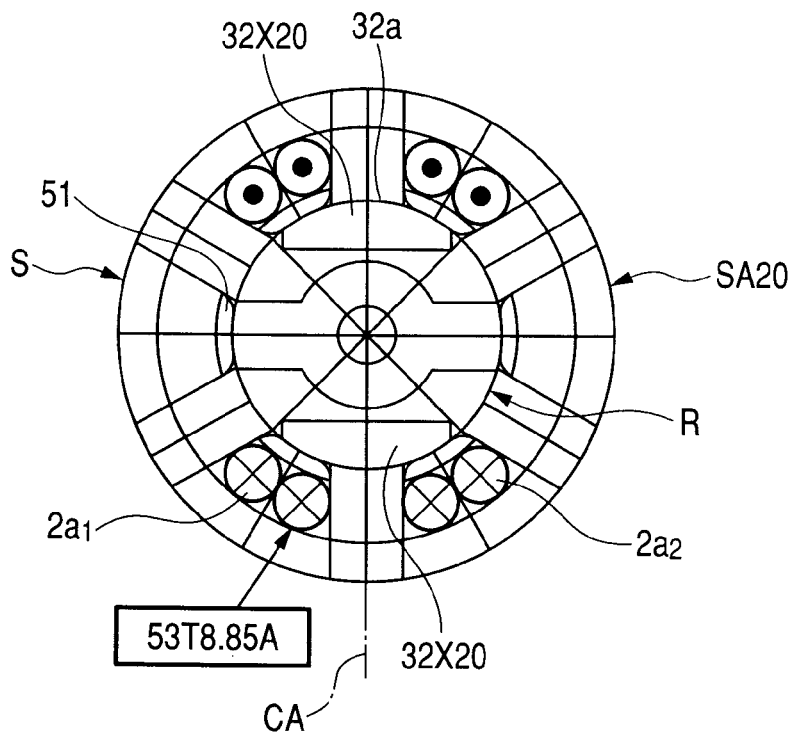
FIG. 22A is an enlarged lateral cross sectional view of a motor sample SA20 corresponding to FIG. 2 and wherein cross hatching is omitted for clarity according to the embodiment.
Figure 22B:
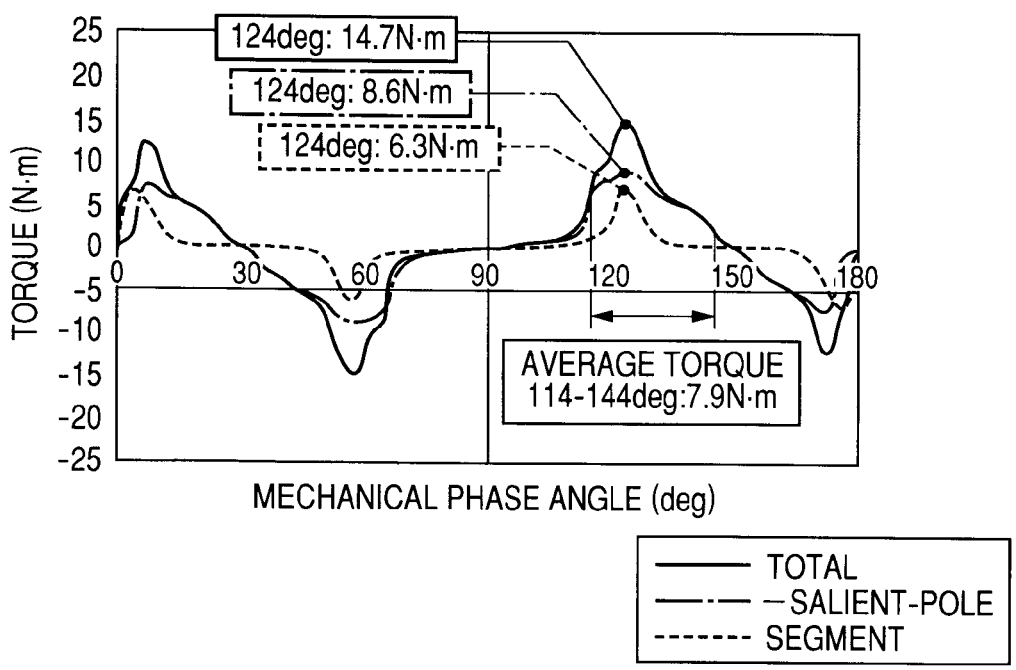
FIG. 22B is a graph schematically illustrating a torque characteristic curve obtained by a simulation based on the motor sample SA20.

FIG. 22A schematically illustrates the motor sample SA20, and FIG. 22B schematically illustrates the torque characteristic curve obtained by the simulation based on the motor sample SA20.

Each of paired segment magnetic-path portions 32X20 of the motor sample SA20 has a width in the center axis CA; this width being 20 percent higher than the width of a corresponding one of the paired segment magnetic-path portions 32.

Sample SA21

Figure 23A:
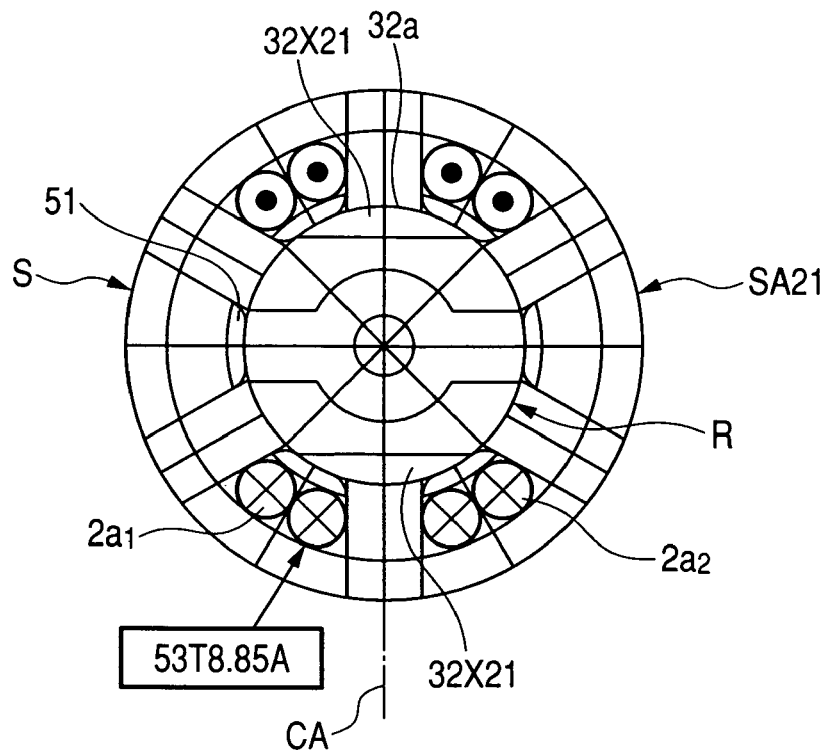
FIG. 23A is an enlarged lateral cross sectional view of a motor sample SA21 corresponding to FIG. 2 and wherein cross hatching is omitted for clarity according to the embodiment.
Figure 23B:
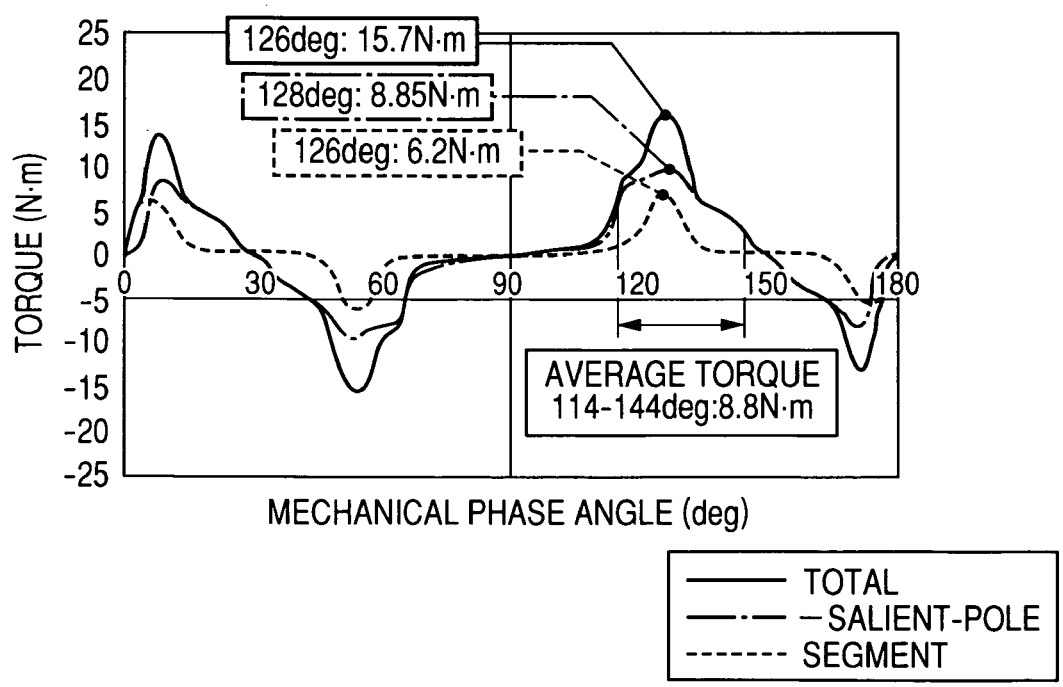
FIG. 23B is a graph schematically illustrating a torque characteristic curve obtained by a simulation based on the motor sample SA21.

FIG. 23A schematically illustrates the motor sample SA21, and FIG. 23B schematically illustrates the torque characteristic curve obtained by the simulation based on the motor sample SA21.

Each of paired segment magnetic-path portions 32X21 of the motor sample SA21 has a width in the center axis CA; this width being 20 percent lower than the width of a corresponding one of the paired segment magnetic-path portions 32.

Sample SA22

Figure 24A:
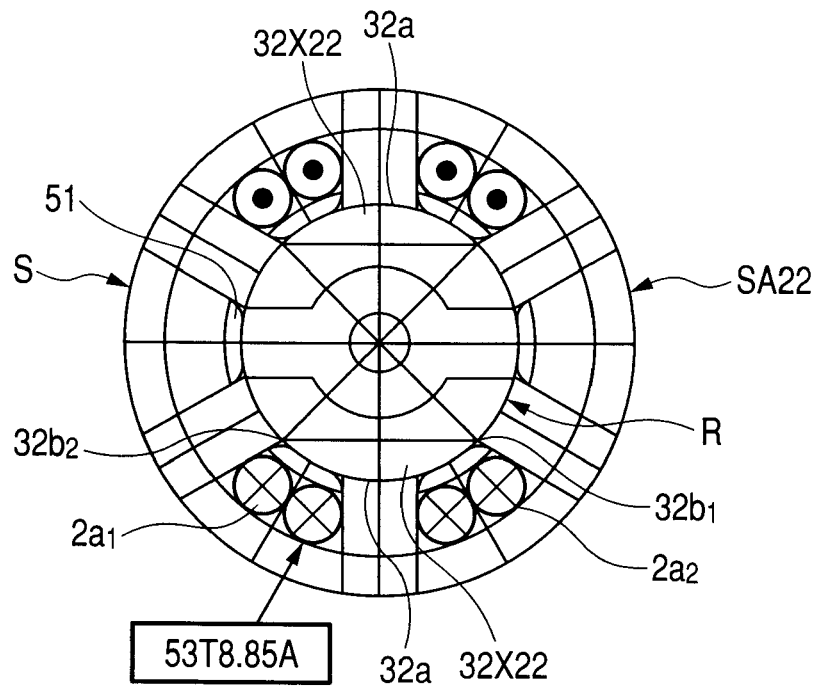
FIG. 24A is an enlarged lateral cross sectional view of a motor sample SA22 corresponding to FIG. 2 and wherein cross hatching is omitted for clarity according to the embodiment.
Figure 24B:
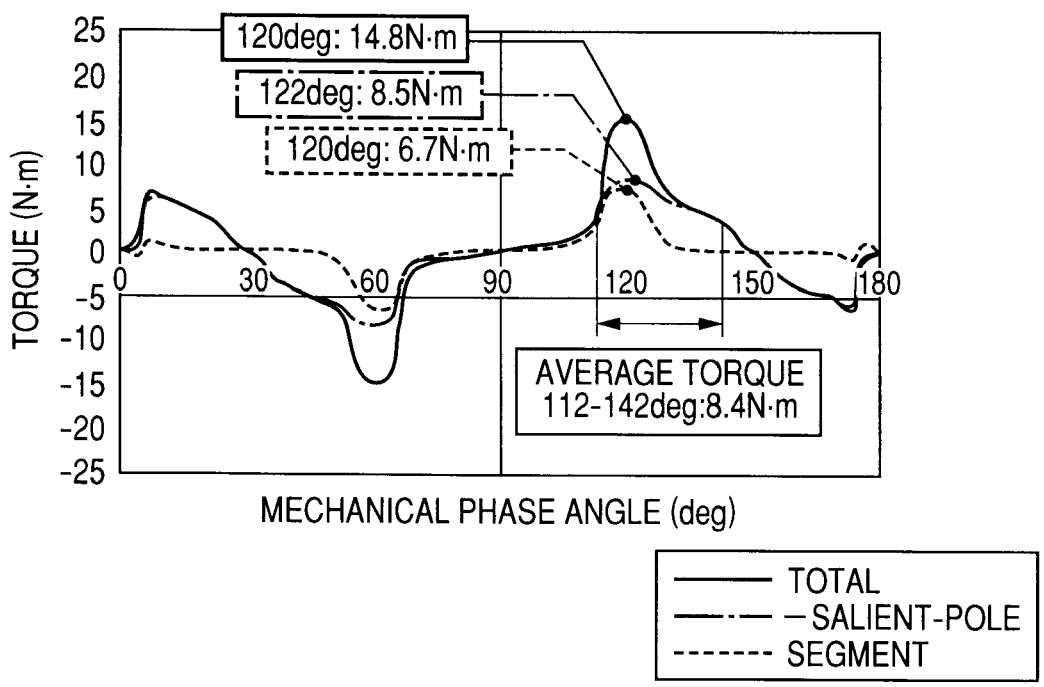
FIG. 24B is a graph schematically illustrating a torque characteristic curve obtained by a simulation based on the motor sample SA22.

FIG. 24A schematically illustrates the motor sample SA22, and FIG. 24B schematically illustrates the torque characteristic curve obtained by the simulation based on the motor sample SA22.

Each of paired segment magnetic-path portions 32X22 of the motor sample SA22 has the length Ds of the arc-shaped outer surface 32a thereof; this length Ds is longer than that of a corresponding one of the paired segment magnetic-path portions 32 (see FIG. 2). The length Ds is determined by the sum of the pitch P and the circumferential length of one slot 12; this circumferential length of one slot 12 is represented by "P–Dp" so that the length Ds is determined by "2P–Dp". The length Ds of the arc-shaped outer surface 32a of each of the paired segment magnetic-path portions 32X22 of the motor sample SA22 corresponds to an arc ratio of 90 degrees.

Sample SA23

Figure 25A:
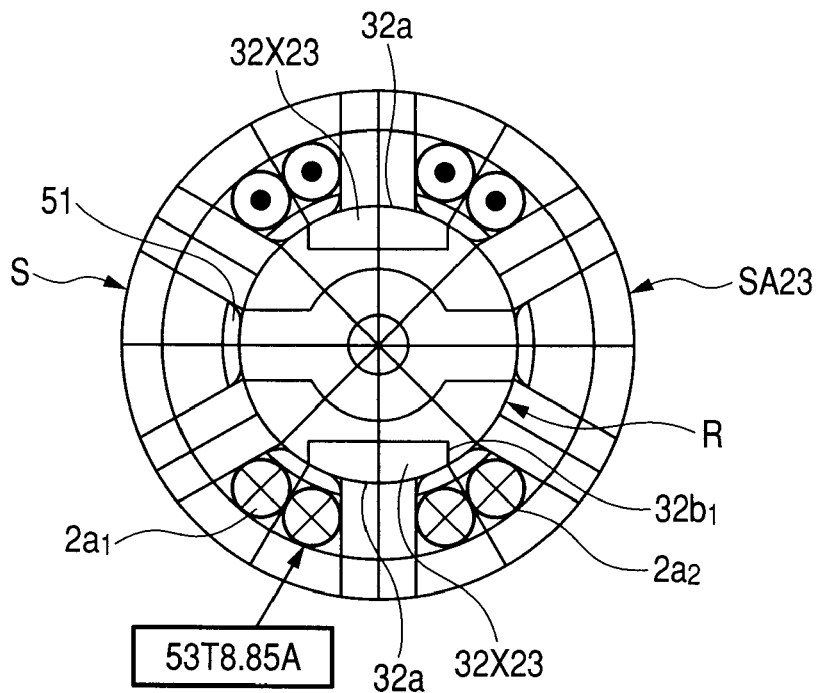
FIG. 25A is an enlarged lateral cross sectional view of a motor sample SA23 corresponding to FIG. 2 and wherein cross hatching is omitted for clarity according to the embodiment.
Figure 25B:
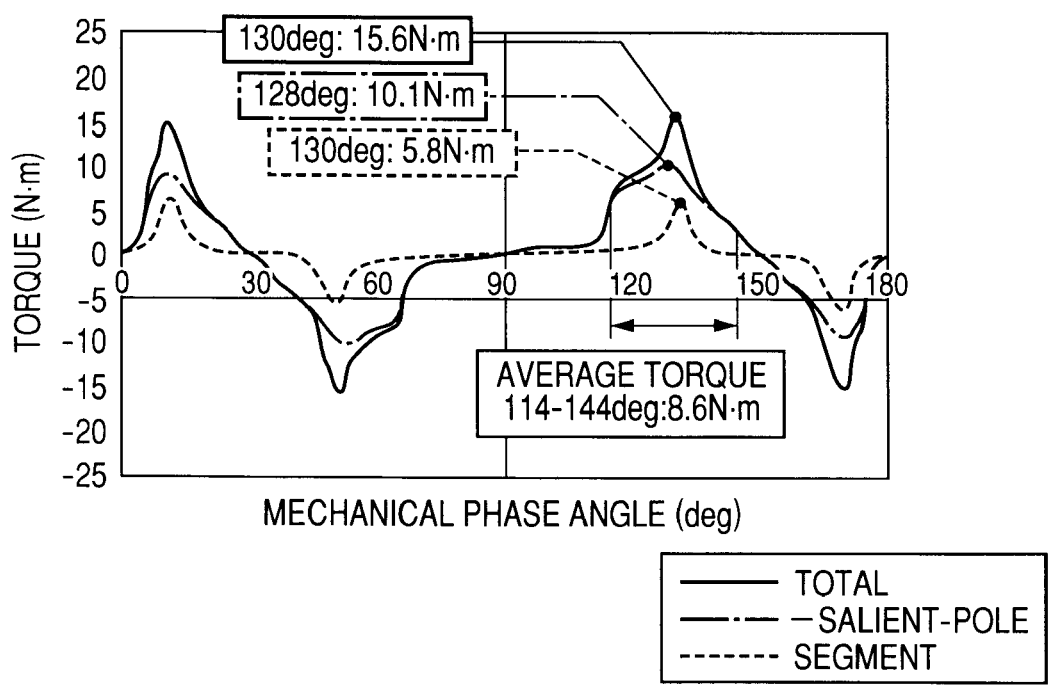
FIG. 25B is a graph schematically illustrating a torque characteristic curve obtained by a simulation based on the motor sample SA23.

FIG. 25A schematically illustrates the motor sample SA23, and FIG. 25B schematically illustrates the torque characteristic curve obtained by the simulation based on the motor sample SA23.

Each of paired segment magnetic-path portions 32X23 of the motor sample SA23 has the length Ds of the arc-shaped outer surface 32a thereof; this length Ds is determined to be shorter than that of the arc-shaped outer surface 32a of a corresponding one of the segment magnetic-path portions 32 (see FIG. 2); this length Ds is determined by "P". The length Ds of the arc-shaped outer surface 32a of each of the paired segment magnetic-path portions 32X23 of the motor sample SA23 corresponds to an arc ratio of 60 degrees.

Sample SA24

Figure 26A:
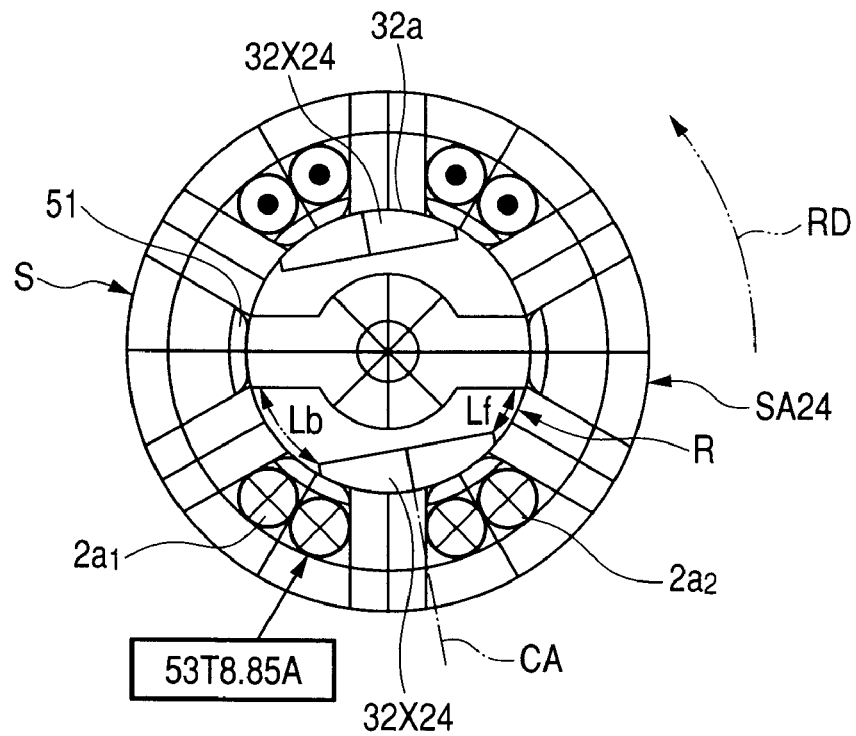
FIG. 26A is an enlarged lateral cross sectional view of a motor sample SA24 corresponding to FIG. 2 and wherein cross hatching is omitted for clarity according to the embodiment.
Figure 26B:
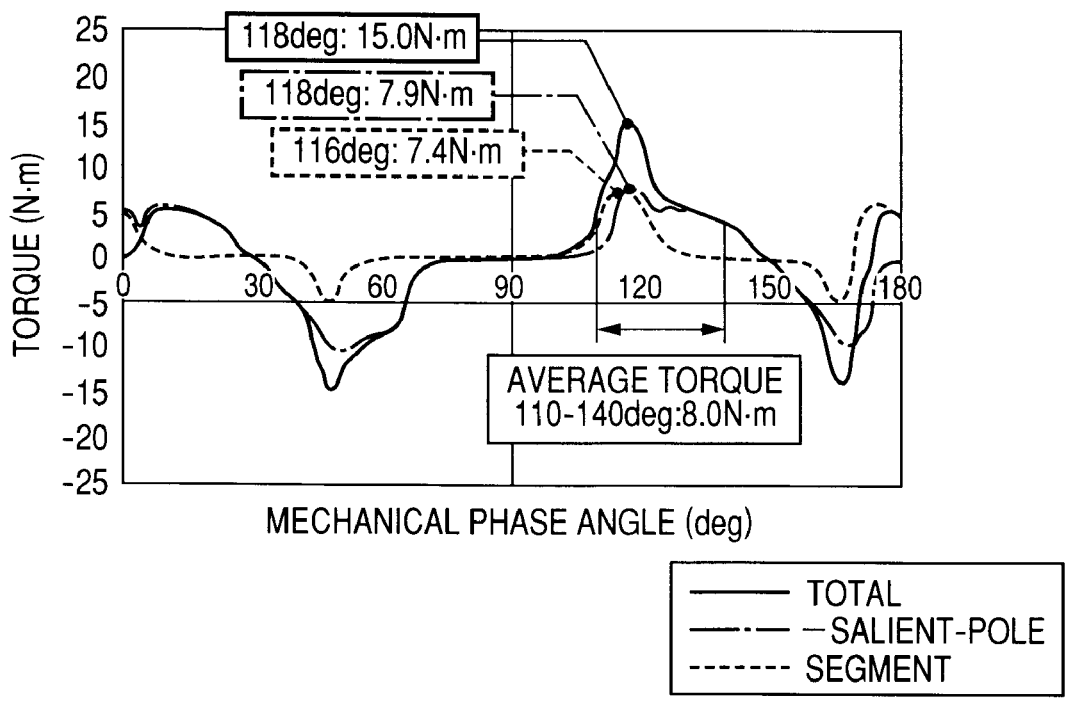
FIG. 26B is a graph schematically illustrating a torque characteristic curve obtained by a simulation based on the motor sample SA24.

FIG. 26A schematically illustrates the motor sample SA24, and FIG. 26B schematically illustrates the torque characteristic curve obtained by the simulation based on the motor sample SA24.

Each of paired segment magnetic-path portions 32X24 of the motor sample SA24 has the same structure as a corresponding one of the paired segment magnetic-path portions 32X1 illustrated in FIG. 3A.

In the motor sample SA24, both of paired segment magnetic-path portions 32X24 are arranged such that:

the center axis CA is inclined with respect to a direction orthogonal to the extending direction EA in the rotational direction RD of the rotor R by 10 degrees; and the circumferential distance Lf is equal to or lower than the circumferential distance Lb.

Sample SA25

Figure 27A:
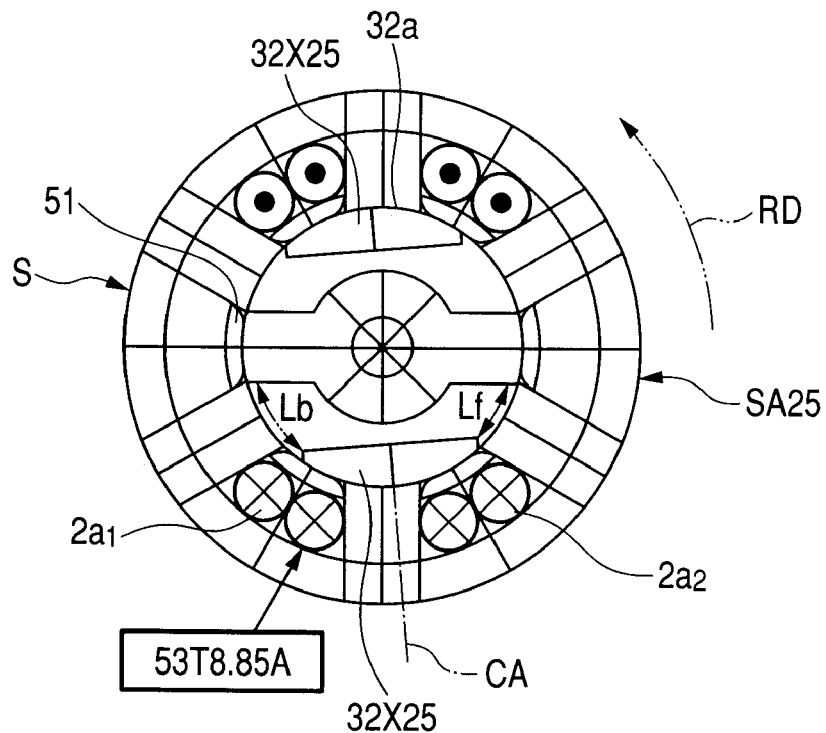
FIG. 27A is an enlarged lateral cross sectional view of a motor sample SA25 corresponding to FIG. 2 and wherein cross hatching is omitted for clarity according to the embodiment.
Figure 27B:
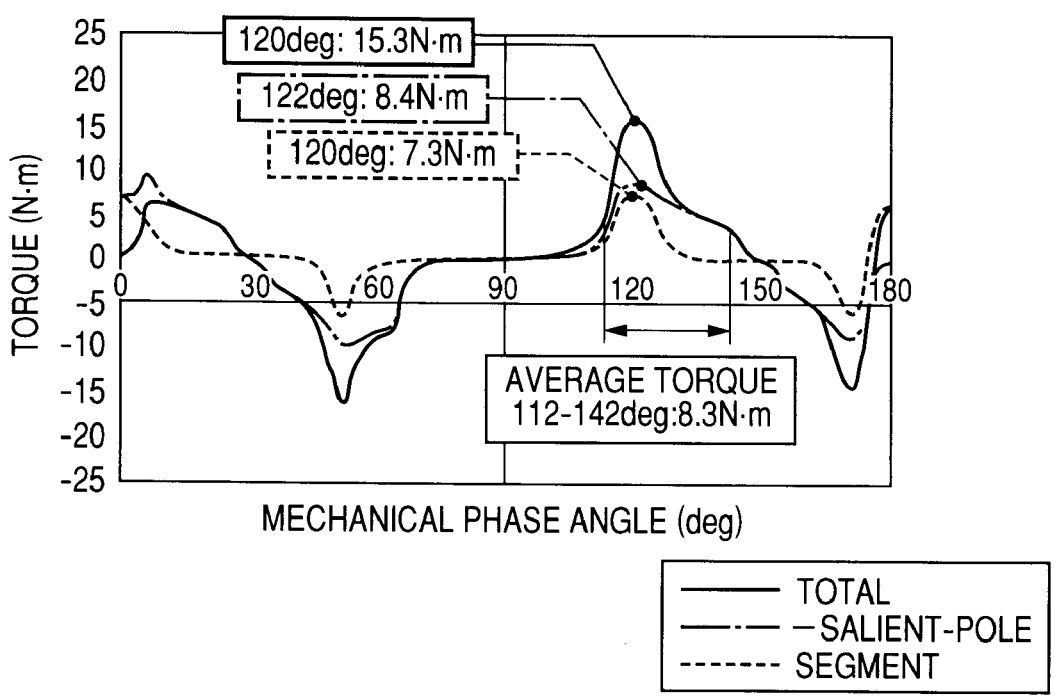
FIG. 27B is a graph schematically illustrating a torque characteristic curve obtained by a simulation based on the motor sample SA25.

FIG. 27A schematically illustrates the motor sample SA25, and FIG. 27B schematically illustrates the torque characteristic curve obtained by the simulation based on the motor sample SA25.

Each of paired segment magnetic-path portions 32X25 of the motor sample SA25 has the same structure as a corresponding one of the paired segment magnetic-path portions 32X1 illustrated in FIG. 3A.

In the motor sample SA25, both of paired segment magnetic-path portions 32X25 are arranged such that:

the center axis CA is inclined with respect to a direction orthogonal to the extending direction EA in the rotational direction RD of the rotor R by 5 degrees; and the circumferential distance Lf is equal to or lower than the circumferential distance Lb.

Sample SA26

Figure 28A:
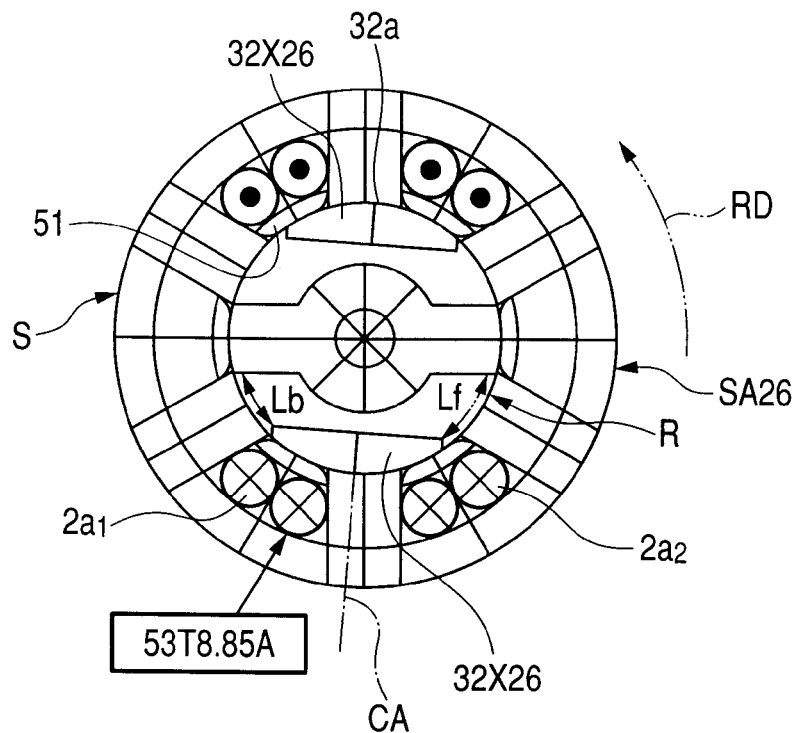
FIG. 28A is an enlarged lateral cross sectional view of a motor sample SA26 corresponding to FIG. 2 and wherein cross hatching is omitted for clarity according to the embodiment.
Figure 28B:
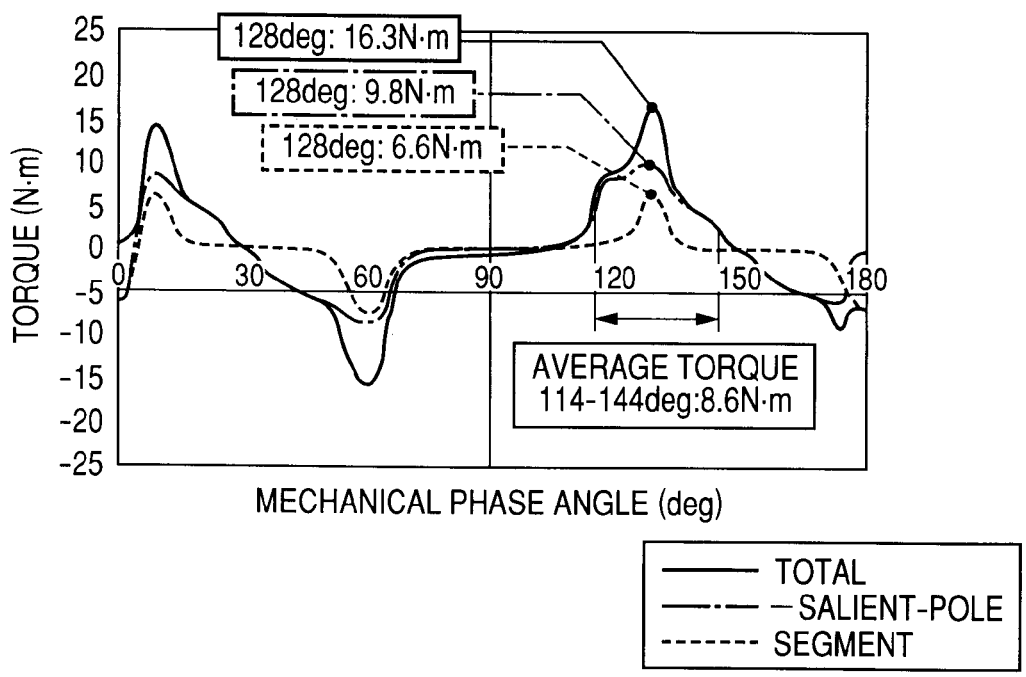
FIG. 28B is a graph schematically illustrating a torque characteristic curve obtained by a simulation based on the motor sample SA26.

FIG. 28A schematically illustrates the motor sample SA26, and FIG. 28B schematically illustrates the torque characteristic curve obtained by the simulation based on the motor sample SA26.

Each of paired segment magnetic-path portions 32X26 of the motor sample SA26 has the same structure as a corresponding one of the paired segment magnetic-path portions 32X1 illustrated in FIG. 3A.

In the motor sample SA26, both of paired segment magnetic-path portions 32X26 are arranged such that:

the center axis CA is inclined with respect to a direction orthogonal to the extending direction EA in a direction opposite to the rotational direction RD of the rotor R by 5 degrees; and the circumferential distance Lf is equal to or longer than the circumferential distance Lb.

Sample SA27

Figure 29A:
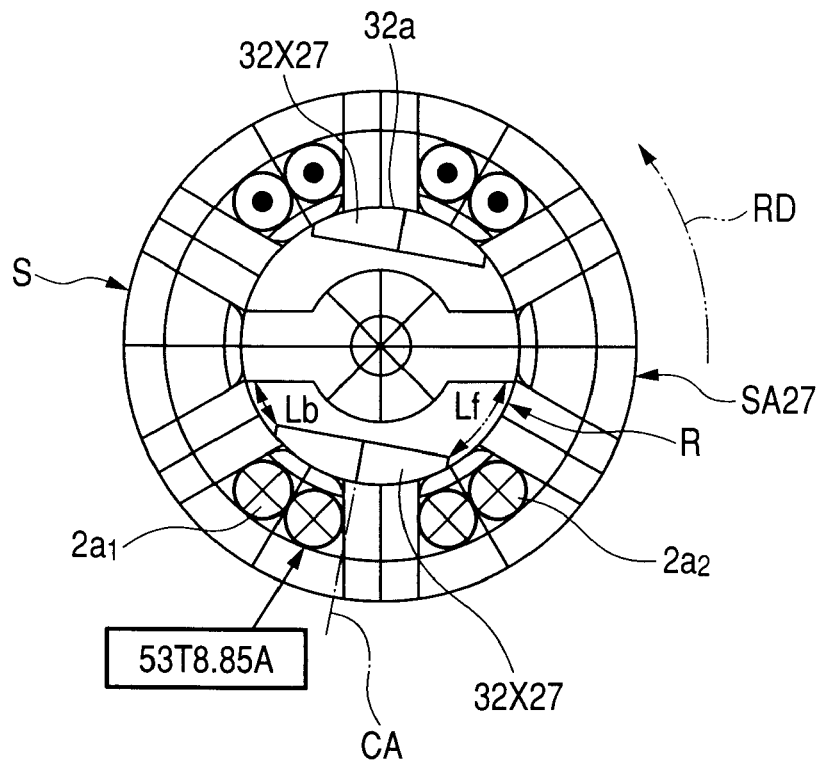
FIG. 29A is an enlarged lateral cross sectional view of a motor sample SA27 corresponding to FIG. 2 and wherein cross hatching is omitted for clarity according to the embodiment.
Figure 29B:
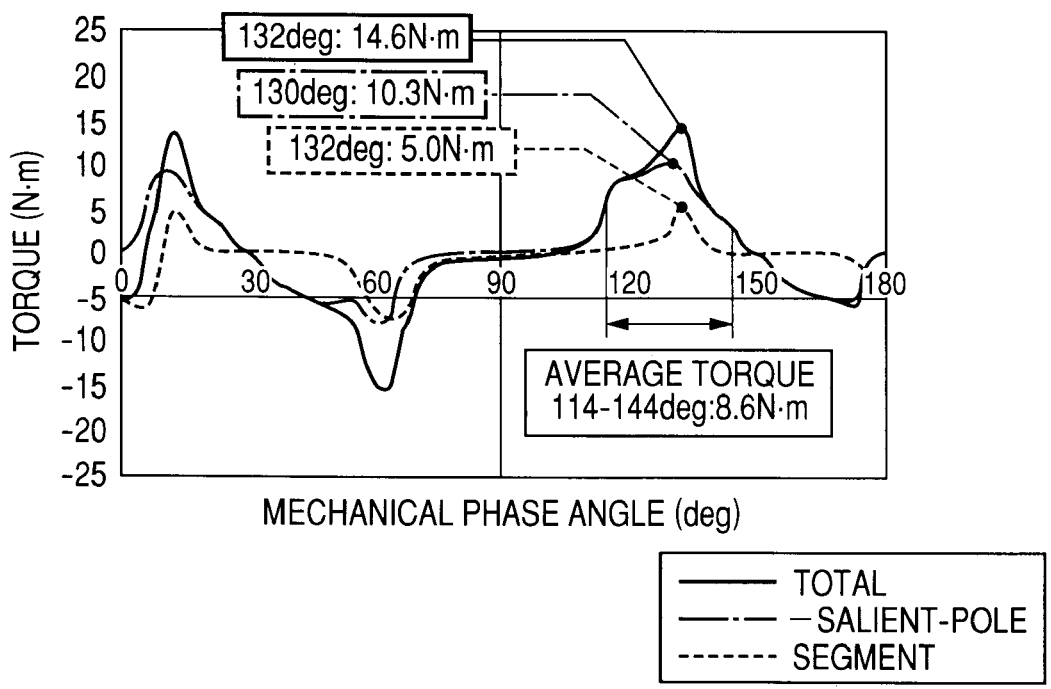
FIG. 29B is a graph schematically illustrating a torque characteristic curve obtained by a simulation based on the motor sample SA27.

FIG. 29A schematically illustrates the motor sample SA27, and FIG. 29B schematically illustrates the torque characteristic curve obtained by the simulation based on the motor sample SA27.

Each of paired segment magnetic-path portions 32X27 of the motor sample SA27 has the same structure as a corresponding one of the paired segment magnetic-path portions 32X1 illustrated in FIG. 3A.

In the motor sample SA27, both of paired segment magnetic-path portions 32X27 are arranged such that:

the center axis CA is inclined with respect to a direction orthogonal to the extending direction EA in a direction opposite to the rotational direction RD of the rotor R by 10 degrees; and the circumferential distance Lf is equal to or longer than the circumferential distance Lb.

The samples SA28 to SA36 are each comprised of no teeth.

Sample SA28

Figure 30A:
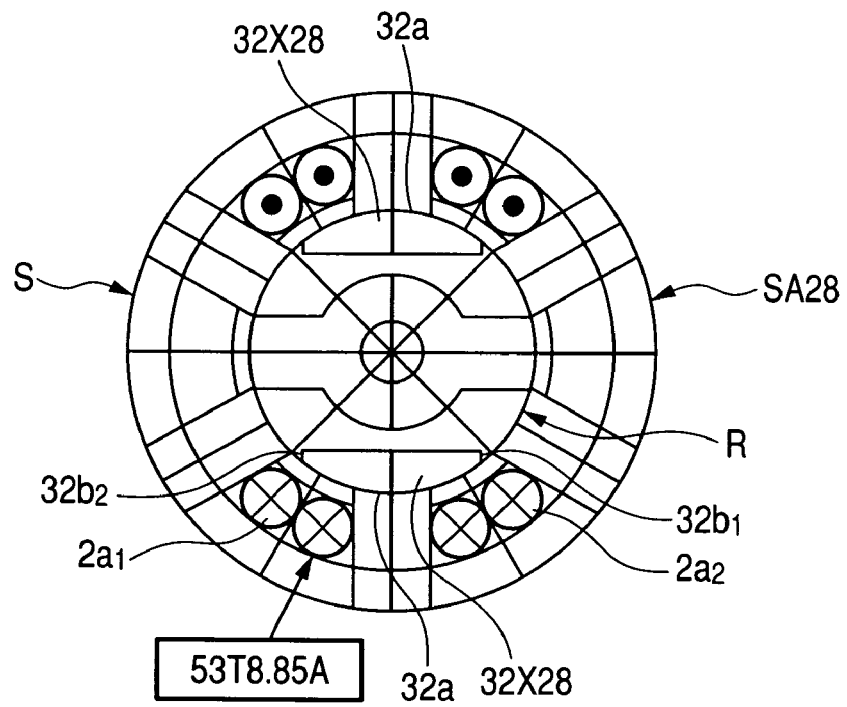
FIG. 30A is an enlarged lateral cross sectional view of a motor sample SA28 corresponding to FIG. 2 and wherein cross hatching is omitted for clarity according to the embodiment.
Figure 30B:
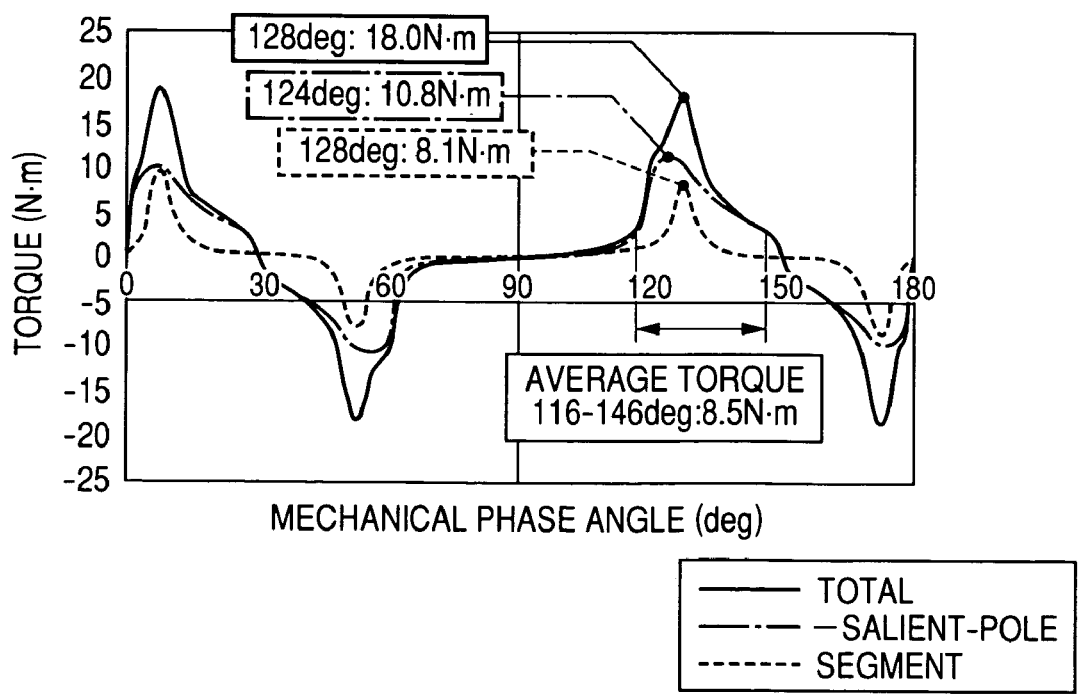
FIG. 30B is a graph schematically illustrating a torque characteristic curve obtained by a simulation based on the motor sample SA28.

FIG. 30A schematically illustrates the motor sample SA28, and FIG. 30B schematically illustrates the torque characteristic curve obtained by the simulation based on the motor sample SA28.

Each of paired segment magnetic-path portions 32X28 of the motor sample SA28 has the same shape as a corresponding one of the paired segment magnetic-path portions 32X1.

Like each of the paired segment magnetic-path portions 32X1, the length Ds of the arc-shaped outer surface 32a of each of the paired segment magnetic-path portions 32X28 of the motor sample SA28 is determined by "2P–Dp–α"; this length Ds corresponds to an arc ratio of 75 degrees.

Sample SA29

Figure 31A:
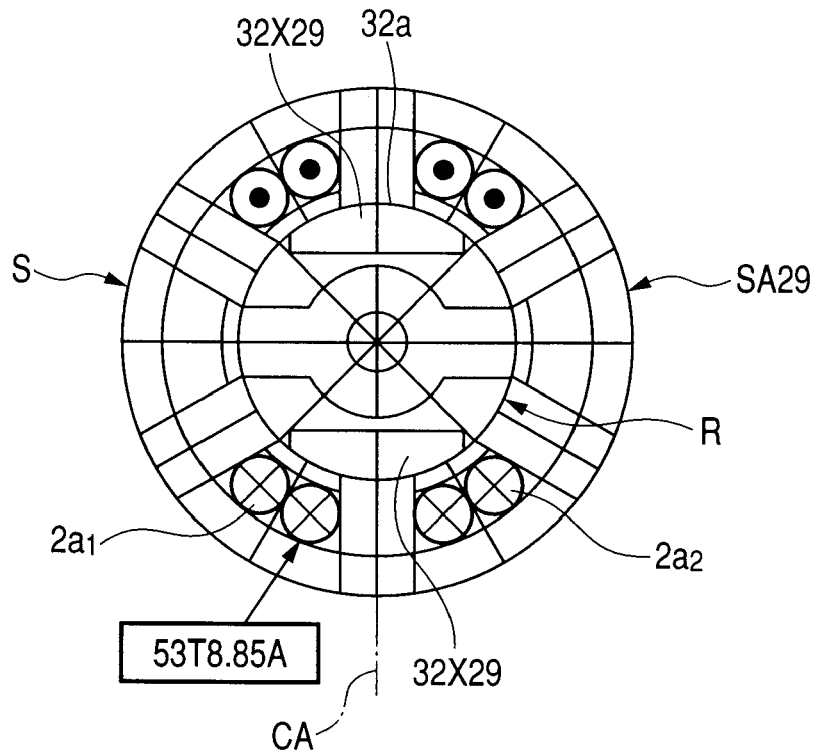
FIG. 31A is an enlarged lateral cross sectional view of a motor sample SA29 corresponding to FIG. 2 and wherein cross hatching is omitted for clarity according to the embodiment.
Figure 31B:
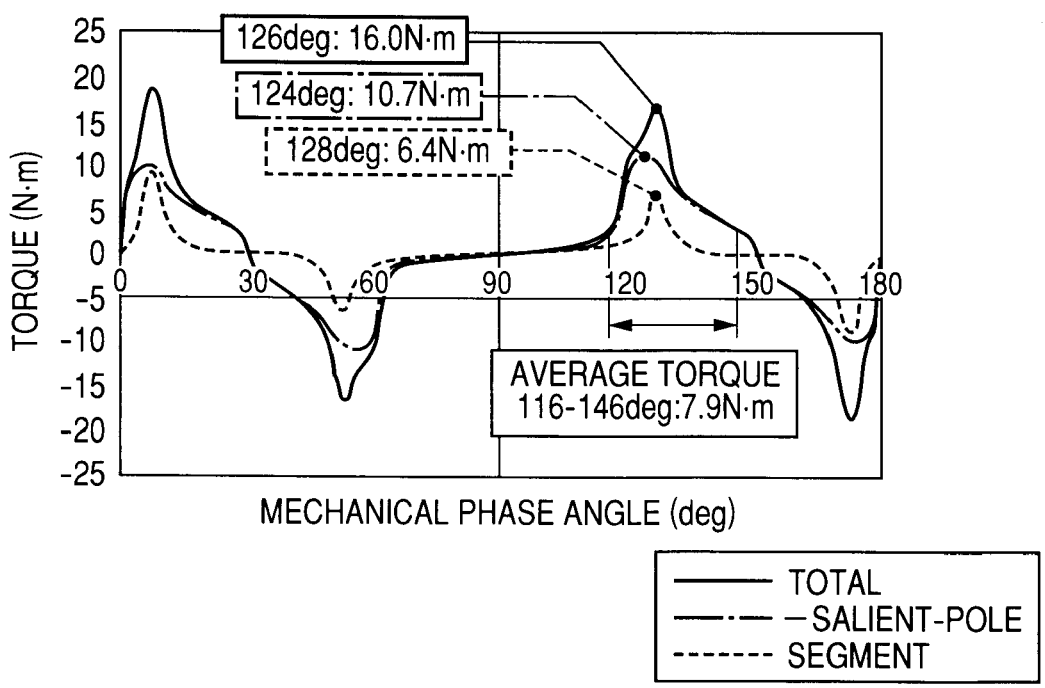
FIG. 31B is a graph schematically illustrating a torque characteristic curve obtained by a simulation based on the motor sample SA29.

FIG. 31A schematically illustrates the motor sample SA29, and FIG. 31B schematically illustrates the torque characteristic curve obtained by the simulation based on the motor sample SA29.

Each of paired segment magnetic-path portions 32X29 of the motor sample SA29 has a width in the center axis CA; this width being 20 percent higher than the width of a corresponding one of the paired segment magnetic-path portions 32.

Sample SA30

Figure 32A:
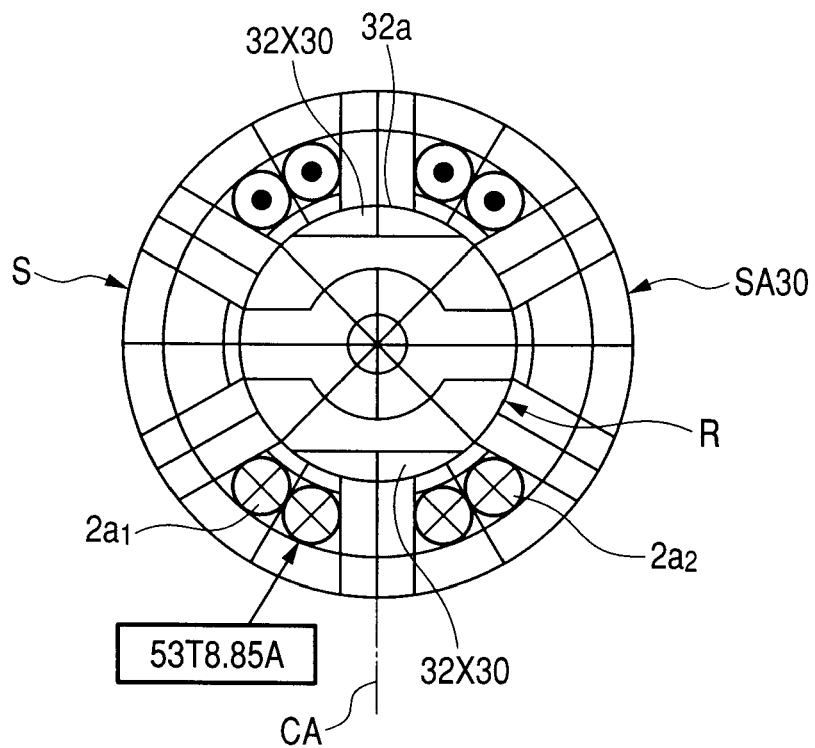
FIG. 32A is an enlarged lateral cross sectional view of a motor sample SA30 corresponding to FIG. 2 and wherein cross hatching is omitted for clarity according to the embodiment.
Figure 32B:
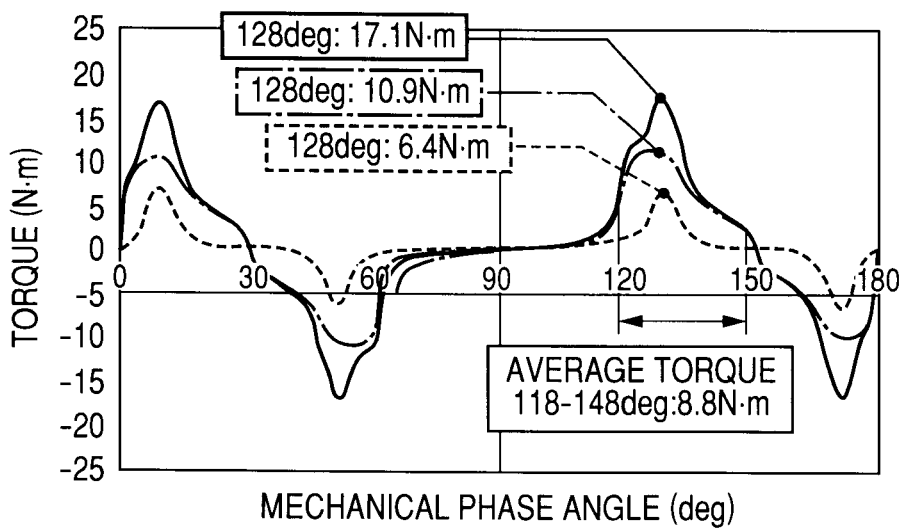
FIG. 32B is a graph schematically illustrating a torque characteristic curve obtained by a simulation based on the motor sample SA30.

FIG. 32A schematically illustrates the motor sample SA30, and FIG. 32B schematically illustrates the torque characteristic curve obtained by the simulation based on the motor sample SA30.

Each of paired segment magnetic-path portions 32X30 of the motor sample SA30 has a width in the center axis CA; this width being 20 percent lower than the width of a corresponding one of the paired segment magnetic-path portions 32.

Sample SA31

Figure 33A:
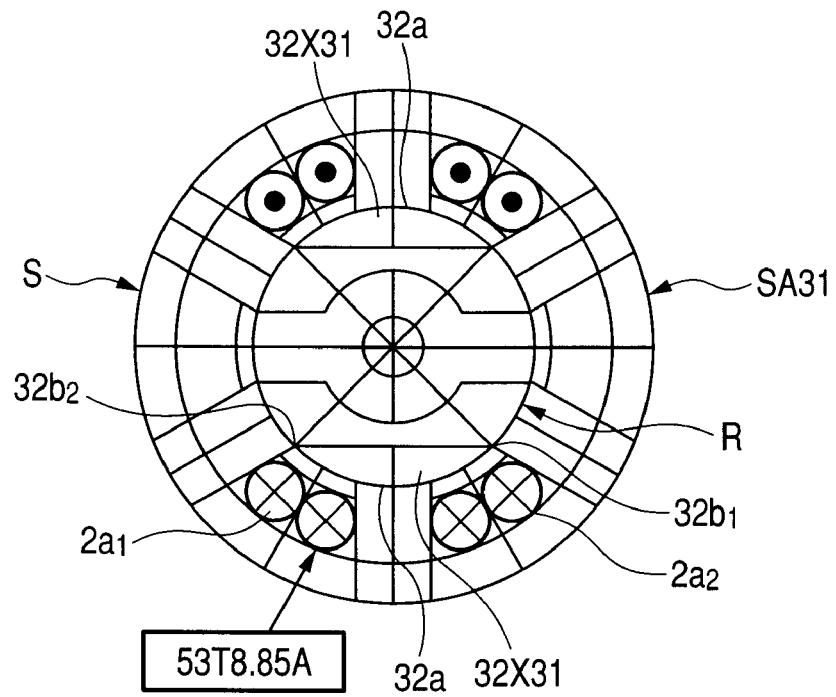
FIG. 33A is an enlarged lateral cross sectional view of a motor sample SA31 corresponding to FIG. 2 and wherein cross hatching is omitted for clarity according to the embodiment.
Figure 33B:
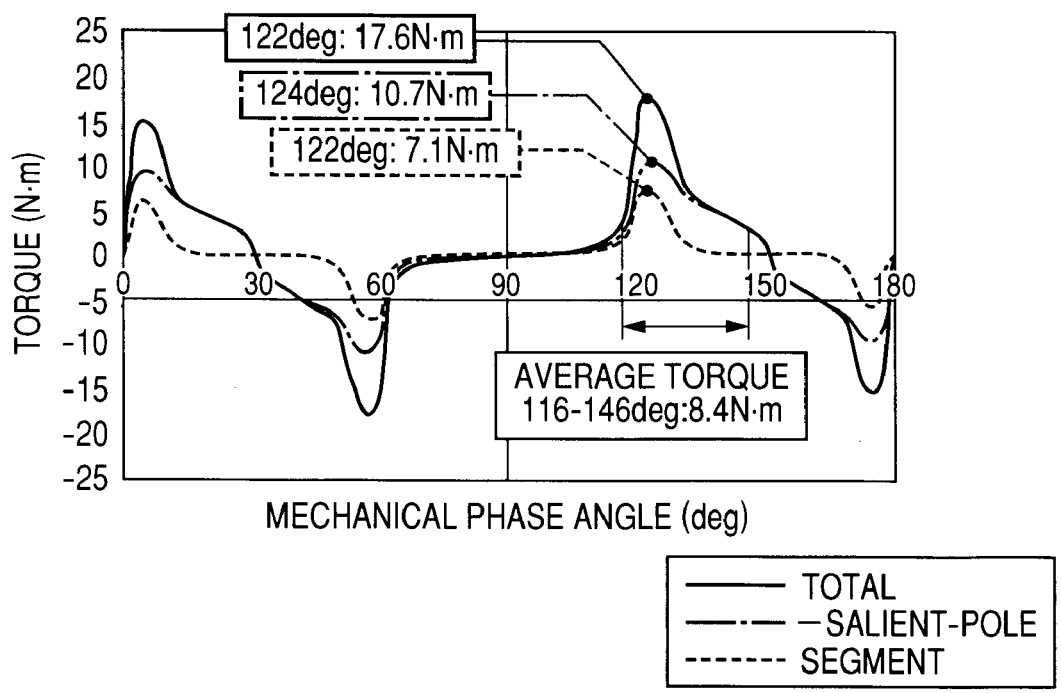
FIG. 33B is a graph schematically illustrating a torque characteristic curve obtained by a simulation based on the motor sample SA31.

FIG. 33A schematically illustrates the motor sample SA31, and FIG. 33B schematically illustrates the torque characteristic curve obtained by the simulation based on the motor sample SA31.

Each of paired segment magnetic-path portions 32X31 of the motor sample SA31 has the length Ds of the arc-shaped outer surface 32a thereof; this length Ds is longer than that of a corresponding one of the paired segment magnetic-path portions 32 (see FIG. 2). The length Ds is determined by the sum of the pitch P and the circumferential length of one slot 12; this circumferential length of one slot 12 is represented by "P–Dp" so that the length Ds is determined by "2P–Dp". The length Ds of the arc-shaped outer surface 32a of each of the paired segment magnetic-path portions 32X31 of the motor sample SA31 corresponds to an arc ratio of 90 degrees.

Sample SA32

Figure 34A:
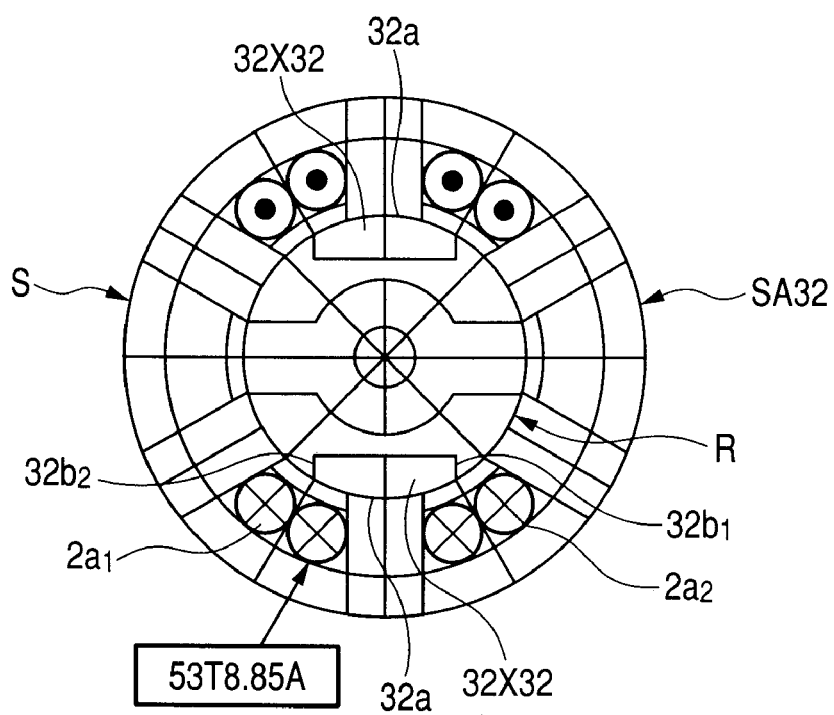
FIG. 34A is an enlarged lateral cross sectional view of a motor sample SA32 corresponding to FIG. 2 and wherein cross hatching is omitted for clarity according to the embodiment.
Figure 34B:
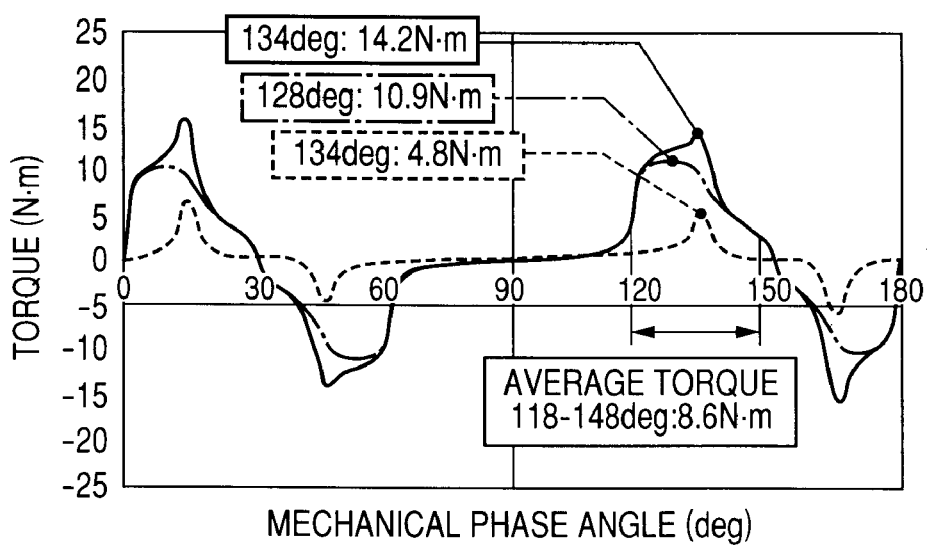
FIG. 34B is a graph schematically illustrating a torque characteristic curve obtained by a simulation based on the motor sample SA32.

FIG. 34A schematically illustrates the motor sample SA32, and FIG. 34B schematically illustrates the torque characteristic curve obtained by the simulation based on the motor sample SA32.

Each of paired segment magnetic-path portions 32X32 of the motor sample SA32 has the length Ds of the arc-shaped outer surface 32a thereof; this length Ds is determined to be shorter than that of the arc-shaped outer surface 32a of a corresponding one of the segment magnetic-path portions 32 (see FIG. 2); this length Ds is determined by "P". The length Ds of the arc-shaped outer surface 32a of each of the paired segment magnetic-path portions 32X32 of the motor sample SA32 corresponds to an arc ratio of 60 degrees.

Sample SA33

Figure 35A:
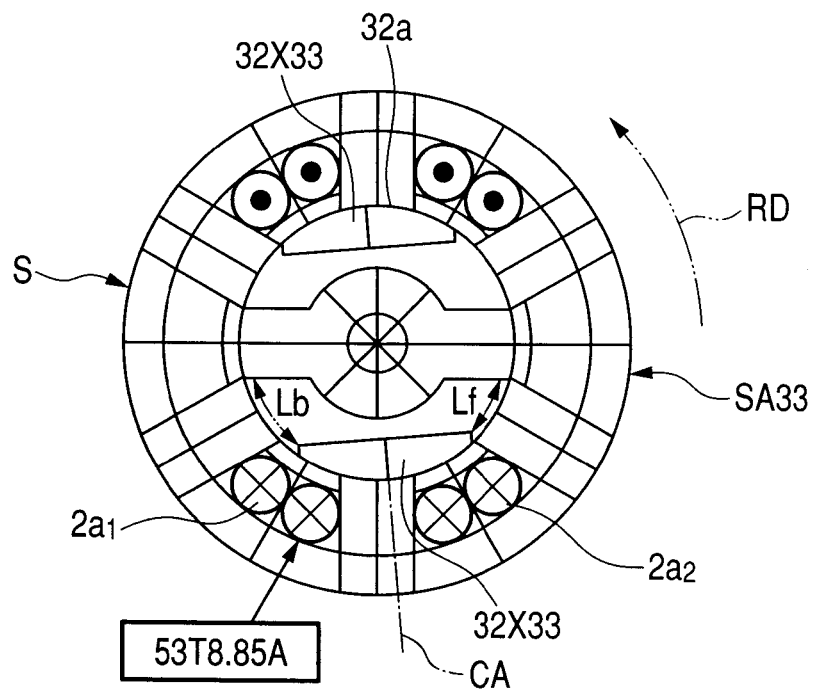
FIG. 35A is an enlarged lateral cross sectional view of a motor sample SA33 corresponding to FIG. 2 and wherein cross hatching is omitted for clarity according to the embodiment.
Figure 35B:
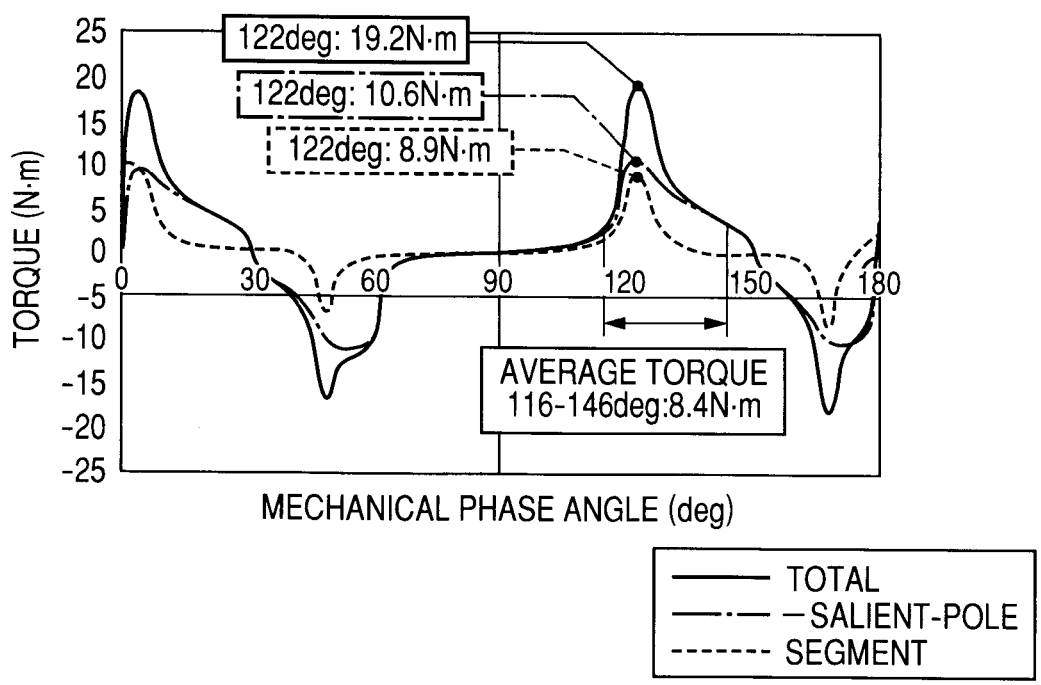
FIG. 35B is a graph schematically illustrating a torque characteristic curve obtained by a simulation based on the motor sample SA33.

FIG. 35A schematically illustrates the motor sample SA33 and FIG. 35 B schematically illustrates the torque characteristic curve obtained by the simulation based on the motor sample SA33.

Each of paired segment magnetic-path portions 32X33 of the motor sample SA33 has the same structure as a corresponding one of the paired segment magnetic-path portions 32X1 illustrated in FIG. 3A.

In the motor sample SA33, both of paired segment magnetic-path portions 32X33 are arranged such that:

the center axis CA is inclined with respect to a direction orthogonal to the extending direction EA in the rotational direction RD of the rotor R by 10 degrees; and the circumferential distance Lf is equal to or lower than the circumferential distance Lb.

Sample SA34

Figure 36A:
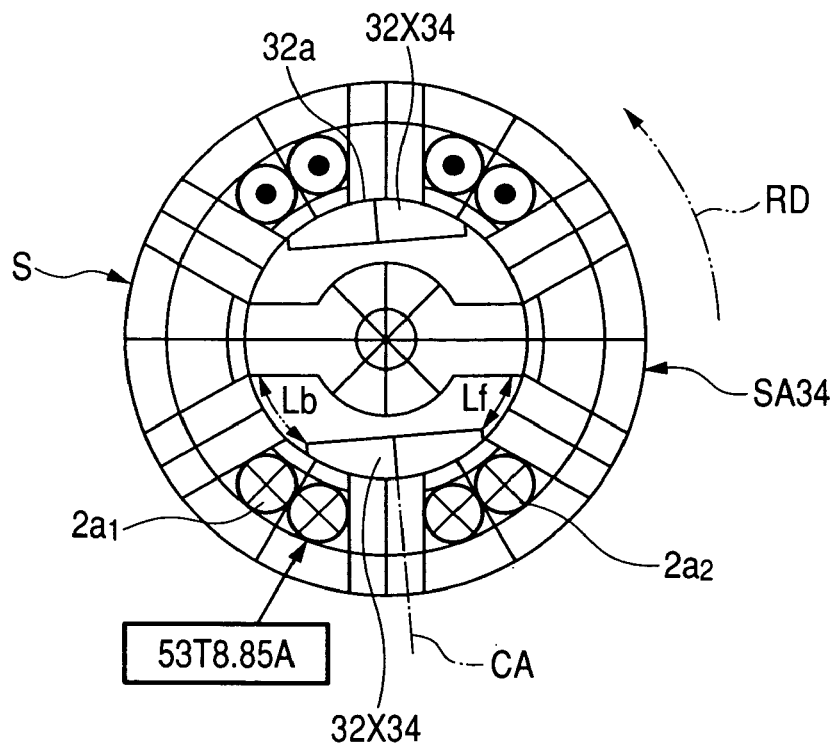
FIG. 36A is an enlarged lateral cross sectional view of a motor sample SA34 corresponding to FIG. 2 and wherein cross hatching is omitted for clarity according to the embodiment.
Figure 36B:
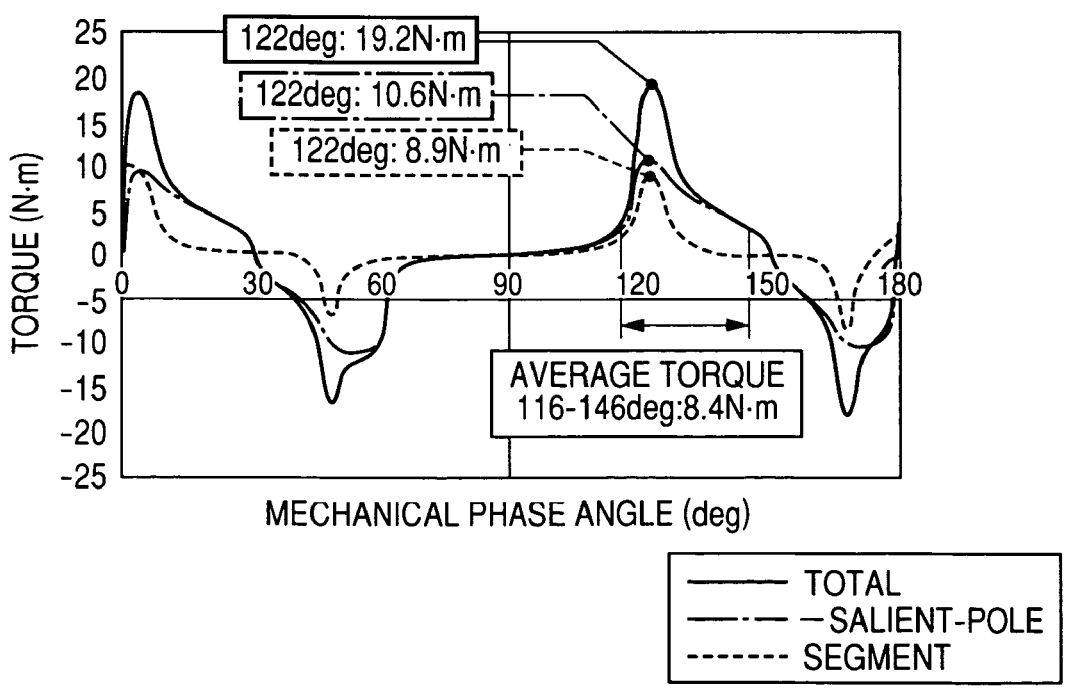
FIG. 36B is a graph schematically illustrating a torque characteristic curve obtained by a simulation based on the motor sample SA34.

FIG. 36A schematically illustrates the motor sample SA34, and FIG. 18B schematically illustrates the torque characteristic curve obtained by the simulation based on the motor sample SA34.

Each of paired segment magnetic-path portions 32X34 of the motor sample SA34 has the same structure as a corresponding one of the paired segment magnetic-path portions 32X1 illustrated in FIG. 3A.

In the motor sample SA34, both of paired segment magnetic-path portions 32X34 are arranged such that:

the center axis CA is inclined with respect to a direction orthogonal to the extending direction EA in the rotational direction RD of the rotor R by 5 degrees; and the circumferential distance Lf is equal to or lower than the circumferential distance Lb.

Sample SA35

Figure 37A:
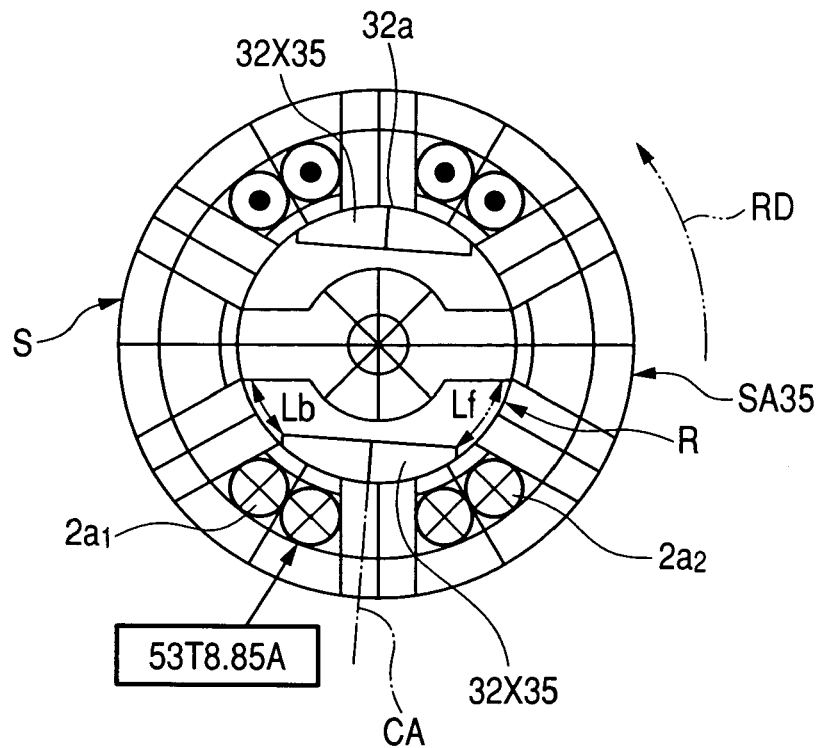
FIG. 37A is an enlarged lateral cross sectional view of a motor sample SA35 corresponding to FIG. 2 and wherein cross hatching is omitted for clarity according to the embodiment.
Figure 37B:
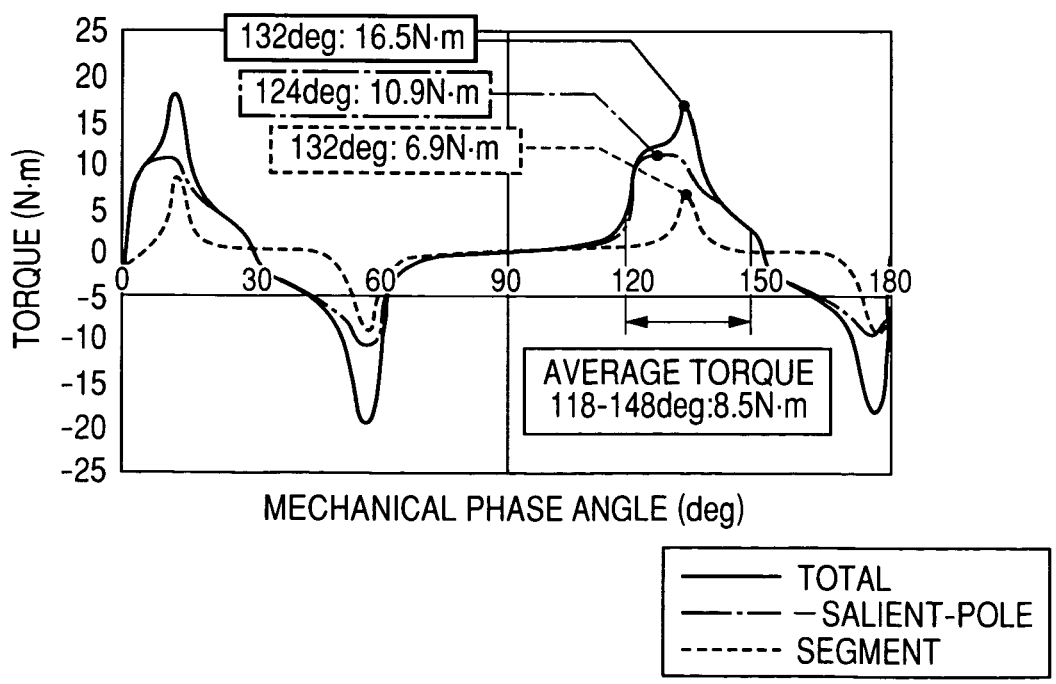
FIG. 37B is a graph schematically illustrating a torque characteristic curve obtained by a simulation based on the motor sample SA35.

FIG. 37A schematically illustrates the motor sample SA35, and FIG. 37B schematically illustrates the torque characteristic curve obtained by the simulation based on the motor sample SA35.

Each of paired segment magnetic-path portions 32X35 of the motor sample SA35 has the same structure as a corresponding one of the paired segment magnetic-path portions 32X1 illustrated in FIG. 3A.

In the motor sample SA32X35, both of paired segment magnetic-path portions 32X35 are arranged such that:

the center axis CA is inclined with respect to a direction orthogonal to the extending direction EA in a direction opposite to the rotational direction RD of the rotor R by 5 degrees; and the circumferential distance Lf is equal to or longer than the circumferential distance Lb.

Sample SA36

Figure 38A:
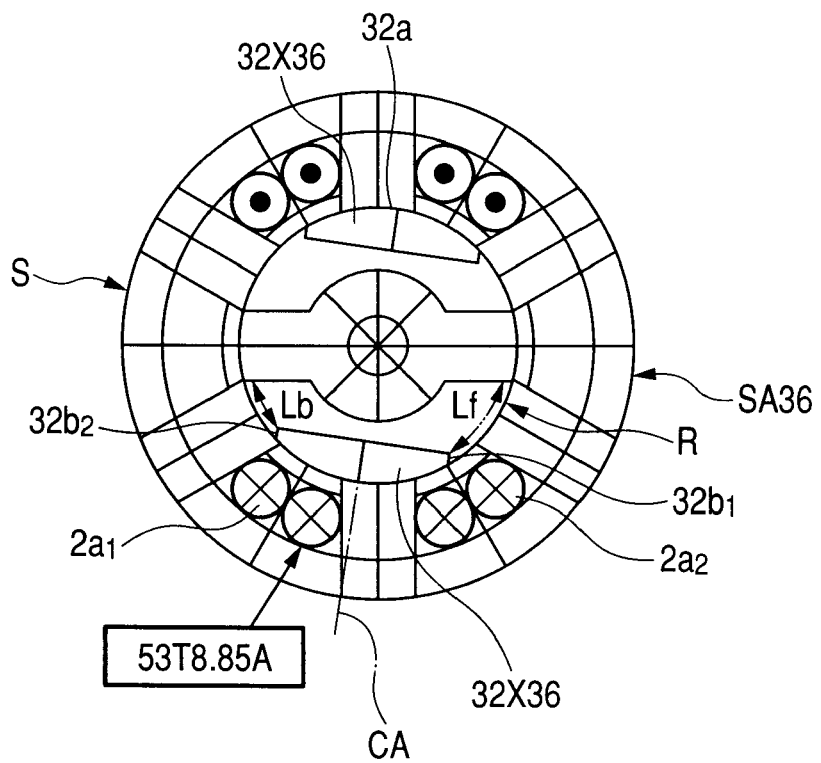
FIG. 38A is an enlarged lateral cross sectional view of a motor sample SA36 corresponding to FIG. 2 and wherein cross hatching is omitted for clarity according to the embodiment.
Figure 38B:
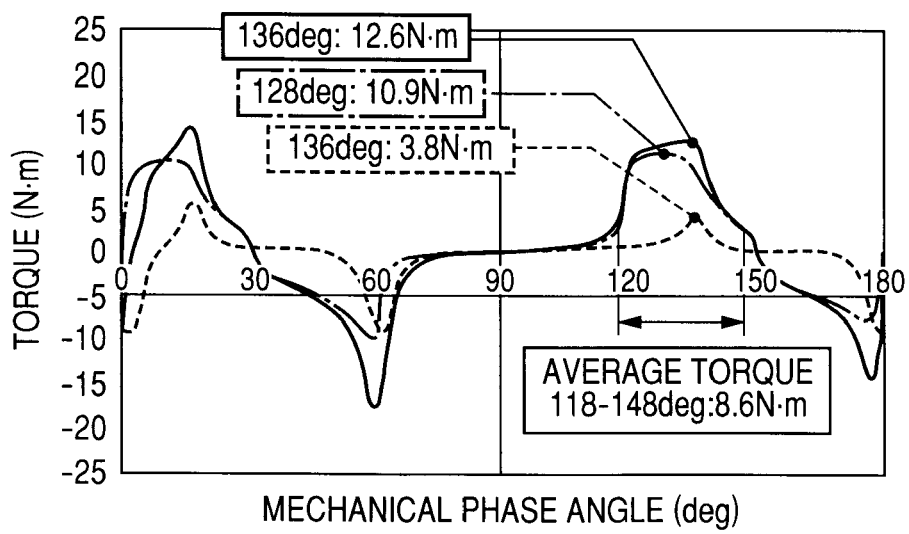
FIG. 38B is a graph schematically illustrating a torque characteristic curve obtained by a simulation based on the motor sample SA37.

FIG. 38A schematically illustrates the motor sample SA36, and FIG. 38B schematically illustrates the torque characteristic curve obtained by the simulation based on the motor sample SA36.

Each of paired segment magnetic-path portions 32X36 of the motor sample SA36 has the same structure as a corresponding one of the paired segment magnetic-path portions 32X1 illustrated in FIG. 3A.

In the motor sample SA36, both of paired segment magnetic-path portions 32X36 are arranged such that:

the center axis CA is inclined with respect to a direction orthogonal to the extending direction EA in a direction opposite to the rotational direction RD of the rotor R by 10 degrees; and the circumferential distance Lf is equal to or longer than the circumferential distance Lb.

Figure 39A:
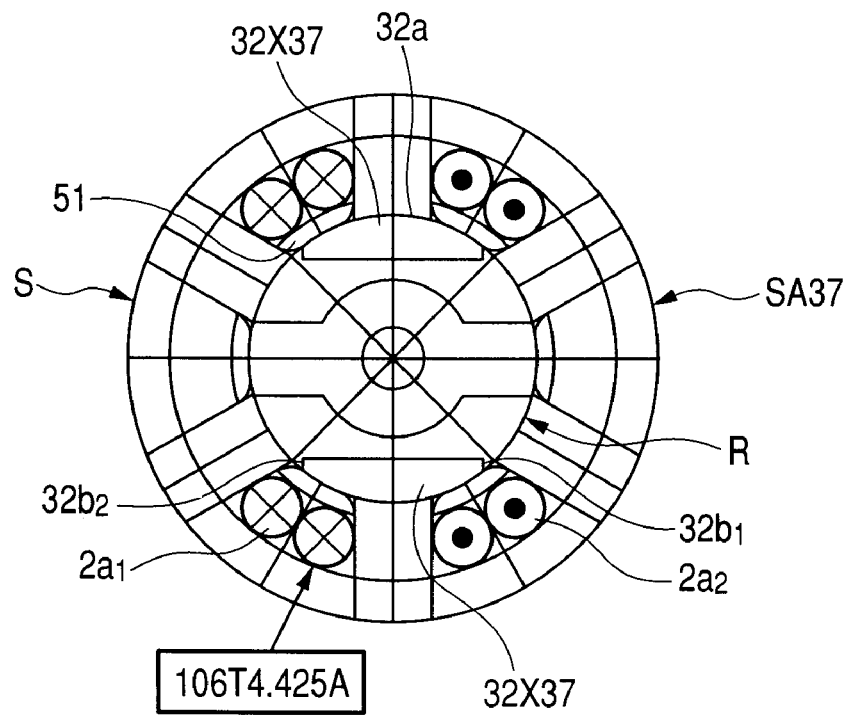
FIG. 39A is an enlarged lateral cross sectional view of a motor sample SA37 corresponding to FIG. 2 and wherein cross hatching is omitted for clarity according to the embodiment.
Figure 39B:
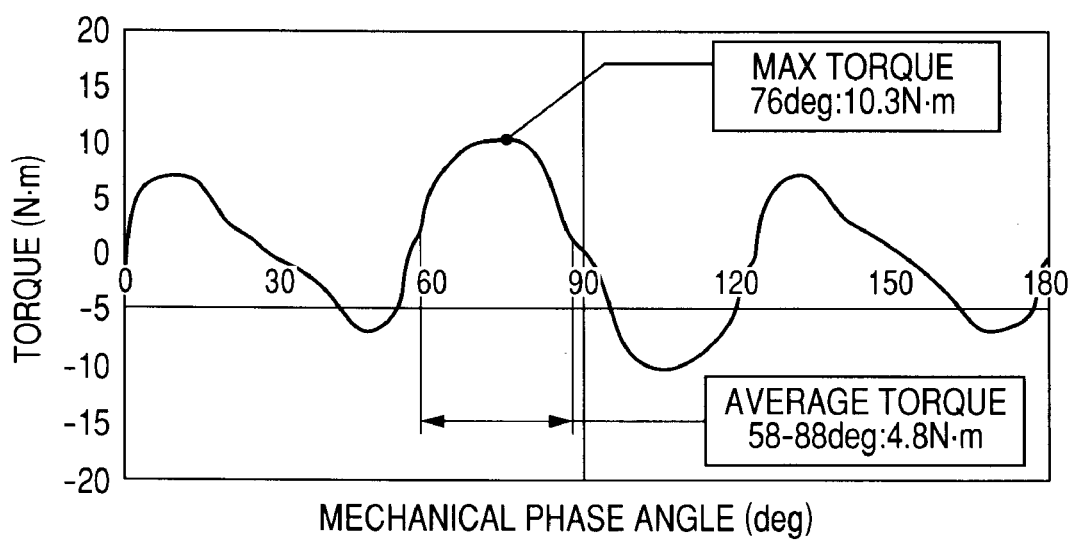
FIG. 39B is a graph schematically illustrating a torque characteristic curve obtained by a simulation based on the motor sample SA37.
Figure 40A:
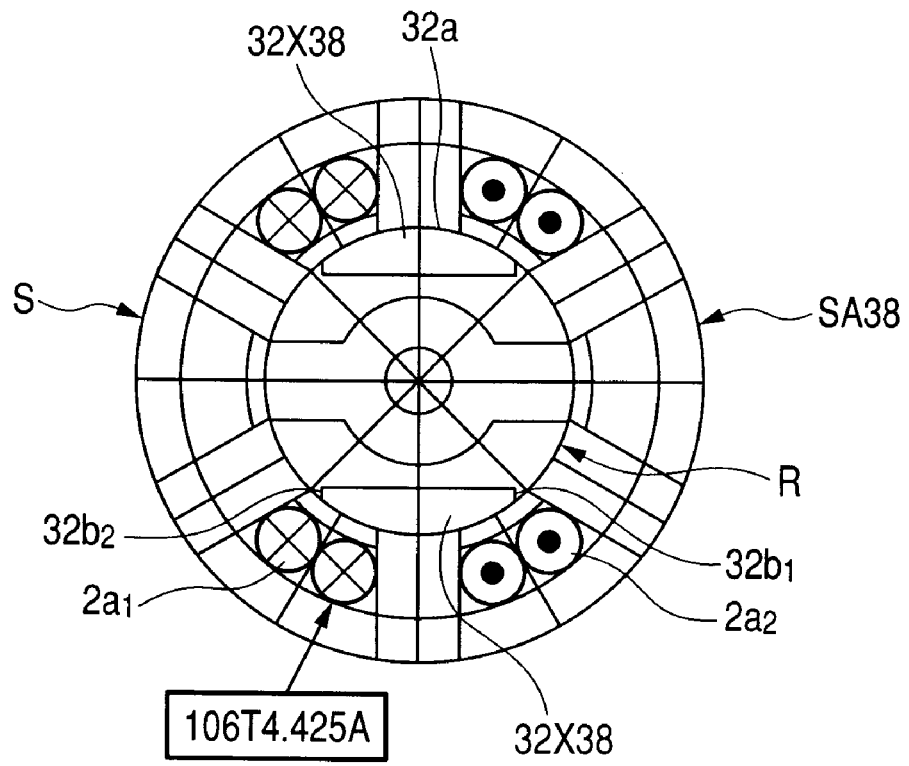
FIG. 40A is an enlarged lateral cross sectional view of a motor sample SA38 corresponding to FIG. 2 and wherein cross hatching is omitted for clarity according to the embodiment.
Figure 40B:
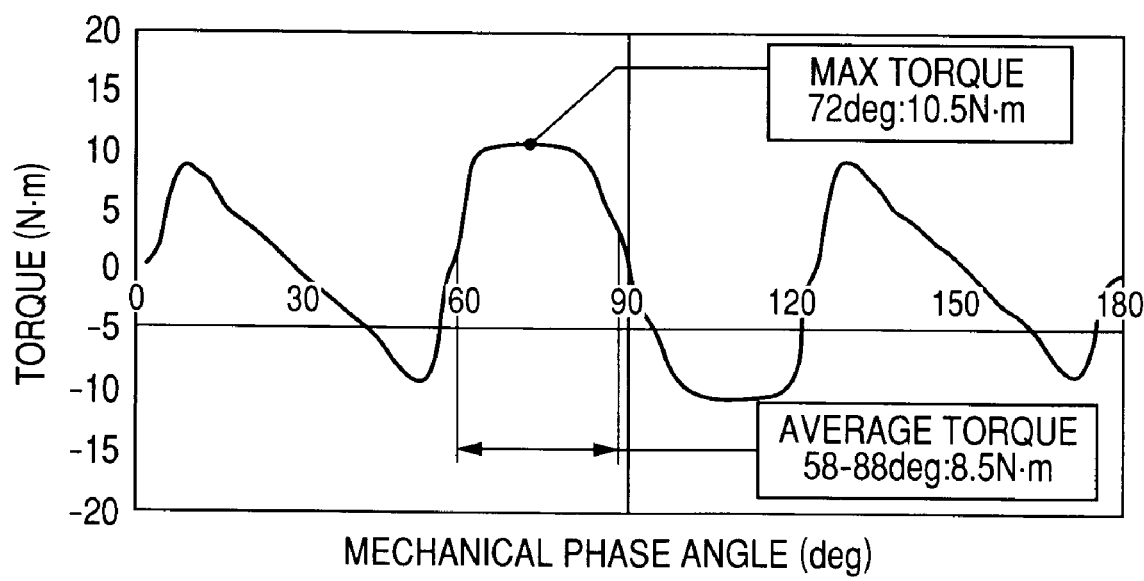
FIG. 40B is a graph schematically illustrating a torque characteristic curve obtained by a simulation based on the motor sample SA38.

The graphs illustrated in FIGS. 39B and 40B for the samples SA37 and SA38 were obtained in the second two-phase energizing pattern. Specifically, the drive circuit 15 works to supply the drive current of, for example, 8.85 amperes to the neutral point of three-phase windings 2 in star configuration. The drive current of 8.825 amperes is divided into a first current component of 4.425 amperes and a second current component of 4.425 amperes; these first and second current components are supplied in parallel to one-phase winding 2a1 and another one-phase winding 2a2 of the three-phase stator windings 2.

Sample SA37

FIG. 39A schematically illustrates the motor sample SA37, and FIG. 39B schematically illustrates the torque characteristic curve obtained by the simulation based on the motor sample SA37.

The sample SA37 is comprised of teeth 51 installed in the inner peripheral portions of the slots 12, respectively.

Each of paired segment magnetic-path portions 32X37 of the motor sample SA37 has the same shape and the same length Ds of the arc-shaped outer surface 32a as a corresponding one of the paired segment magnetic-path portions 32X1.

Sample SA38

FIG. 40A schematically illustrates the motor sample SA38, and FIG. 40B schematically illustrates the torque characteristic curve obtained by the simulation based on the motor sample SA38.

The sample SA38 is comprised of no teeth.

Each of paired segment magnetic-path portions 32X38 of the motor sample SA38 has the same shape and the same length Ds of the arc-shaped outer surface 32a as a corresponding one of the paired segment magnetic-path portions 32X1.

Figure 41A:
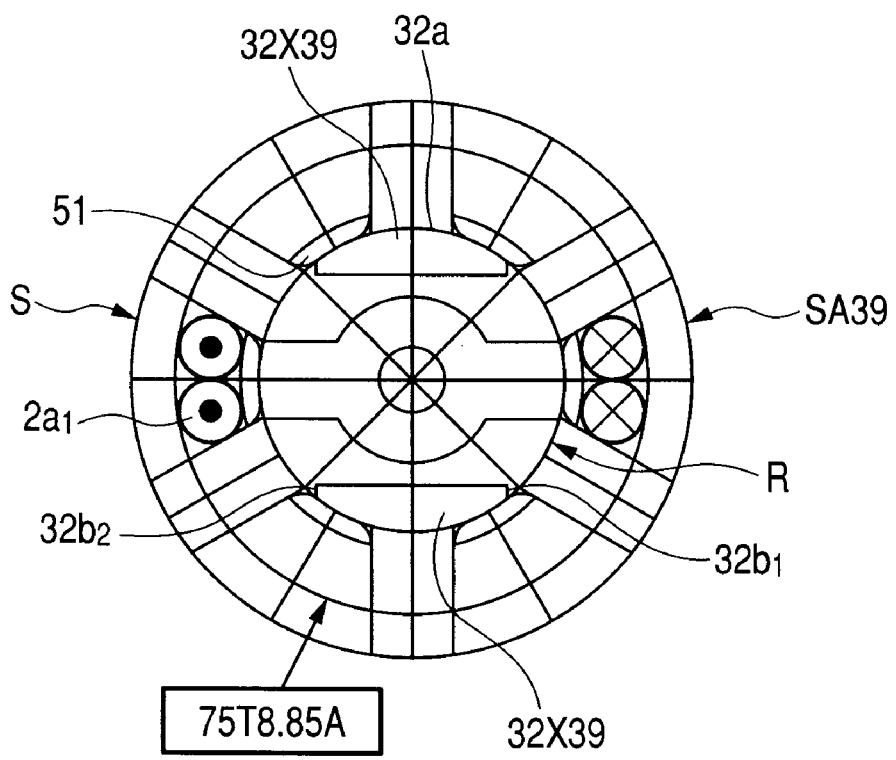
FIG. 41A is an enlarged lateral cross sectional view of a motor sample SA39 corresponding to FIG. 2 and wherein cross hatching is omitted for clarity according to the embodiment.
Figure 41B:
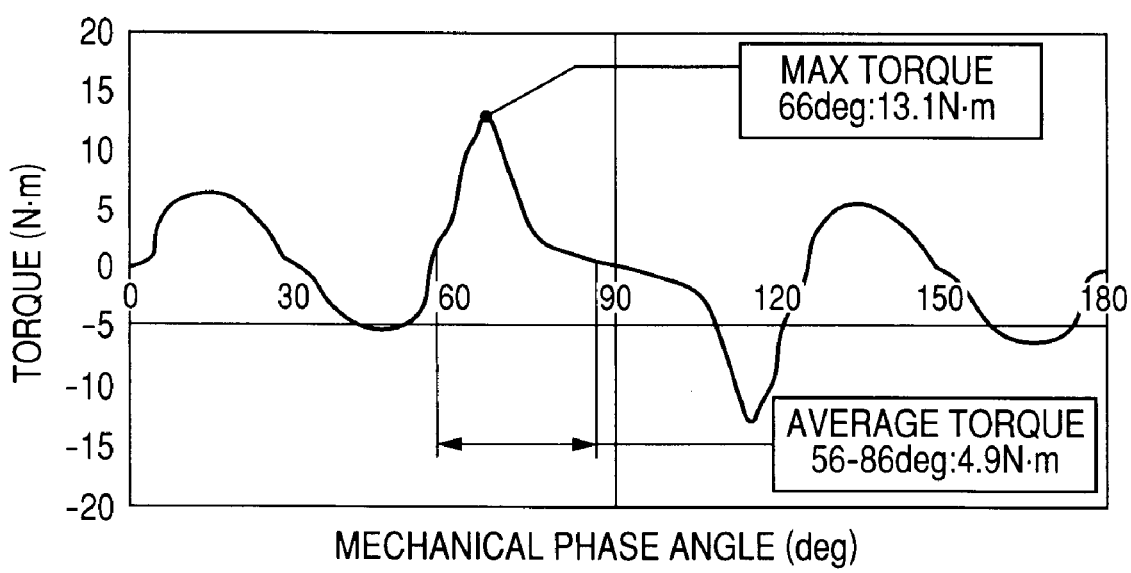
FIG. 41B is a graph schematically illustrating a torque characteristic curve obtained by a simulation based on the motor sample SA39.
Figure 42A:
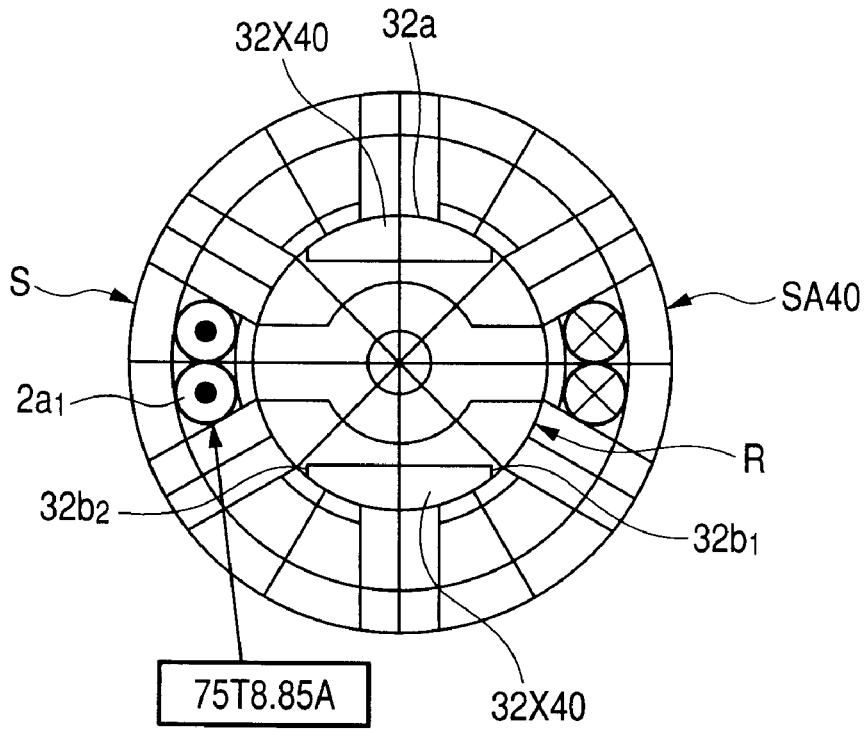
FIG. 42A is an enlarged lateral cross sectional view of a motor sample SA40 corresponding to FIG. 2 and wherein cross hatching is omitted for clarity according to the embodiment.
Figure 42B:
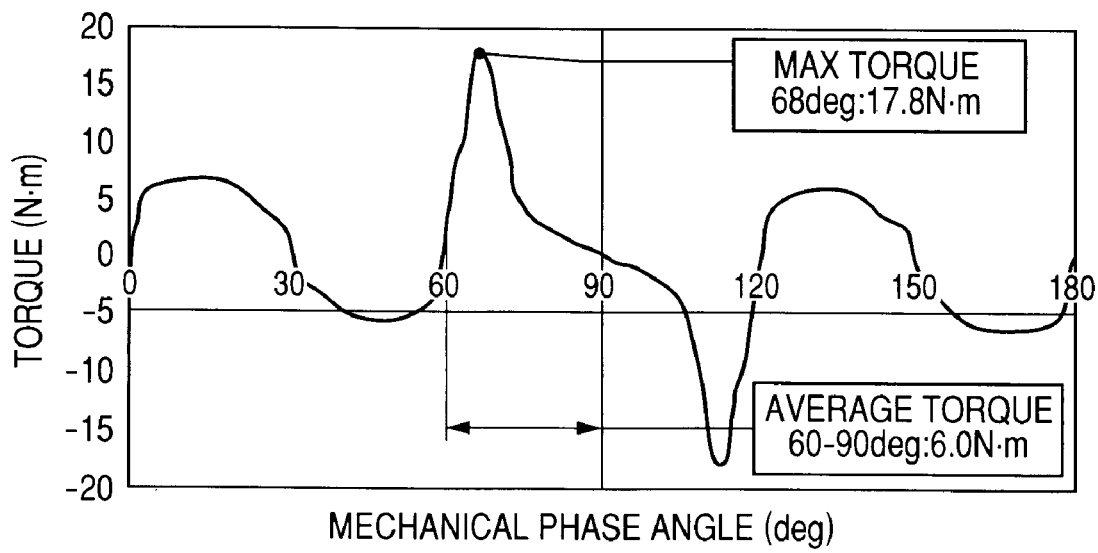
FIG. 42B is a graph schematically illustrating a torque characteristic curve obtained by a simulation based on the motor sample SA40.

The graphs illustrated in FIGS. 41B and 42B for the samples SA39 and SA40 were obtained in the one-phase energizing pattern for the three-phase stator windings 2 in the distributed winding.

Specifically, the drive circuit 15 works to supply the drive current of, for example, 8.85 amperes to only one-phase winding 2a1.

Sample SA39

FIG. 41A schematically illustrates the motor sample SA39, and FIG. 39B schematically illustrates the torque characteristic curve obtained by the simulation based on the motor sample SA39.

The sample SA39 is comprised of teeth 51 installed in the inner peripheral portions of the slots 12, respectively.

Each of paired segment magnetic-path portions 32X39 of the motor sample SA39 has the same shape and the same length Ds of the arc-shaped outer surface 32a as a corresponding one of the paired segment magnetic-path portions 32X1.

Sample SA40

FIG. 42A schematically illustrates the motor sample SA40, and FIG. 40B schematically illustrates the torque characteristic curve obtained by the simulation based on the motor sample SA40.

The sample SA40 is comprised of no teeth.

Each of paired segment magnetic-path portions 32X40 of the motor sample SA40 has the same shape and the same length Ds of the arc-shaped outer surface 32a as a corresponding one of the paired segment magnetic-path portions 32X1.

Figure 43A:
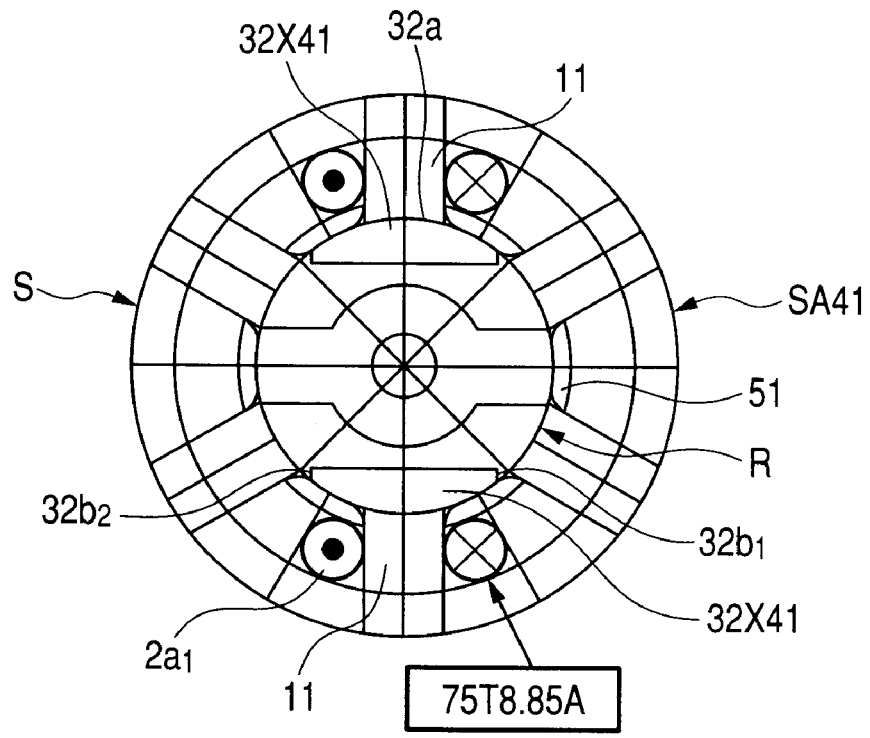
FIG. 43A is an enlarged lateral cross sectional view of a motor sample SA41 corresponding to FIG. 2 and wherein cross hatching is omitted for clarity according to the embodiment.
Figure 43B:
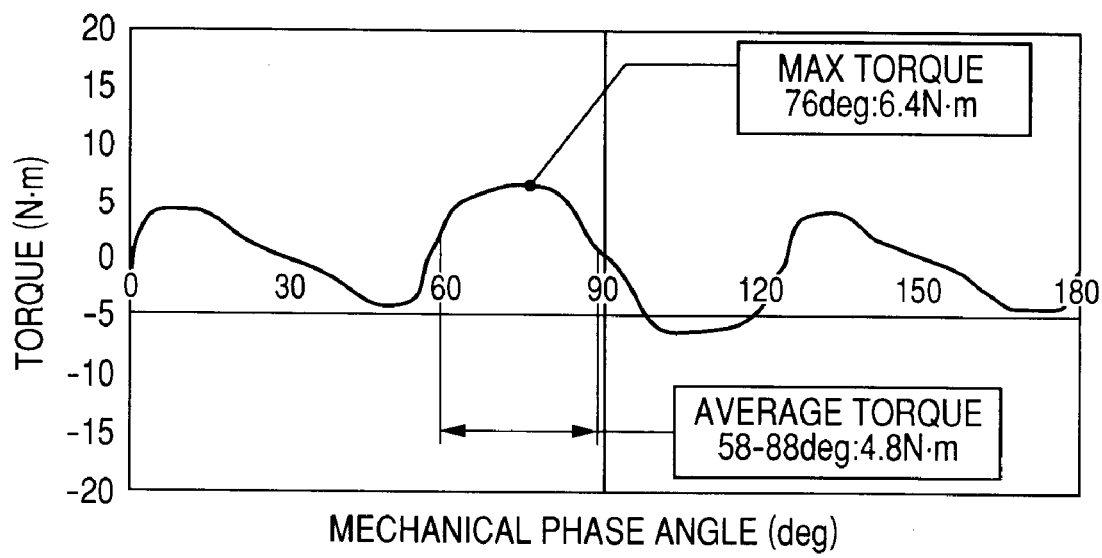
FIG. 43B is a graph schematically illustrating a torque characteristic curve obtained by a simulation based on the motor sample SA41.
Figure 44A:
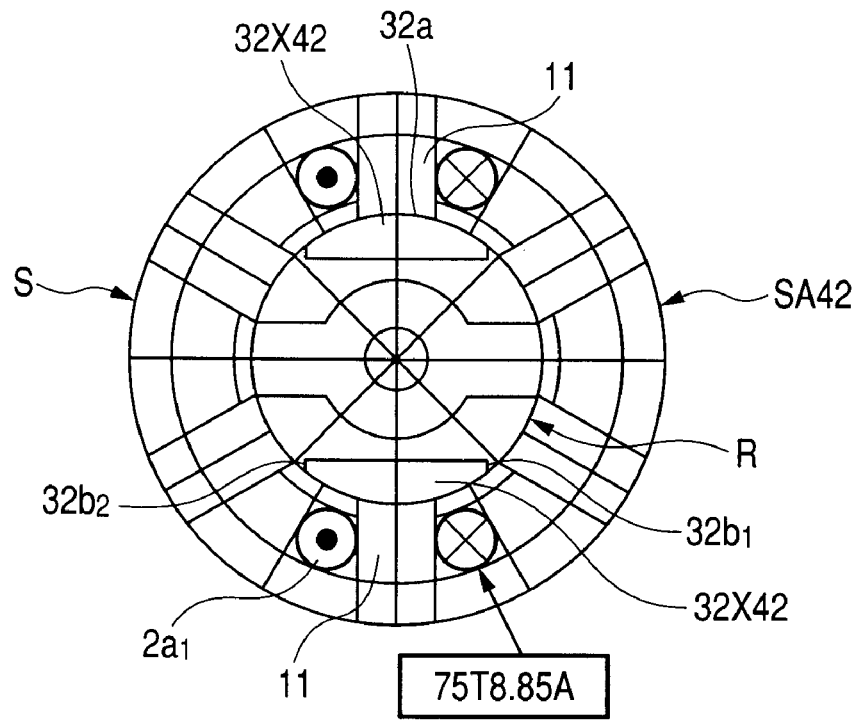
FIG. 44A is an enlarged lateral cross sectional view of a motor sample SA42 corresponding to FIG. 2 and wherein cross hatching is omitted for clarity according to the embodiment.
Figure 44B:
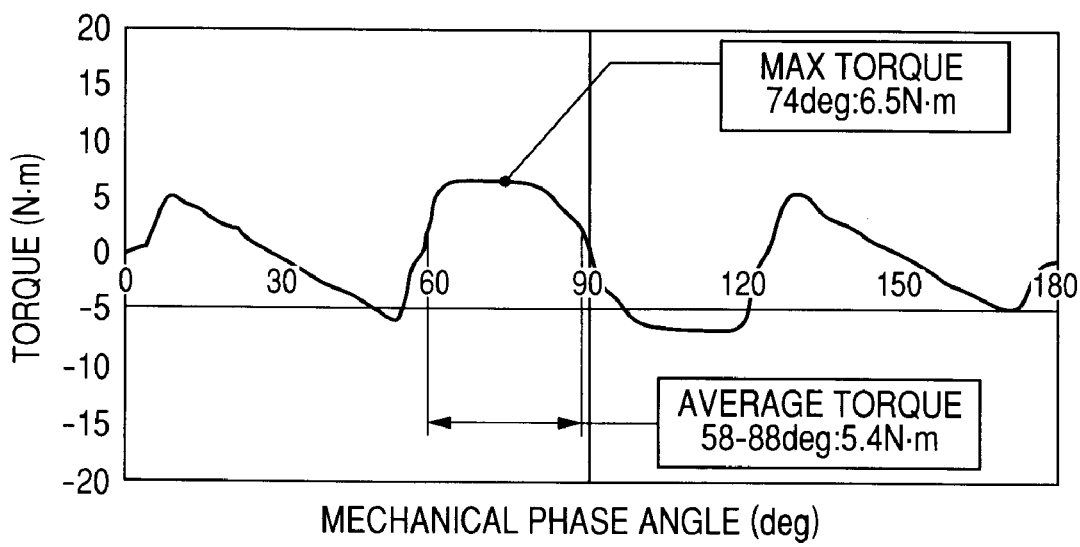
FIG. 44B is a graph schematically illustrating a torque characteristic curve obtained by a simulation based on the motor sample SA42.

The graphs illustrated in FIGS. 43B and 44B for the samples SA41 and SA42 were obtained in the one-phase energizing pattern for the three-phase stator windings 2 in the concentrated winding.

Specifically, the drive circuit 15 works to supply the drive current of, for example, 8.85 amperes to only one-phase winding 2a1.

Sample SA41

FIG. 43A schematically illustrates the motor sample SA41, and FIG. 43B schematically illustrates the torque characteristic curve obtained by the simulation based on the motor sample SA41.

The sample SA41 is comprised of teeth 51 installed in the inner peripheral portions of the slots 12, respectively.

Each of paired segment magnetic-path portions 32X41 of the motor sample SA41 has the same shape and the same length Ds of the arc-shaped outer surface 32a as a corresponding one of the paired segment magnetic-path portions 32X1.

Sample SA42

FIG. 44A schematically illustrates the motor sample SA42, and FIG. 42B schematically illustrates the torque characteristic curve obtained by the simulation based on the motor sample SA42.

The sample SA42 is comprised of no teeth.

Each of paired segment magnetic-path portions 32X42 of the motor sample SA42 has the same shape and the same length Ds of the arc-shaped outer surface 32a as a corresponding one of the paired segment magnetic-path portions 32X1.

In addition, simulations for evaluating torque characteristics of a plurality of comparison motor samples each having a conventional salient-pole rotor were executed with the use of the current drive patterns used for the simulations of the reluctance motor samples SA1 to SA42. Each of the comparison motor samples has a stator whose structure is substantially the same as the stator S of each of the samples SA1 to SA42.

First Comparison Motor Sample

As a result of the simulations based on a first comparison motor sample COM1 whose salient rotor has four salient poles circumferentially separated from each other with an electric angle of $\pi/2$ radians with the use of the one-phase energizing pattern for the concentrated three-phase stator windings in the concentrated winding, the maximum (MAX) torque of 6.4 Nm and the average torque of 5.5 Nm were obtained irrespective of the presence or absence of the teeth.

As a result of the simulations based on a modification of the first comparison motor sample COM1, whose salient rotor has two salient poles circumferentially separated from each other with an electric angle of $\pi$ radians, with the use of the one-phase energizing pattern in the concentrated winding, the same maximum torque of 6.4 Nm and the same average torque of 5.5 Nm were obtained irrespective of the presence or absence of the teeth.

Second Comparison Motor Sample

As a result of the simulations based on a second comparison motor sample COM2, whose salient rotor has four salient poles circumferentially separated from each other with an electric angle of $\pi/2$ radians, with the use of the first two-phase energizing pattern in the distributed winding, the maximum torque of 10.1 Nm and the average torque of 6.3 Nm were obtained irrespective of the presence or absence of the teeth.

As a result of the simulations based on a modification of the second comparison motor sample COM2, whose salient rotor has two salient poles circumferentially separated from each other with an electric angle of $\pi$ radians, with the use of one-phase energizing pattern in the concentrated winding, the maximum torque and the average torque were slightly improved.

Third Comparison Motor Sample

As a result of the simulations based on a third comparison motor sample COM3, whose salient rotor has four salient poles circumferentially separated from each other with an electric angle of $\pi/2$ radians, with the use of the second two-phase energizing pattern in the distributed winding, the maximum torque of 10.4 Nm and the average torque of 8.6 Nm were obtained irrespective of the presence or absence of the teeth.

As a result of the simulations based on a modification of the third comparison motor sample COM3, whose salient rotor has two salient poles circumferentially separated from each other with an electric angle of $\pi$ radians, with the use of one-phase energizing pattern in the concentrated winding, the same maximum torque of 10.4 Nm and the same average torque of 8.6 Nm were obtained irrespective of the presence or absence of the teeth.

Fourth Comparison Motor Sample

As a result of the simulations based on a fourth comparison motor sample COM4, whose salient rotor has four salient poles circumferentially separated from each other with an electric angle of $\pi/2$ radians and whose stator has the teeth, with the use of the three-phase energizing pattern in the distributed winding, the maximum torque of 6.8 Nm and the average torque of 5.7 Nm were obtained. As a result of the same simulations were carried out based on the fourth comparison motor sample whose stator has no teeth, the maximum torque and the average torque were slightly improved.

Fifth Comparison Motor Sample

As a result of the simulations based on a fifth comparison motor sample COM5, whose salient rotor has four salient poles circumferentially separated from each other with an electric angle of $\pi$ radians and whose stator has the teeth, with the use of the three-phase energizing pattern in the distributed winding, the maximum torque of 11.9 Nm and the average torque of 8.5 Nm were obtained. As a result of the same simulations were carried out based on the fourth comparison motor sample whose stator has no teeth, the maximum torque and the average torque were slightly improved.

Sixth Comparison Motor Sample

Simulations were carried out based on a sixth comparison motor sample COM 6, whose rotor has the paired segment magnetic-path portions 32 separated from each other with an electric angle of $\pi/2$ radians without having the salient poles 31 and whose stator has the teeth, with the use of the three-phase energizing pattern in the distributed winding. In other words, replacement of the paired salient poles 31 with the paired segment magnetic-path portions 32 allows the reluctance rotary electric machine EM illustrated in FIG. 2 to be changed to the sixth comparison motor sample.

As a result of the simulations, the maximum torque of 8.3 Nm and the average torque of 3.1 Nm were obtained.

In addition, as a result of the simulations based on a modification of the sixth comparison motor sample COM 6, whose stator has no teeth, with the use of the three-phase energizing pattern in the distributed winding, the maximum torque of 9.9 Nm and the average torque of 3.3 Nm were obtained.

Seventh Comparison Motor Sample

Simulations were carried out based on a seventh comparison motor sample COM7, whose rotor has the paired segment magnetic-path portions 32 separated from each other with an electric angle of $\pi/2$ radians without having the salient poles 31 and whose stator has the teeth, with the use of the first two-phase energizing pattern in the distributed winding. In other words, replacement of the paired salient poles 31 with the paired segment magnetic-path portions 32 allows the reluctance rotary electric machine EM illustrated in FIG. 2 to be changed to the seventh comparison motor sample COM7.

As a result of the simulations, the maximum torque of 7.7 Nm and the average torque of 5.0 Nm were obtained.

In addition, as a result of the simulations based on a modification of the seventh comparison motor sample COM7, whose stator has no teeth, with the use of the first two-phase energizing pattern in the distributed winding, the maximum torque of 9.7 Nm and the average torque of 4.7 Nm were obtained.

Eighth Comparison Motor Sample

Simulations were carried out based on a seventh comparison motor sample COM8, whose rotor has the paired segment magnetic-path portions 32 separated from each other with an electric angle of $\pi/2$ radians without having the salient poles 31 and whose stator has the teeth, with the use of the second two-phase energizing pattern in the distributed winding. In other words, replacement of the paired salient poles 31 with the paired segment magnetic-path portions 32 allows the reluctance rotary electric machine EM illustrated in FIG. 2 to be changed to the eighth comparison motor sample.

As a result of the simulations, the maximum torque of 7.4 Nm and the average torque of 4.7 Nm were obtained.

In addition, as a result of the simulations based on a modification of the eighth comparison motor sample COM8, whose stator has no teeth, with the use of the second two-phase energizing pattern in the distributed winding, the maximum torque of 9.0 Nm and the average torque of 4.3 Nm were obtained.

The maximum torques and the average torques obtained by the simulations based on the samples SA1 to SA42 and those obtained by the simulations based on the comparison samples COM 1 to COM 8 are collectively represented in a tabular list form as follows:

TABLE

| SAMPLE | MAXIMUM TORQUE [N · m] | AVERAGE TORQUE [N · m] |
|---|---|---|
| SA1 | 16.3 | 8.0 |
| SA2 | 15.3 | 7.6 |
| SA3 | 16.9 | 8.3 |
| SA4 | 10.9 | 6.9 |
| SA5 | 17.5 | 8.6 |
| SA6 | 11.8 | 7.5 |
| SA7 | 13.3 | 8.0 |
| SA8 | 18.0 | 7.5 |
| SA9 | 16.3 | 7.2 |
| SA10 | 20.9 | 9.3 |
| SA11 | 19.5 | 9.0 |
| SA12 | 19.7 | 9.5 |
| SA13 | 19.4 | 8.6 |
| SA14 | 16.8 | 9.4 |
| SA15 | 18.1 | 8.5 |
| SA16 | 21.8 | 9.1 |
| SA17 | 19.1 | 9.3 |
| SA18 | 14.9 | 8.7 |
| SA19 | 16.0 | 8.5 |
| SA20 | 14.7 | 7.9 |
| SA21 | 15.7 | 8.8 |
| SA22 | 14.8 | 8.4 |
| SA23 | 15.6 | 8.6 |
| SA24 | 15.0 | 8.0 |
| SA25 | 15.3 | 8.3 |
| SA26 | 16.3 | 8.6 |
| SA27 | 14.6 | 8.6 |
| SA28 | 18.0 | 8.5 |
| SA29 | 16.0 | 7.9 |
| SA30 | 17.1 | 8.8 |
| SA31 | 17.6 | 8.4 |
| SA32 | 14.2 | 8.6 |
| SA33 | 19.2 | 8.4 |
| SA34 | 19.2 | 8.4 |
| SA35 | 16.5 | 8.5 |
| SA36 | 12.6 | 8.6 |
| SA37 | 10.3 | 4.8 |
| SA38 | 10.5 | 8.5 |
| SA39 | 13.1 | 4.9 |
| SA40 | 17.8 | 6.0 |
| SA41 | 6.4 | 4.8 |
| SA42 | 6.5 | 5.4 |
| COM1 | 6.4 | 5.5 |
| COM2 | 10.1 | 6.3 |
| COM3 | 10.4 | 8.6 |
| COM4 | 6.8 | 5.7 |
| COM5 | 11.9 | 8.5 |
| COM6 | 8.3 (9.9) | 3.1 (3.3) |
| COM7 | 7.7 (9.7) | 5.0 (4.7) |
| COM8 | 7.4 (9.0) | 4.7 (4.3) |

As clearly shown in the table, most of the samples based on the reluctance rotary electric machine EM according to the embodiment can obtain a maximum torque (peak torque) greater than that obtained by each of the comparison samples COM 1 to COM 8. Particularly, the sample SA16 and the like can obtain the maximum torque (peak torque) more than nearly twice as much as that obtained by each of the comparison samples COM 1 to COM 8 based on a conventional salient-pole rotor.

As compared with conventional reluctance electric machines, such as conventional reluctance motors, the reluctance rotary electric machine EM composed of the salient poles 31 and the segment magnetic-path portions 32 according to the embodiment therefore can increase the maximum torque (peak torque) created thereby. This allows the reluctance rotary electric machine EM to be kept compact in size even if a great torque is required, making it possible to improve the installability and manufacturing cost of the reluctance rotary electric machine EM.

Preferably, the reluctance rotary electric machine EM can be applied to a stator motor for engines. Specifically, the stator motor for engines is commonly required to create a great starting torque for an engine immediately before the top dead center.

Because the reluctance rotary electric machine EM is capable of creating the maximum torque greater than that creatable by conventional reluctance motors, it is preferable to apply the reluctance rotary electric machine EM to a starter motor for engines.

As clearly seen by focusing on the maximum torques and/or average torques of the samples, for example, SA1, SA10, SA19, and SA28, adjustment of the arc ratio to be 75 degrees and thereabout allows the maximum torque and/or average torque of the reluctance rotary electric machine EM to increase. Preferably, adjustment of the arc ratio to be within a range from 70 degrees to 80 degrees, more preferably, 72 degrees to 77 degrees allows the maximum torque and/or average torque of the reluctance rotary electric machine EM to increase.

In addition, as clearly seen by focusing on the maximum torques and/or average torques of the samples, for example, SA1, SA3, SA19, and SA21, adjustment of the width of each of the paired segment magnetic-path portions 32 to be 20 percent higher or lower than its original width allows the maximum torque and/or average torque of the reluctance rotary electric machine EM to increase.

Moreover, as clearly seen by focusing on the maximum torques and/or average torques of the samples, for example, SA1, SA8, SA10, and SA16, both of the paired segment magnetic-path portions 32X8 are arranged such that the center axis CA is inclined with respect to a direction orthogonal to the extending direction EA in the rotational direction RD or a direction opposite to the rotational direction RD by 5 degrees or thereabout. This allows the maximum torque and/or average torque of the reluctance rotary electric machine EM to increase. Preferably, both of the paired segment magnetic-path portions 32X8 are arranged such that the center axis CA is inclined with respect to a direction orthogonal to the extending direction EA in the rotational direction RD or a direction opposite to the rotational direction RD by an angle lying within an angular range from 3 to 7 degrees. This allows the maximum torque and/or average torque of the reluctance rotary electric machine EM to increase.

In other words, an absolute value of the difference between the circumferential distance Lf and the circumferential distance Lb can be determined to be within a range from 5 to 20 percent of the length Ds. This allows the maximum torque and/or average torque of the reluctance rotary electric machine EM to further increase.

In the embodiment, two segment-path torque stator poles 11 adjacent to each other are located in either interval between the paired salient-pole torque stator poles 111 and 112, but the present invention is not limited to the structure.

Specifically, three or more segment-path torque stator poles 11 adjacent to one another can be located in either interval between the paired salient-pole torque stator poles 111 and 112.

Figure 49:
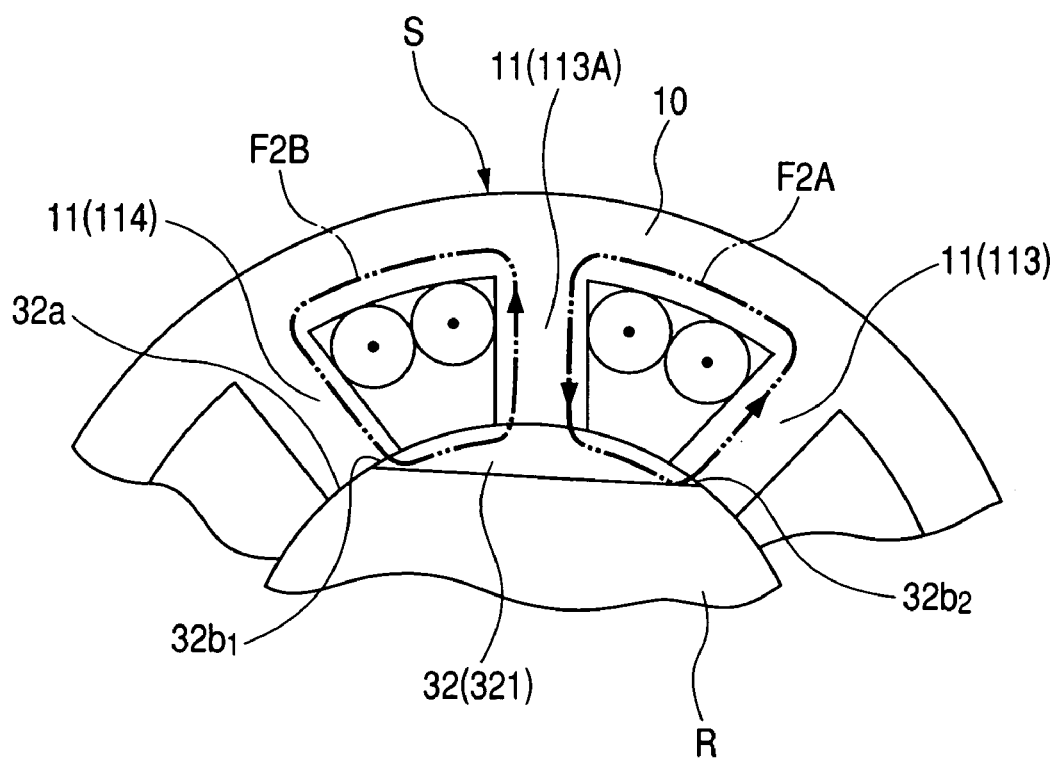
FIG. 49 is an enlarged lateral cross sectional view of part of a reluctance rotary electric machine according to a modification of the embodiment of the present invention.

For example, as illustrated in FIG. 49, three segment-path torque stator poles 113, 113A, and 114 are located in one-side interval between the paired salient-pole torque stator poles 111 and 112.

In this modification, one end 32b1 of the outer surface 32a of the segment magnetic-path portion 321 comes closest to the segment-path torque stator pole 114 in the rotational direction. Similarly, the other end 32b2 of the outer surface 32a of the segment magnetic-path portion 321 comes closest to the segment-path torque stator pole 113 in the rotational direction.

In addition, the inner periphery of the remaining stator pole 113A fully faces the outer surface 32a of the segment magnetic-path portion 321.

This results that the segment magnetic-path portion 321 allows:

the adjacent segment-path torque stator poles 113A and 113 to be magnetically coupled to each other; and the adjacent segment-path torque stator poles 113A and 114 to be magnetically coupled to each other.

The magnetic coupling between the adjacent segment-path torque stator poles 113A and 113 allows a current component of the drive current flowing through at least one of the three-phase stator windings 2 to create second magnetic fluxes F2A. Simultaneously, the magnetic coupling between the adjacent segment-path torque stator poles 113A and 114 allows a current component of the drive current flowing through at least one of the three-phase stator windings 2 to create second magnetic fluxes F2B.

When the drive current is controlled by the drive circuit 15 so that a first magnetic attractive force based on the second magnetic fluxes F2B is greater than a second magnetic attractive force based on the second magnetic fluxes F2A, the difference between the created first and second magnetic attractive forces causes a torque to rotate the rotor R in the rotational direction.

In the embodiment, the rotary electric machine EM is designed as an inner-rotor rotary electric machine with a radial air gap between its stator and rotor, but can be designed as an outer-rotor rotary electric machine with a radial air gap between its stator and rotor. The present invention can also be applied to reluctance rotary electric machines each having an axial air gap between its stator and rotor, and to linear reluctance motors.

In the application of the present invention to a linear motor, the structure of the rotary electric machine EM illustrated in FIG. 2 can be linearly developed in the circumferential direction. Specifically, in this application, a plurality of stator poles 11 are linearly arranged at regular pitches in a predetermined moving direction, and, as the rotor R, a movable part is arranged opposing the plurality of stator poles 11 to be movable in the predetermined direction. Similarly, in the movable part of this application, one of the paired salient poles 31, one of the paired magnetic path separators 33, one of the paired magnetic-path portions 32, the other of the paired salient poles 31, the other of the paired magnetic separators 33, and the other of the paired magnetic-path portions 32 are linearly arranged in this order.

Specifically, as well as the rotary reluctance motor EM, when the movable part (rotor R) is located at a predetermined position, six stator poles 11 include two stator poles (111 and 112) that come closest to the paired salient poles 31 of the movable part separated from each other with the electric angle of π radians.

The paired segment magnetic-path portions 32 are arranged to be separated from each other with an electric angle of π radians. The arc-shaped outer surface 32a of each of the paired segment magnetic-path portions 32 extends linearly so as to allow at least one pair of adjacent segment-path torque stator poles to be magnetically coupled to each other.

Operations of the linear motor to which the present invention is applied are substantially the same as those of the rotary electric machine EM when the word "circumferential direction" and the like is replaced with "moving direction".

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A reluctance electric machine comprising:
a stator core having a plurality of stator poles aligned in a predetermined direction with pitches therebetween;
a plurality of multiphase windings installed in the stator core and configured to sequentially excite at least one first pair of the plurality of stator poles when energized, at least one second pair of the plurality of stator poles remaining between the excited at least one first pair of the plurality of stator poles; and
a movable part arranged opposing part of an alignment of the plurality of stator poles to be movable in the predetermined direction, the movable part comprising:
at least one pair of salient poles configured to magnetically couple to the excited at least one first pair of the plurality of poles so as to form a first magnetic flux in loop thereamong; and
a segment magnetic-path portion arranged to be magnetically separated from the at least one pair of salient poles, the segment magnetic-path portion working to magnetically couple therethrough between the at least one second pair of the plurality of stator poles so as to form a second magnetic flux in loop thereamong, the first magnetic flux and second magnetic flux creating a reluctance force to move the movable part in the predetermined direction.

2. A reluctance electric machine according to claim 1, wherein the stator core has an annular peripheral surface, the plurality of stator poles constituting part of the annular peripheral surface, the movable part is a rotor rotatable in relation to the stator core about an axis, the rotor having an annular peripheral surface, the rotor is arranged such that the annular peripheral surface thereof is opposite to that of the stator core with an air gap, the at least one paired salient poles are separated from each other with an electric angle of π radians, and the at least one first paired stator poles are separated from each other with an electric angle of π radians.

3. A reluctance electric machine according to claim 2, wherein the segment magnetic-path portion has a substantially arc-shaped surface constituting part of the annular peripheral surface of the rotor, the arc-shaped surface of the segment magnetic-path portion has a center axis passing through the axis of rotation of the rotor, and the segment magnetic-path portion is arranged such that the center axis thereof is separated, by an electric angle of π/2 radians, from an extending direction of each of the at least one paired salient poles to the stator core, the extending direction thereof passing through the axis of rotation of the rotor.

4. A reluctance electric machine according to claim 2, wherein the rotor further comprises a magnetic separator arranged between the at least one pair of salient poles and the segment magnetic-path portion and magnetically separating them from each other.

5. A reluctance electric machine according to claim 2, wherein each of the plurality of stator poles has a circumferential length represented by "Dp", the pitch between the at least one second paired stator poles is represented by "P", and the segment magnetic-path portion has a substantially arc-shaped surface constituting part of the annular peripheral surface of the rotor, the substantially arc-shaped surface of the segment magnetic-path portion has a circumferential length represented by "Ds", the circumferential length Ds of the segment magnetic-path portion is represented by the following equation:

$$P \leq Ds \leq P \times (M-1) - Dp$$

where M represents the number of stator poles to be arranged between an electric angle of $\pi$ radians.

6. A reluctance electric machine according to claim 5, wherein the stator core comprises a plurality of slots each arranged between a corresponding one pair of the plurality of stator poles circumferentially adjacent to each other, and the circumferential length Ds of the segment magnetic-path portion is represented by the following equation:

$$P \leq Ds \leq P \times (M-1) - Dp - \alpha$$

where $\alpha$ represents a predetermined circumferential length lower than the half of a value of "P–Dp", the value of "P–Dp" representing a circumferential length of one of the slots between the at least one second paired stator poles.

7. A reluctance electric machine according to claim 6, wherein the number M of stator poles to be arranged between an electric angle of $\pi$ radians is 3, and the circumferential length Ds of the segment magnetic-path portion is represented by the following equation:

$$P \leq Ds \leq 2P - Dp - \alpha.$$

8. A reluctance electric machine according to claim 6, wherein the circumferential length $\alpha$ is determined to be within a range from 5 to 25 percent of the value of "P–Dp".

9. A reluctance electric machine according to claim 1, wherein the segment magnetic-path portion has a surface extending in the predetermined direction and facing part of the alignment of the plurality of stator poles, one forward end of the surface in the predetermined direction is close to one of the at least one paired salient poles, the other rear back end of the surface in the predetermined direction is close to the other of the at least one paired salient poles, a first distance between the one forward end of the surface and the one of the at least one paired salient poles is represented by "Lf", a second distance between the other back end of the surface and the other of the at least one paired salient poles is represented by "Lb", the first distance Lf is longer than the second distance Lb, and the segment magnetic-path portion is arranged such that a line orthogonal to the surface thereof is inclined with respect to a direction orthogonal to a salient direction of the at least one paired salient poles.

10. A reluctance electric machine according to claim 1, wherein a difference between the first distance Lf and the second distance Lb is determined to be within a range from 5 to 20 percent of a length of the segment magnetic-path portion in the predetermined direction.

11. A reluctance electric machine according to claim 1, wherein the reluctance electric machine is installed in an engine starter as a starter motor thereof.

* * * * *